US012382373B2

(12) United States Patent
Kato et al.

(10) Patent No.: US 12,382,373 B2
(45) Date of Patent: Aug. 5, 2025

(54) PROCESSING DEVICE, COMMUNICATION DEVICE, COMMUNICATION SYSTEM, CONTROL CIRCUIT, STORAGE MEDIUM, AND INFORMATION SHARING METHOD

(71) Applicant: Mitsubishi Electric Corporation, Tokyo (JP)

(72) Inventors: Yasunori Kato, Tokyo (JP); Yasushi Matsutaka, Tokyo (JP); Toshinori Hori, Tokyo (JP); Koshiro Ishihara, Tokyo (JP); Takashi Asahara, Tokyo (JP); Kenichi Nakura, Tokyo (JP); Shusaku Umeda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 437 days.

(21) Appl. No.: 17/994,738

(22) Filed: Nov. 28, 2022

(65) Prior Publication Data

US 2023/0092604 A1 Mar. 23, 2023

Related U.S. Application Data

(63) Continuation of application No. PCT/JP2020/027785, filed on Jul. 17, 2020.

(51) Int. Cl.
*H04W 48/14* (2009.01)
*H04L 5/00* (2006.01)
(Continued)

(52) U.S. Cl.
CPC ........... *H04W 48/14* (2013.01); *H04L 5/0048* (2013.01); *H04L 69/22* (2013.01);
(Continued)

(58) Field of Classification Search
CPC ..... H04W 48/00; H04W 48/08; H04W 48/14; H04W 68/12; H04L 5/003; H04L 5/0048;
(Continued)

(56) References Cited

U.S. PATENT DOCUMENTS 10,595,157 B2 3/2020 Futaki
2020/0245218 A1* 7/2020 Wang .................... H04M 15/66
(Continued)

FOREIGN PATENT DOCUMENTS

CN 117812106 * 4/2024 ............. H04L 67/02
WO WO 2017/046979 A1 3/2017

OTHER PUBLICATIONS

International Search Report, issued in PCT/JP2020/027785, PCT/ISA/210, dated Oct. 6, 2020.
(Continued)

*Primary Examiner* — Warner Wong
(74) *Attorney, Agent, or Firm* — Birch, Stewart, Kolasch & Birch, LLP

(57) ABSTRACT

A processing device that is an edge computer connected to a base station communicatable with a vehicle in a service area includes: a request generation unit generating a first request including location information and a range from the location information specifying a region in which information sharing is requested, and an identifier from which a demander that requests the information sharing is identifiable; an accepted request holding unit holding a second request based on an information sharing demand from another processing device when shared information regarding the region is sendable in response to the second request; and a request location information inquiry unit generating the shared information including a cognitive event and the identifier held in the accepted request holding unit when location information indicating a cognitive event occurrence
(Continued)

point acquired from the vehicle via the base station is included in a region specified by the second request information.

16 Claims, 32 Drawing Sheets

(51) Int. Cl.
    *H04L 69/22*     (2022.01)
    *H04L 12/14*     (2006.01)
    *H04L 67/1014*     (2022.01)
    *H04L 67/63*     (2022.01)
    *H04L 69/08*     (2022.01)
    *H04W 68/12*     (2009.01)

(52) U.S. Cl.
    CPC ...... *H04L 12/1446* (2013.01); *H04L 67/1014* (2013.01); *H04L 67/63* (2022.05); *H04L 69/08* (2013.01); *H04W 68/12* (2013.01)

(58) Field of Classification Search
    CPC ....... H04L 5/005; H04L 5/0051; H04L 69/00; H04L 69/22; H04L 67/01; H04L 67/1014; H04L 67/63; H04L 12/00; H04L 12/1446; H04L 2012/5618; H04L 65/00; H04L 65/1095; H04L 69/08

See application file for complete search history.

(56) References Cited

U.S. PATENT DOCUMENTS

| | | | | |
|---|---|---|---|---|
| 2020/0379972 A1* | 12/2020 | Brun | ................ | G06F 16/248 |
| 2021/0266798 A1* | 8/2021 | Jin | ................ | H04W 36/144 |
| 2022/0386186 A1* | 12/2022 | Hu | ................ | H04W 36/0061 |
| 2023/0071751 A1* | 3/2023 | Zhao | ................ | H04M 1/72448 |
| 2023/0180159 A1* | 6/2023 | Panzner | ............ | H04W 56/0015 |
| | | | | 370/331 |

OTHER PUBLICATIONS

Written Opinion of the International Searching Authority, issued in PCT/JP2020/027785, PCT/ISA/237, dated Oct. 6, 2020.

* cited by examiner

PROCESSING DEVICE, COMMUNICATION DEVICE, COMMUNICATION SYSTEM, CONTROL CIRCUIT, STORAGE MEDIUM, AND INFORMATION SHARING METHOD

CROSS-REFERENCE TO RELATED APPLICATION

This application is a continuation application of International Application PCT/JP2020/027785, filed on Jul. 17, 2020, and designating the U.S., the entire contents of which are incorporated herein by reference.

BACKGROUND OF THE INVENTION

1. Field of the Invention

The present disclosure relates to a processing device, a communication device, a communication system, a control circuit, a storage medium, and an information sharing method for use in a communication system that distributes information to vehicles.

2. Description of the Related Art

Provision of information to vehicles is a conventional measure to enhance the safety of vehicles traveling on roads. Examples of information provision services include Vehicle Information and Communication System (VICS, registered trademark) service provided in Japan, Dedicated Short Range Communications (DSRC) using Association of Radio Industries and Businesses-STANDARD (ARIB-STD)-T75, and Electronic Toll Collection (ETC) 2.0.

In recent years, for automatic driving and for further improvement of safety, low-latency provision of emergency information to vehicles in wider areas has been taking place. Communication for information provision involves the use of wireless communication in moving vehicles; for example, cellular communication standards that are being standardized by the 3rd Generation Partnership Project (3GPP) or that have been standardized by the 3GPP can be used as communication lines. In addition, attempts have been made to reduce latency using edge computers that perform part or all of application processing, which has been conventionally performed outside telecommunications company networks, in telecommunications company networks close to vehicles in terms of communication paths.

PCT Patent Application Laid-open No. 2017/046979 discloses a technique for distributing information from a base station, a roadside device, or a server to a communication terminal, the technique involving determining at least one of a communication path, a communication scheme, a geographical area in which distribution is to be performed, a logical area in which distribution is to be performed, and the like by using location-related information including at least one of a preset roadside device identifier, a preset management area identifier, and location information indicating the location coordinates or address of a roadside device. The geographical area is indicated by, for example, a combination of location information, a cell, a tracking area, a Vehicle-to-Everything (V2X) service area, and information on the physical management range covered by a roadside device or a base station. The device described in PCT Patent Application Laid-open No. 2017/046979 determines the communication core network of a telecommunications company and the communication path in a cell according to a service area, the physical management range covered by a roadside device or a base station, and the like.

Traveling vehicles generally have a contract with a specific telecommunications company, and are capable of communication, including roaming communication, with the base stations of the specific telecommunications company. In other words, traveling vehicles cannot communicate with any telecommunications company that has no contract therewith. Therefore, if a vehicle recognizes emergency information which should be delivered to other vehicles, the vehicle that has recognized the emergency information can transmit the emergency information to a base station of the contracted first telecommunications company to transmit the emergency information to other vehicles having a contract with the first telecommunications company. On the other hand, in order for the vehicle that has recognized the emergency information to transmit the emergency information to vehicles having a contract with a second telecommunications company with which the vehicle that has recognized the emergency information has no contract, the vehicle needs to transmit the emergency information to an application server outside the network of the first telecommunications company so that the emergency information can be transmitted from the application server to the second telecommunications company. In addition, the second telecommunications company needs to analyze the location information included in the emergency information transmitted from the application server, determine from which base station the emergency information is to be transmitted by examining the association between the location information and the service area of each base station, and transmit the emergency information in the telecommunications company network.

PCT Patent Application Laid-open No. 2017/046979 does not disclose or suggest how in order for different telecommunications companies to share information to be distributed, a telecommunications company that requests information sharing requests information sharing without knowing the service area configuration of the telecommunications company that provides information.

The present disclosure has been made in view of the above, and an object thereof is to obtain a processing device capable of sharing information to be distributed to vehicles between different telecommunications companies without using information on the network configuration of other telecommunications companies.

SUMMARY OF THE INVENTION

In order to solve the above-described problems and achieve the object, the present disclosure is a processing device connected to a base station capable of communicating with a vehicle in a service area. The processing device includes: a request generation unit to generate a first request that is a request including location information and a range from the location information specifying a region in which information sharing is requested, and an identifier from which a demander that requests the information sharing is identifiable; an accepted request holding unit to hold a second request that is a request based on an information sharing demand from another processing device in a case where shared information regarding the region is sendable in response to the second request; and a request inquiry unit to generate the shared information in a case where location information indicating a point of occurrence of a cognitive event acquired from the vehicle via the base station is included in a region specified by the second request, the shared information including the cognitive event and an identifier held in the accepted request holding unit.

DETAILED DESCRIPTION OF THE PREFERRED EMBODIMENTS

Hereinafter, a processing device, a communication device, a communication system, a control circuit, a storage medium, and an information sharing method according to embodiments of the present disclosure will be described in detail with reference to the drawings.

First Embodiment

Figure 1:
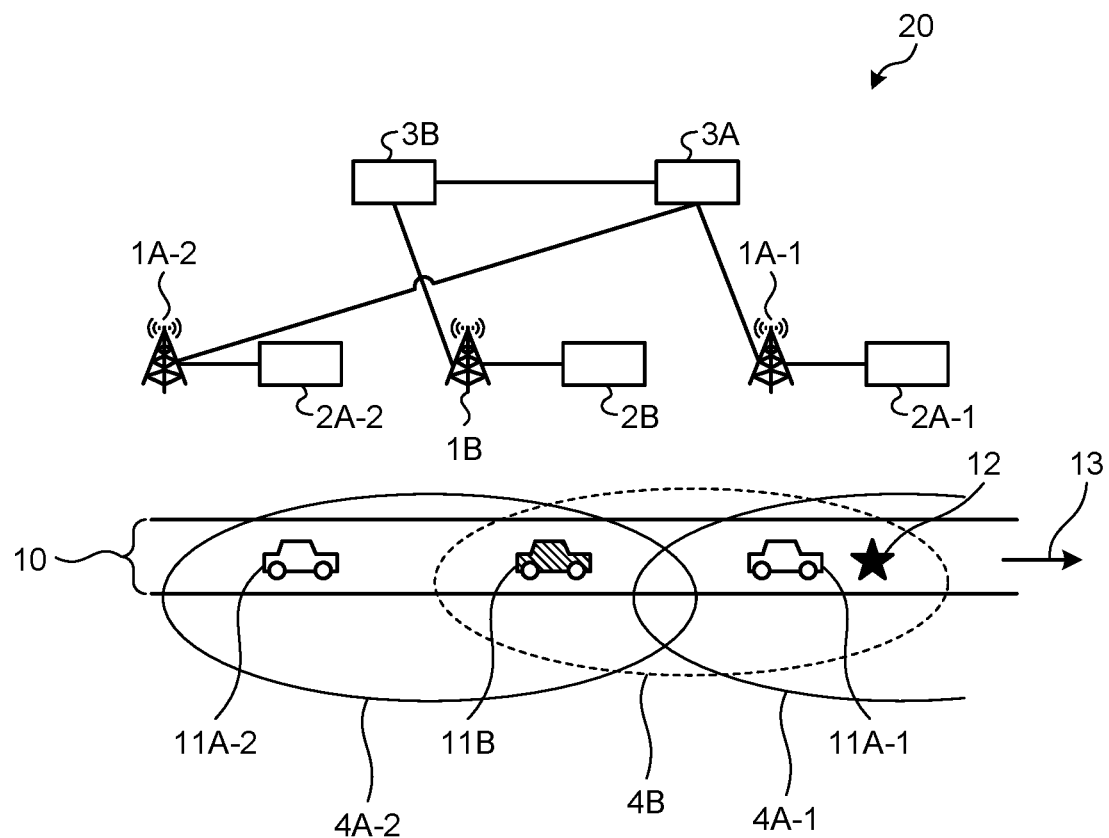
FIG. 1 is a first diagram illustrating an exemplary configuration of a communication system according to a first embodiment.

FIG. 1 is a first diagram illustrating an exemplary configuration of a communication system 20 according to a first embodiment. The communication system 20 includes base stations 1A-1, 1A-2, and 1B, edge computers 2A-1, 2A-2, and 2B, gateways 3A and 3B, and vehicles 11A-1, 11A-2, and 11B. The base stations 1A-1, 1A-2, and 1B are installed along a roadway 10 on which the vehicles 11A-1, 11A-2, and 11B travel. The base station 1A-1 provides service in the region of a service area 4A-1, and can communicate with the vehicle 11A-1 in the service area 4A-1. The base station 1A-2 provides service in the region of a service area 4A-2, and can communicate with the vehicle 11A-2 in the service area 4A-2. The base station 1B provides service in the region of a service area 4B, and can communicate with the vehicle 11B in the service area 4B. A service area is also called a cell, a serving cell, etc. In the communication system 20, the base station 1A-1 and the edge computer 2A-1 are connected, the base station 1A-2 and the edge computer 2A-2 are connected, and the base station 1B and the edge computer 2B are connected. In the communication system 20, the base stations 1A-1 and 1A-2 are connected to the gateway 3A, and the base station 1B is connected to the gateway 3B.

In the communication system 20, it is assumed that the base stations 1A-1 and 1A-2, the edge computers 2A-1 and 2A-2, and the gateway 3A are operated by the same telecommunications company A, and the base station 1B, the edge computer 2B, and the gateway 3B are operated by the same telecommunications company B. Telecommunications company A and telecommunications company B are different telecommunications companies. The edge computer 2A-1 can communicate with the gateway 3A via the base station 1A-1. The edge computer 2A-2 can communicate with the gateway 3A via the base station 1A-2. The edge computer 2B can communicate with the gateway 3B via the base station 1B. In the communication system 20, it is assumed that the base stations 1A-1, 1A-2, and 1B have similar configurations, the edge computers 2A-1, 2A-2, and 2B have similar configurations, and the gateways 3A and 3B have similar configurations.

In the following description, the base stations 1A-1, 1A-2, and 1B can be collectively referred to as the base station(s) 1, the edge computers 2A-1, 2A-2, and 2B can be collectively referred to as the edge computer(s) 2, the gateways 3A and 3B can be collectively referred to as the gateway(s) 3, the service areas 4A-1, 4A-2, and 4B can be collectively referred to as the service area(s) 4, and the vehicles 11A-1, 11A-2, and 11B can be collectively referred to as the vehicle(s) 11. In addition, the base stations 1A-1 and 1A-2 can be collectively referred to as the base station(s) 1A, the edge computers 2A-1 and 2A-2 can be collectively referred to as the edge computer(s) 2A, the service areas 4A-1 and 4A-2 can be collectively referred to as the service area(s) 4A, and the vehicles 11A-1 and 11A-2 can be collectively referred to as the vehicle(s) 11A. In addition, the edge computer 2 can be referred to as a processing device, the gateway 3 can be referred to as a communication device, and the edge computer 2 and the gateway 3 can be simply referred to as devices.

Each base station 1 constituting the service area 4 may use any communication scheme, communication standard, and the like. Examples of the communication scheme and communication standard of each base station 1 include Universal Mobile Telecommunications System (UMTS), Long Term Evolution (LTE), LTE-Advanced, Code Division Multiple Access (CDMA) 2000, Wideband-Code Division Multiple Access (W-CDMA), 5th Generation (5G) mobile communication systems, Wi-Fi (registered trademark), standards related to Institute of Electrical and Electronics Engineers (IEEE, registered trademark) 802.11 such as IEEE 802.11p, and ARIB-STD-T75, ARIB-STD-T109, and WiMAX (registered trademark) of Japan.

In the communication system 20, the gateway 3 and the edge computer 2 are connected via the base station 1 in the example of FIG. 1, but may be directly connected. In the example of FIG. 1, telecommunications company A has a network configuration in which the gateways 3A and the base stations 1A-1 and 1A-2 are directly connected, and if the communication between the gateways 3A and the base stations 1A-1 and 1A-2 is wired communication, a star network is formed with more base stations 1. The network configuration of telecommunications company A may be a different wired connection configuration in which the gateways 3A and the base stations 1A-1 and 1A-2 are each one node of a ring network or have a mesh-like connection. The network configuration of a ring network may be a redundant configuration in which two or more ring-shaped networks are provided. In the communication system 20 illustrated in FIG. 1, telecommunications company A may have a network configuration in which the connection between the gateways 3A and the base stations 1A-1 and 1A-2 is wireless communication. Similarly, in the communication system 20 illustrated in FIG. 1, telecommunications company B may have a network configuration in which the connection between the gateway 3B and the base station 1B is wired communication or wireless communication.

The vehicles 11 are each equipped with a communication terminal (not illustrated). In the communication system 20, the vehicle 11A can communicate with the base station 1A of telecommunications company A using the communication terminal, and the vehicle 11B can communicate with the base station 1B of telecommunications company B using the communication terminal. In the following explanation, communication terminals are omitted for brevity. Note that possible ways of communication between the vehicle 11 and the base station 1 include roaming, and the same applies hereinafter. The base stations 1A-1, 1A-2, and 1B need not use the same communication scheme and the same communication standard, and may use a combination of any of the example communication schemes and communication standards mentioned above. In FIG. 1, the traveling direction of the vehicle 11 is from left to right in the drawing as indicated by arrow 13.

Figure 2:
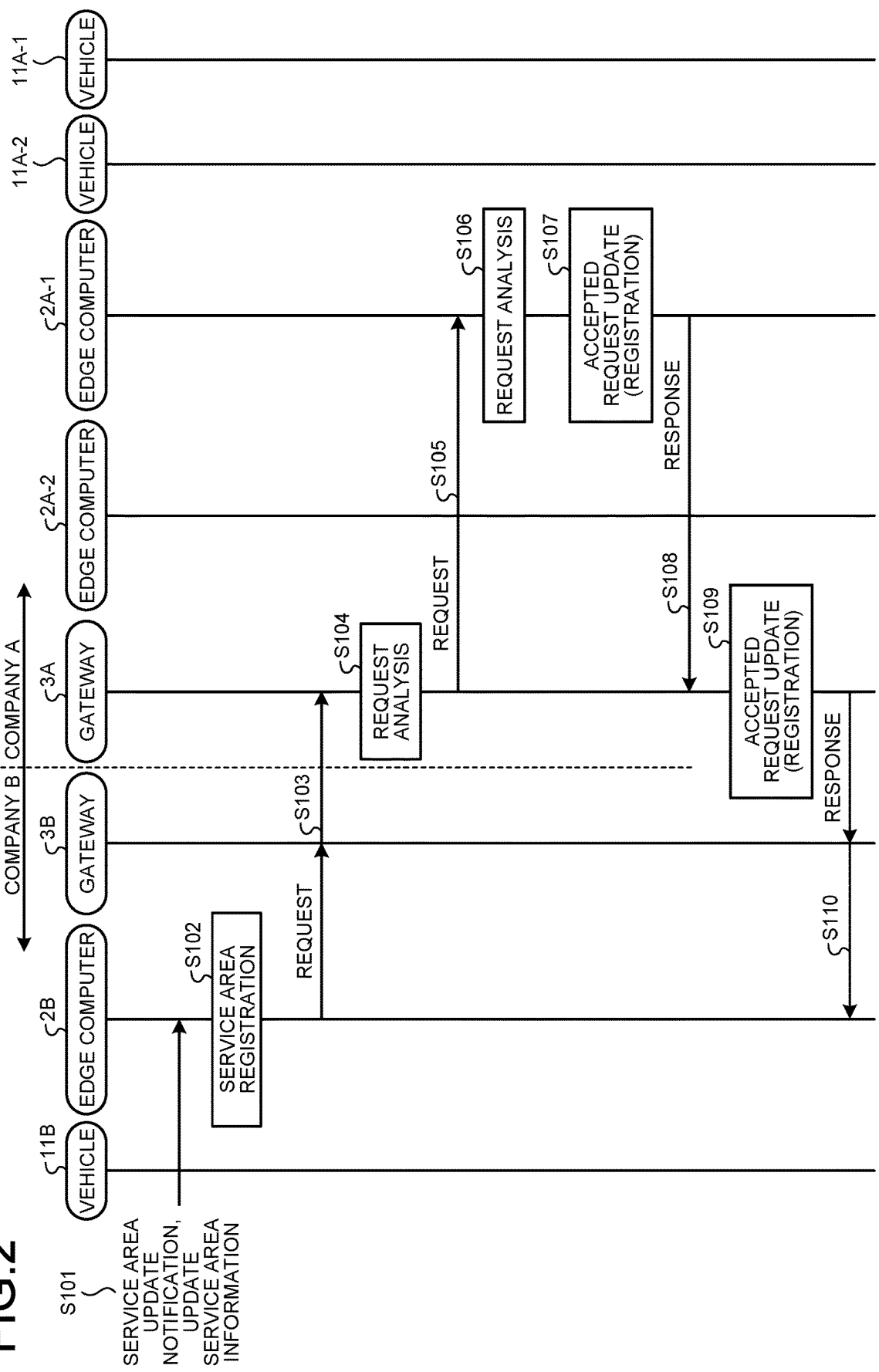
FIG. 2 is a sequence diagram illustrating an operation in which the edge computer of telecommunications company B requests telecommunications company A to share information in the communication system according to the first embodiment.

Next, the operation of each device provided in the communication system 20 will be described. Specifically, a method will be described in which, as illustrated in FIG. 1, when emergency information that hinders the traveling of the vehicle 11A-1, such as a traffic accident, a fallen object, a road cave-in, or freezing, occurs at a point 12 ahead in the traveling direction of the vehicle 11A-1, the vehicle 11A-1 sends the emergency information to other vehicles 11, or the vehicles 11B and 11A-2. First, an operation will be described in which the edge computer 2B of telecommunications company B sends a request message to the gateway 3A in order to request telecommunications company A to share emergency information, that is, to share information. FIG. 2 is a sequence diagram illustrating an operation in which the edge computer 2B of telecommunications company B requests telecommunications company A to share information in the communication system 20 according to the first embodiment.

The edge computer 2B accepts service area update notification and update service area information from a server (not illustrated in FIGS. 1 and 2) that manages the service area 4 (step S101). Service area update notification is notification serving as a trigger for generating a request message or the like in the receiver device. Update service area information is information including host information of the edge computer 2 connected to the base station 1 that provides the service area 4, region information of the service area 4 provided, and the like. Service area update notification and update service area information are sent from the above-described server that manages the service area 4 not only when the service area 4 is changed but also when a new service area 4 is constructed. The edge computer 2B may accept service area update notification not only from the above-described server that manages the service area 4 but also from an operator's (not illustrated in FIGS. 1 and 2) operation. The edge computer 2B performs a service area registration process on the accepted service area update notification and update service area information (step S102).

Triggered by the acceptance of the service area update notification and the update service area information, the edge computer 2B sends a request message (step S103). Note that a trigger for the request message (hereinafter referred to as the request (S103)) to be sent in step S103 from the edge computer 2B may be selectively input through manual operation on the edge computer 2B by the above-described operator. The gateway 3B receives the request (S103) sent from the edge computer 2B via the base station 1B (not illustrated in FIG. 2), and transfers the request (S103) to the gateway 3A. The gateway 3A receives the request (S103) transferred from the gateway 3B. In the following explanation, the involvement of the base station 1B is omitted for brevity.

Here, the request (S103) is a new information sharing demand. The request (S103) includes location information, a range from the location information, and an identifier. The region indicated by the location information and the range from the location information is the region in which the edge computer 2B requests information sharing: in the example of FIG. 1, the region coincident with the service area 4B including the point 12.

The location information is point information, and can be expressed by, for example, latitude and longitude, a coordinate point and the distance and direction from the coordinate point, and the like. A coordinate point can be the center of an intersection, a prescribed location on the roadway 10, the center or the center of gravity of the service area 4, or the like. Alternatively, a coordinate point may be specified by an identifier (ID) determined for each location such as the point of a specific latitude and longitude or an intersection, for example. It is desirable that the IDs of coordinate points be uniquely determined, but the same ID may be used throughout a defined area. The ID of a coordinate point may be provided for each traveling direction of the roadway 10; for example, in the case of the roadway 10 extending in the north-south direction, for each of the direction from south to north and the direction from north to south. The ID of a coordinate point may be provided for each lane in the case of the roadway 10 having a plurality of lanes, for example.

Regarding the distance and direction from a coordinate point, it is possible to represent a circle separated from the coordinate point by a specified distance expressed as a distance by which the vehicle 11 actually travels along the lane or the roadway 10 or as a straight-line distance from the coordinate point, and specify a point on the circle separated from the coordinate point by the specified distance with the direction as viewed from the coordinate point. The direction as viewed from the coordinate point can be expressed by an angle of up to 360 degrees with respect to the north, for example. In the case of the roadway 10 having a plurality of lanes, the location information may additionally include lane information from which the target lane is identifiable, or the traveling direction of the roadway 10. The traveling direction is, for example, in the case of the roadway 10 extending in the north-south direction, either or both of the direction from south to north and the direction from north to south.

In addition, the location information may include height information such as altitude, height above sea level, or height in a geodetic system such as the World Geodetic System. The addition of height information to the location information makes it possible to distinguish between roadways 10 that differ in the vertical direction such as elevated roads and underpasses. Height information can be height information of the location serving as the starting point of the range, average height information of the range, or the like. In addition, the location information may include a road ID determined for each roadway 10. It is desirable that road IDs be uniquely determined, but the same ID may be used throughout a defined area. The use of road IDs makes it possible to distinguish between elevated roads, underpasses, and the like. Note that the location information need not be on the roadway 10. In a case where the location information is expressed by a coordinate point and the distance and direction from the coordinate point, when the coordinate point and the location information coincide with each other, that is, when the distance from the coordinate point is zero, the distance from the coordinate point may be omitted. In addition, if the location information is determined in advance such that the coordinate point and the location information coincide with each other, the format need not include the distance from the coordinate point.

The range from the location information can be the distance from the reference point, that is, the radius of a circle centered on the reference point, or the diagonal vertex of a rectangle having the reference point as one vertex. In addition, another coordinate point, that is, an additionally designated coordinate point, may be designated in addition to the location information, so that the roadway 10 between the point of the location information and the additionally designated coordinate point can be set as the region in which information sharing is requested. In addition, the range from the location information may include height information such as altitude, height above sea level, or height in a geodetic system such as the World Geodetic System, as is the case with the above-described location information. The location information and the range from the location information generally include the region of the service area 4B of the base station 1B connected to the edge computer 2B which is the transmission source of the request message. The location information and the range from the location information may completely coincide with the service area 4B, or may coincide with only a partial region of the service area 4B. The location information and the range from the location information may include a region other than the service area 4B.

The identifier is that from which the request source of the request and the request message are identifiable. As the identifier, for example, a unique ID given from the server (not illustrated) may be used, or a value randomly determined from the range of sufficiently long hash values or sufficiently large values may be used. Note that the request source of the request is the same as the transmission source of the request.

In a case where the hypertext transfer protocol (http) protocol or the hypertext transfer protocol secure (https) protocol is used for the communication interface between the gateway 3 and the edge computer 2, a uniform resource identifier (URI) or a uniform resource locator (URL) configured by host information and a path may be used as the identifier. In the following explanation, for brevity, the http protocol or the https protocol is simply referred to as the http protocol, and a URI or a URL is simply referred to as a URL. In the case of using the http protocol and using a URL as the identifier, the host information is the host name or the Internet Protocol (IP) address of the request source, and the path is a path corresponding to the request message. In the case of using the http protocol and using a URL as the identifier, the identifier can be used as what is called a callback URL.

Those having the same location information and range from the location information may have the same path. In this case, if requests are sent to a plurality of telecommunications companies, the same URL is sent to the plurality of telecommunications companies as the identifier. Different paths may be used for different requests, for example, when a request is made to telecommunications company C (not illustrated). A path may include the location information and the range from the location information.

In cases where one service area 4 includes a plurality of intersections, or where location information and a range from the location information are designated for each intersection, the edge computer 2 may add multiple pieces of location information and ranges from the multiple pieces of location information to the request.

The edge computer 2 may be that which performs processing according to the Multi-access Edge Computing (MEC) that has been standardized by the European Telecommunications Standards Institute (ETSI), or may be a computer, a server, or the like that uniquely defines an interface and performs processing.

In the sequence diagram illustrated in FIG. 2, the gateway 3A performs a request analysis process on the received request (S103) (step S104). As the request analysis process, the gateway 3A compares service area region information of telecommunications company A with the region specified by the location information and the range from the location information included in the request (S103). The gateway 3A determines whether the region specified by the location information and the range from the location information included in the request (S103) is included in the service area 4A of telecommunications company A. In response to determining that the region specified by the location information and the range from the location information included in the request (S103) is included in the service area 4A of telecommunications company A, the gateway 3A designates, as the final request destination, the edge computer 2A-1 connected to the base station 1A-1 that provides the service area 4A-1 corresponding to the region specified by the location information and the range from the location information included in the request (S103). Note that in the determination of whether the region specified by the location information and the range from the location information included in the request (S103) is included in the service area 4A of telecommunications company A, the gateway 3A may regard "partially included" as "included".

The gateway 3A newly sends a request message to the edge computer 2A-1 designated as the edge computer 2A in charge in the network of telecommunications company A to which the gateway 3A belongs through the request analysis (step S105). The gateway 3A adds location information, a range from the location information, and an identifier to the request message (hereinafter referred to as the request (S105)) to be sent in step S105.

The edge computer 2A-1 receives the request (S105) sent from the gateway 3A via the base station 1A-1 (not illustrated in FIG. 2). In the following explanation, the involvement of the base station 1A-1 is omitted for brevity. In order to distinguish between the identifier included in the request (S103) and the identifier included in the request (S105), the identifier included in the request (S103) is hereinafter referred to as identifier #1, and the identifier included in the request (S105) is hereinafter referred to as identifier #2. Identifier #1 and identifier #2 may be the same or different. However, in the case of using the http protocol and using a URL as an identifier, identifier #1 and identifier #2 are different identifiers because the request sources of the requests are different. The location information and the range from the location information included in the request (S105) may be the same as the location information and the range from the location information included in the request (S103), or may be limited only to the service area 4A-1 provided by the edge computer 2A-1 through the request analysis process of the gateway 3A.

The edge computer 2A-1 performs a request analysis process on the received request (S105) (step S106). As the request analysis process, the edge computer 2A-1 determines whether the region specified by the location information and the range from the location information included in the request (S105) is included in the service area 4A-1. In response to determining that the region specified by the location information and the range from the location information included in the request (S105) is included in the service area 4A-1, the edge computer 2A-1 performs an accepted request update process (step S107). Specifically, the edge computer 2A-1 performs a process of registering the information included in the request (S105). Note that in the determination of whether the region specified by the location information and the range from the location information included in the request (S105) is included in the service area 4A-1, the edge computer 2A-1 may regard "partially included" as "included".

The edge computer 2A-1 sends a response message to the request (S105) to the gateway 3A that has sent the request (S105) (step S108).

The gateway 3A receives the response message (hereinafter referred to as the response (S108)) sent in step S108 from the edge computer 2A-1. If the response (S108) is a response indicating a request success, the gateway 3A performs an accepted request update process for the request (S103) (step S109). Specifically, the gateway 3A performs a process of registering the information included in the request (S103). The gateway 3A sends a response message to the request (S103) (step S110).

The gateway 3B transfers, to the edge computer 2B, the response message (hereinafter referred to as the response (S110)) sent in step S110 from the gateway 3A. The edge computer 2B receives the response (S110) transferred from the gateway 3B.

Note that in order for the edge computer 2B to specify multiple pieces of location information and ranges from the location information in the sequence diagram illustrated in FIG. 2, the edge computer 2B may send a request message equivalent to the request (S103) a plurality of times by designating telecommunications company A as the destination.

Figure 3:
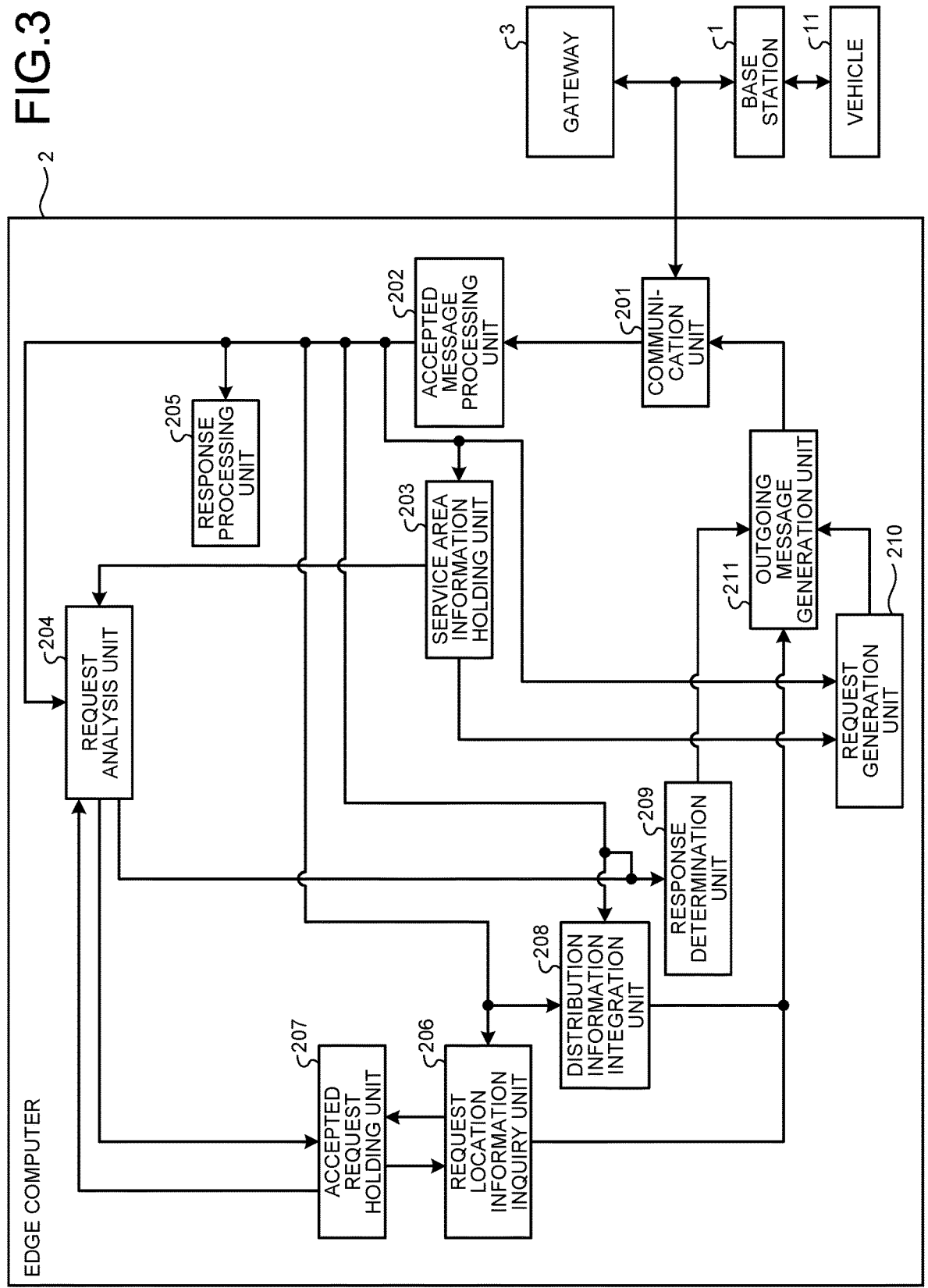
FIG. 3 is a block diagram illustrating an exemplary configuration of an edge computer according to the first embodiment.
Figure 4:
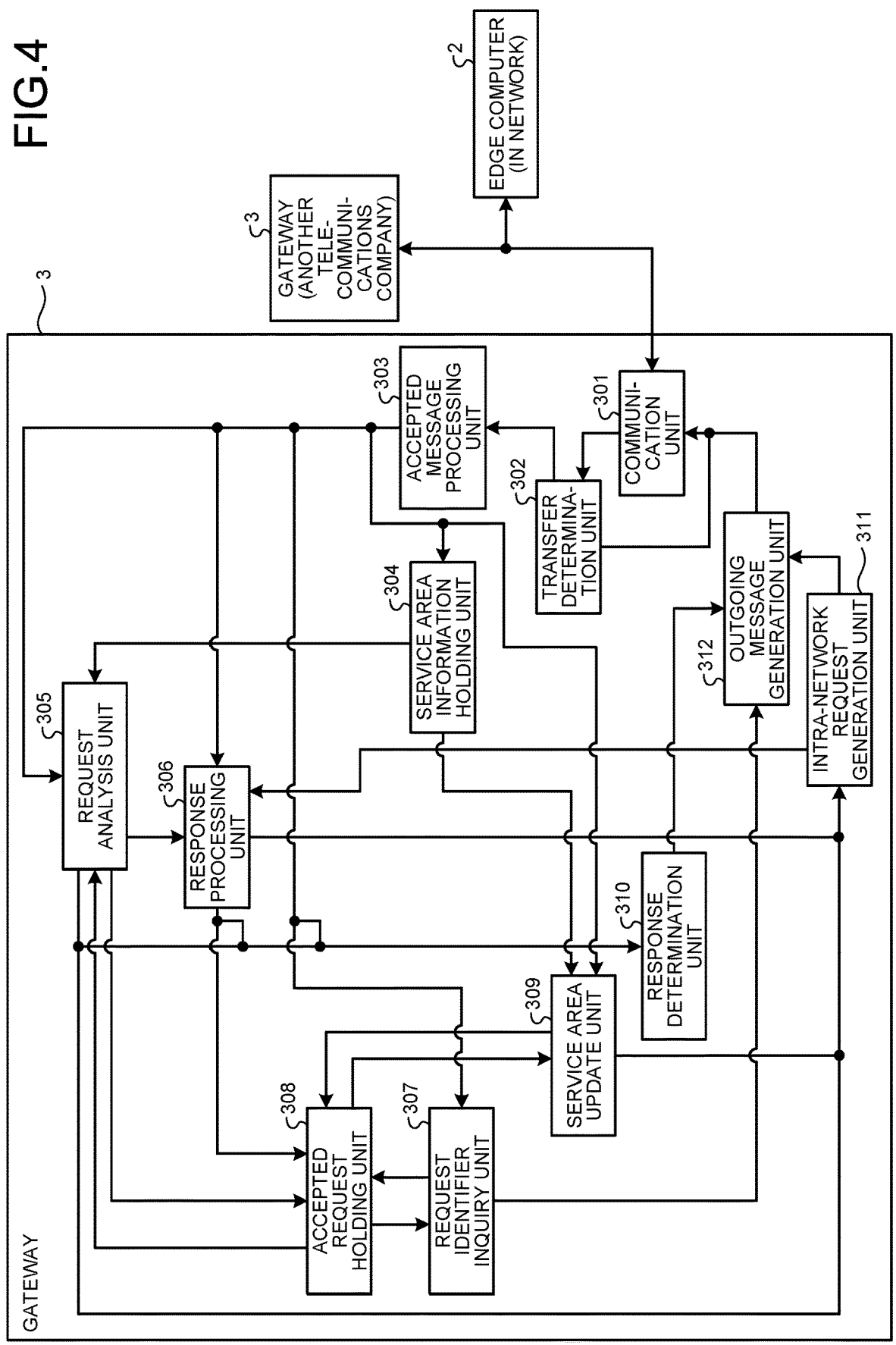
FIG. 4 is a block diagram illustrating an exemplary configuration of a gateway according to the first embodiment.

The operation of the sequence diagram illustrated in FIG. 2 will be described in detail using the configuration of each device. FIG. 3 is a block diagram illustrating an exemplary configuration of the edge computer 2 according to the first embodiment. The edge computer 2 includes a communication unit 201, an accepted message processing unit 202, a service area information holding unit 203, a request analysis unit 204, a response processing unit 205, a request location information inquiry unit 206, an accepted request holding unit 207, a distribution information integration unit 208, a response determination unit 209, a request generation unit 210, and an outgoing message generation unit 211. FIG. 4 is a block diagram illustrating an exemplary configuration of the gateway 3 according to the first embodiment. The gateway 3 includes a communication unit 301, a transfer determination unit 302, an accepted message processing unit 303, a service area information holding unit 304, a request analysis unit 305, a response processing unit 306, a request identifier inquiry unit 307, an accepted request holding unit 308, a service area update unit 309, a response determination unit 310, an intra-network request generation unit 311, and an outgoing message generation unit 312.

In step S101 of the sequence diagram illustrated in FIG. 2, the edge computer 2B accepts service area update notification and update service area information from the above-described server that manages the service area 4. The communication unit 201 receives the service area update notification and the update service area information. The communication unit 201 outputs the received service area update notification and update service area information to the accepted message processing unit 202. The accepted message processing unit 202 unencapsulates the data included in the update service area information using the Transmission Control Protocol (TCP)/IP protocol, the User Datagram Protocol (UDP)/IP protocol, or the like, extracts data from the body, header, and the like of the http message, and outputs the extracted data to the service area information holding unit 203. The accepted message processing unit 202 also unencapsulates the data included in the service area update notification using the TCP/IP protocol, the UDP/IP protocol, or the like, extracts data from the body, header, and the like of the http message, and outputs the extracted data to the request generation unit 210.

In this way, the accepted message processing unit 202 actually outputs the data extracted from the message to the subsequent-stage components; however, for brevity, the following explanation uses the expressions that the accepted message processing unit 202 outputs the update service area information to the service area information holding unit 203, and the accepted message processing unit 202 outputs the service area update notification to the request generation unit 210. The service area information holding unit 203 acquires the update service area information from the accepted message processing unit 202. The request generation unit 210 acquires the service area update notification from the accepted message processing unit 202.

The service area information holding unit 203 holds the update service area information. If the content of the newly acquired update service area information is different from the content of the held update service area information, the service area information holding unit 203 updates the held update service area information. The service area information holding unit 203 outputs service area region information and host information. In the edge computer 2B, the service area region information is region information of the service area 4B. The host information is information included in the update service area information, as described above. The service area information holding unit 203 is implemented by, for example, a database such as a list-type table or a relational database.

Triggered by the service area update notification, the request generation unit 210 determines the region in which information sharing is requested and identifier #1 on the basis of the service area region information acquired from the service area information holding unit 203. The request generation unit 210 converts the region in which information sharing is requested into location information and a range from the location information. The request generation unit 210 outputs the location information and the range from the location information obtained through conversion, identifier #1 determined, and the host information acquired from the service area information holding unit 203. The service area region information acquired from the service area information holding unit 203 and the region in which information sharing is requested may coincide with each other or partially coincide with each other. In this manner, the request generation unit 210 generates and outputs a request including the location information and the range from the location information specifying the region in which information sharing is requested, and the identifier from which the demander that requests information sharing is identifiable. In the edge computer 2, a request generated internally by the request generation unit 210 may be referred to as a first request.

The region in which information sharing is requested may be determined in advance by the above-described operator's input, or may be input from an external server (not illustrated). In these cases, the service area information holding unit 203 need not be inside the edge computer 2B, and can be implemented by an external server functioning as the service area information holding unit 203 and the edge computer 2B making an inquiry to the external server. In the present embodiment, the gateway 3B also includes the service area information holding unit 304. Therefore, the gateway 3B may function as an external server.

The outgoing message generation unit 211 converts the acquired request, namely the location information, the range from the location information, and identifier #1, into a format in which the request can be sent, and generates a request message. In the case of wired communication or wireless communication, the outgoing message generation unit 211 generates the data encapsulated in a frame based on the stack of the TCP/IP protocol, the UDP/IP protocol, or the like. In the case of using the http protocol, the outgoing message generation unit 211 also generates an http message, for example, the POST method, the PUT method, or the like. In the case of using the http protocol, data that is sent in an http message, specifically the location information and the range from the location information, can be referred to as a resource representation. The outgoing message generation unit 211 may describe the location information and the range from the location information in a data format such as JavaScript (registered trademark) Object Notation (JSON) or Extensible Markup Language (XML).

In addition, the outgoing message generation unit 211 adds the host information of the request source, namely the edge computer 2B, to the request message. The host information of the request source is, for example, an IP address, a host name, an ID unique to each telecommunications company, an edge computer ID unique within the telecommunications company, or the like. In the case of using the http protocol and using a URL as the identifier, as described above, if identifier #1 is a callback URL, the outgoing message generation unit 211 need not add the host information of the request source to the output message as information different from identifier #1. In addition, in the case of using the TCP/IP protocol, the UDP/IP protocol, or the like, because the host information of the request source is included in the IP header, the outgoing message generation unit 211 need not add the host information of the request source to the output message as information different from identifier #1. The same applies hereinafter regarding the host information of the request source in the outgoing message generation unit 211. The outgoing message generation unit 211 outputs the request message to the communication unit 201.

Note that it is possible that the edge computer 2B fixedly holds the destination of request messages. In this case, it is assumed that the destination of request messages is agreed between telecommunications company A and telecommunications company B. In the example of the sequence diagram illustrated in FIG. 2, the destination of the request message from telecommunications company B to telecommunications company A is the gateway 3A. Alternatively, the destination of request messages may be determined by the edge computer 2B making an inquiry to a Domain Name System (DNS) server (not illustrated). The function of the DNS server may be provided in the edge computer 2B.

The communication unit 201 sends the request message acquired from the outgoing message generation unit 211 from the edge computer 2B to the base station 1B via a communication medium. The communication medium may be Ethernet (registered trademark), Asynchronous Transfer Mode (ATM), or the like in the case of wired communication, but may be wireless communication. The base station 1B sends the request message to the gateway 3. In the following explanation, the communication medium and the base station 1 are omitted for brevity. Here, the request message sent from the edge computer 2B is the request (S103) illustrated in the sequence diagram of FIG. 2.

The gateway 3B is on the path from the edge computer 2B to the gateway 3A. In the gateway 3B, the communication unit 301 receives the request (S103) sent from the edge computer 2B. The communication unit 301 outputs the received request (S103) to the transfer determination unit 302. The transfer determination unit 302 determines whether the request (S103) received by the communication unit 301 should be processed in the gateway 3B or transferred. Here, since the destination of the request (S103) sent from the edge computer 2B is the gateway 3A, the transfer determination unit 302 determines to transfer the request (S103). The transfer determination unit 302 outputs the request (S103) to the communication unit 301.

In this manner, the transfer determination unit 302 of the gateway 3B determines to transfer a first request to the gateway 3A operated by a second telecommunications company, the first request being a request sent from the edge computer 2 operated by the same first telecommunications company, and including location information and a range from the location information specifying a region in which information sharing is requested, and an identifier from which a demander that requests the information sharing is identifiable. For the gateway 3B, the first telecommunications company is telecommunications company B, and the second telecommunications company is telecommunications company A. For the gateway 3B, the first request is a request sent from the edge computer 2B operated by telecommunications company B which is the same first telecommunications company. The communication unit 301 sends, or transfers, the request (S103) acquired from the transfer determination unit 302 to the gateway 3A. The function of the communication unit 301 is the same as the function of the communication unit 201 of the edge computer 2 illustrated in FIG. 3.

In the gateway 3A, the communication unit 301 receives the request (S103) transferred from the gateway 3B, and outputs the request (S103) to the transfer determination unit 302. The transfer determination unit 302 determines whether the request (S103) received by the communication unit 301 should be processed in the gateway 3A or transferred. Here, since the destination of the request (S103) transferred from the gateway 3B is the gateway 3A, the transfer determination unit 302 determines that the request (S103) should be processed in the gateway 3A. The transfer determination unit 302 outputs the request (S103) to the accepted message processing unit 303.

The accepted message processing unit 303 unencapsulates the data included in the request (S103) using the TCP/IP protocol, the UDP/IP protocol, or the like, extracts data from the body, header, and the like of the http message, and outputs the request (S103), namely the location information, the range from the location information, and identifier #1, to the request analysis unit 305. If identifier #1 is not set as a callback URL in the http protocol, the accepted message processing unit 303 also outputs the host information of the request source, specifically the edge computer 2B, to the request analysis unit 305. Note that the accepted message processing unit 303 performs the processing similar to that performed by the accepted message processing unit 202 of the edge computer 2 described above, and thus will be described with concise expressions similarly to the accepted message processing unit 202.

The request analysis unit 305 compares the service area region information of telecommunications company A acquired from the service area information holding unit 304 with the region specified by the location information and the range from the location information included in the request (S103) acquired from the accepted message processing unit 303. The request analysis unit 305 determines whether the region specified by the location information and the range from the location information included in the request (S103) is included in the service area 4A of telecommunications company A. Note that in the determination of whether the region specified by the location information and the range from the location information included in the request (S103) is included in the service area 4A of telecommunications company A, the request analysis unit 305 may regard "partially included" as "included".

In response to determining that the region specified by the location information and the range from the location information included in the request (S103) is included in the service area 4A of telecommunications company A, the request analysis unit 305 checks whether the request (S103), specifically a record matching identifier #1 or the location information and the range from the location information, has been registered in the accepted request holding unit 308. The request analysis unit 305 outputs the location information, the range from the location information, and identifier #1 to the accepted request holding unit 308 in order to check whether the request (S103) has been registered in the accepted request holding unit 308. If identifier #1 is not set as a callback URL in the http protocol, the request analysis unit 305 also outputs the host information of the request source to the accepted request holding unit 308 in the checking of whether the request (S103) has been registered in the accepted request holding unit 308.

In response to determining that the region specified by the location information and the range from the location information included in the request (S103) is not included in the service area 4A of telecommunications company A, the request analysis unit 305 outputs, to the response determination unit 310, an error indicating that the region is not included. If the request (S103) has already been registered in the accepted request holding unit 308, the request analysis unit 305 can output an indication of either success or failure to the response determination unit 310, regarding the demand based on the request (S103) as an error. However, in the case of failure, the output from the response determination unit 310 desirably includes information indicating that the reason for the error is the existence of the registered request. In the case of the request error, the gateway 3A does not send the request (S105) illustrated in FIG. 2, but sends the response (S110) through processing in the response determination unit 310, the outgoing message generation unit 312, and the communication unit 301 to provide request result notification.

In response to determining that the region specified by the location information and the range from the location information included in the request (S103) is included in the service area 4A of telecommunications company A and the request (S103) has not been registered in the accepted request holding unit 308, the request analysis unit 305 outputs, to the intra-network request generation unit 311, the location information, the range from the location information, and the host information of the edge computer 2A-1 connected to the base station 1A-1 that provides the corresponding service area 4A-1.

In response to determining that the region specified by the location information and the range from the location information included in the request (S103) is not included in the service area 4A of telecommunications company A, the request analysis unit 305 outputs nothing to the intra-network request generation unit 311, regarding the request as an error. In response to determining that the request (S103) has been registered in the accepted request holding unit 308, the request analysis unit 305 outputs nothing to the intra-network request generation unit 311. In this manner, the request analysis unit 305 analyzes a second request that is an information sharing demand from the edge computer 2B operated by the second telecommunications company, and determines whether the region specified by the second request is included in the service area of the first telecommunications company. For the gateway 3A, the first telecommunications company is telecommunications company A, and the second telecommunications company is telecommunications company B. For the gateway 3A, the second request is a request sent from the edge computer 2B operated by telecommunications company B which is another second telecommunications company.

The intra-network request generation unit 311 determines identifier #2, and outputs identifier #2, the location information, the range from the location information, and the host information of the destination edge computer acquired to the outgoing message generation unit 312 as a request message. The intra-network request generation unit 311 also outputs identifier #2 to the response processing unit 306. In this manner, the intra-network request generation unit 311 of the gateway 3A generates a request for one or more edge computers 2A operated by telecommunications company A that is the first telecommunications company in a case where the region specified by the second request is included in the service area of the first telecommunications company, the request including the location information, the range from the location information, and an identifier from which the gateway 3A is identifiable.

The outgoing message generation unit 312 designates the host information of the edge computer 2, specifically the edge computer 2A-1, as the destination, converts identifier #2 acquired and the location information and the range from the location information acquired into a format in which these can be sent, and generates a request message. The outgoing message generation unit 312 outputs the generated request message to the communication unit 301. Note that the outgoing message generation unit 312 of the gateway 3 and the outgoing message generation unit 211 of the edge computer 2 handle different information, but the function of generating messages itself is the same for both the outgoing message generation unit 312 of the gateway 3 and the outgoing message generation unit 211 of the edge computer 2.

The communication unit 301 sends the request message acquired from the outgoing message generation unit 312 by designating the edge computer 2A-1 as the destination. Here, the request message sent from the gateway 3A is the request (S105) illustrated in the sequence diagram of FIG. 2. Note that the communication unit 301 of the gateway 3 and the communication unit 201 of the edge computer 2 handle different messages, but the function of sending and receiving messages itself is the same for both the communication unit 301 of the gateway 3 and the communication unit 201 of the edge computer 2.

In the edge computer 2A-1, the communication unit 201 receives the request (S105) sent from the gateway 3A. The communication unit 201 outputs the received request (S105) to the accepted message processing unit 202. The accepted message processing unit 202 outputs the request (S105), specifically the location information, the range from the location information, and identifier #2 included in the request (S105), to the request analysis unit 204. If identifier #2 is not set as a callback URL in the http protocol, the accepted message processing unit 202 also outputs the host information of the request source, specifically the gateway 3A, to the request analysis unit 204.

The request analysis unit 204 performs the processing similar to that performed by the request analysis unit 305 of the gateway 3, except for some differences such as the output destination of information. The request analysis unit 204 compares the service area region information of the base station 1A-1 acquired from the service area information holding unit 203, that is, the service area 4A-1, with the region specified by the location information and the range from the location information included in the request (S105) acquired from the accepted message processing unit 202. The request analysis unit 204 determines whether the region specified by the location information and the range from the location information included in the request (S105) is included in the service area 4A-1. Note that in the determination of whether the region specified by the location information and the range from the location information is included in the service area 4A-1, the request analysis unit 204 may regard "partially included" as "included".

In response to determining that the region specified by the location information and the range from the location information included in the request (S105) is included in the service area 4A-1, the request analysis unit 204 checks whether the request (S105), specifically a record matching identifier #2 or the location information and the range from the location information, has been registered in the accepted request holding unit 207. The request analysis unit 204 outputs the location information, the range from the location information, and identifier #2 to the accepted request holding unit 207 in order to check whether the request (S105) has been registered in the accepted request holding unit 207. If identifier #2 is not set as a callback URL in the http protocol, the request analysis unit 204 also outputs the host information of the request source to the accepted request holding unit 207 in the checking of whether the request (S105) has been registered in the accepted request holding unit 207.

The request analysis unit 204 outputs, to the response determination unit 209, the result of the determination of whether the region specified by the location information and the range from the location information included in the request (S105) is included in the service area 4A-1. If the request (S105) has already been registered in the accepted request holding unit 207, the request analysis unit 204 can output an indication of either success or failure to the response determination unit 209. However, in the case of failure, the output from the response determination unit 209 desirably includes information indicating that the reason for the error is the existence of the registered request. The request analysis unit 204 may skip the determination of whether the region specified by the location information and the range from the location information included in the request (S105) is included in the service area 4A-1, since the request (S105) has been sent to the edge computer 2A-1 as a result of the same determination in the gateway 3A.

In the present embodiment, the request (S105) with identifier #2 has not been registered; therefore, the accepted request holding unit 207 registers the location information, the range from the location information, and identifier #2 acquired from the request analysis unit 204. If identifier #2 is not set as a callback URL in the http protocol, the accepted request holding unit 207 also registers the host information of the request source. These operations in the accepted request holding unit 207 are equivalent to an operation that is also called resource generation in the case of using the http protocol.

In this manner, the accepted request holding unit 207 holds a request based on an information sharing demand from another edge computer 2 in a case where shared information regarding the region specified by the location information and the range from the location information included in the request is sendable in response to the request. Here, the request based on an information sharing demand from another edge computer 2 is the request (S105) sent from the gateway 3A in response to the request (S103) from the edge computer 2B. In the edge computer 2, a request generated by another device may be referred to as a second request. In the edge computer 2A-1, the request analysis unit 204 analyzes the content of the second request, and causes the accepted request holding unit 207 to hold the second request in a case where shared information is sendable in response to the second request. In the present embodiment, the identifier held in the accepted request holding unit 207 is identifier #2 given by the gateway 3A which is a communication device installed on the communication path between the edge computer 2A-1 and the edge computer 2B and operated by the same telecommunications company A as the edge computer 2A-1.

The response determination unit 209 outputs as a response, to the outgoing message generation unit 211, the result, acquired from the request analysis unit 204, of the determination of whether the region specified by the location information and the range from the location information included in the request (S105) is included in the service area 4A-1. The result that the region specified by the location information and the range from the location information included in the request (S105) is included in the service area 4A-1 means the success of the request (S105); therefore, the response determination unit 209 outputs a message of status code 2xx using the http protocol. The message of status code 2xx is exemplified by status code 200 OK, status code 201 Created provided that the processing in the accepted request holding unit 207 is considered as resource generation, status code 202 Accepted, or status code 204 No Content.

The result that the region specified by the location information and the range from the location information included in the request (S105) is not included in the service area 4A-1 means the failure, or error, of the request (S105); therefore, the response determination unit 209 outputs a message of status code 5xx or status code 4xx using the http protocol. The message of status code 5xx is exemplified by status code 500 Internal Server Error, status code 503 Service Unavailable, status code 507 Insufficient Storage, or status code 509 Bandwidth Limit Exceeded. The message of status code 4xx is exemplified by status code 400 Bad Request, status code 403 Forbidden, status code 404 Not Found, status code 422 Unprocessable Entity, or status code 429 Too Many Requests.

In addition, in the case of using the http protocol, the response determination unit 209 may add an URL corresponding to the location information and the range from the location information registered in the accepted request holding unit 207 to the Location portion of the http response header. The addition of the URL to the http response body allows the edge computer 2 to easily update the location information and the range from the location information using the PUT method, PATCH method, UPDATE method, or the like of the http protocol, or cancel the information sharing demand with the DELETE method. In this manner, the response determination unit 209 generates a response to the second request on the basis of the analysis result of the request analysis unit 204.

The outgoing message generation unit 211 and the communication unit 201 handle different information and messages, but send a response message to the request (S105) in a similar manner to the outgoing message generation unit 312 and the communication unit 301 of the gateway 3A described above. Here, the response message sent from the edge computer 2A-1 is the response (S108) illustrated in the sequence diagram of FIG. 2.

In the gateway 3A, the communication unit 301 receives the response (S108) sent from the edge computer 2A-1, and outputs the response (S108) to the transfer determination unit 302. The transfer determination unit 302 determines whether the response (S108) should be processed in the gateway 3A or transferred. Here, since the destination of the response (S108) sent from the edge computer 2A-1 is the gateway 3A, the transfer determination unit 302 determines that the response (S108) should be processed in the gateway 3A. The transfer determination unit 302 outputs the response (S108) to the accepted message processing unit 303. The accepted message processing unit 303 outputs the response (S108) to the response processing unit 306.

In order to send a response message to the request (S103), the response processing unit 306 outputs the result, included in the response (S108), of whether the edge computer 2A-1 has accepted the request (S105) to the response determination unit 310. Furthermore, if the result of the response (S108) indicates a request success, the response processing unit 306 outputs, as a process for the request (S103), the location information, the range from the location information, and identifier #1 included in the request (S103) acquired from the request analysis unit 305, and the host information of the request source, specifically the edge computer 2B, to the accepted request holding unit 308. The response processing unit 306 also outputs identifier #2 acquired from the intra-network request generation unit 311 to the accepted request holding unit 308. If the result of the response (S108) indicates a request error, the response processing unit 306 outputs nothing to the accepted request holding unit 308.

Note that in a case where a plurality of requests are made simultaneously in parallel, the gateway 3A needs to identify which request the response (S108) corresponds to; for example, the identification is achieved with a method such as session management or connection management which is generally performed when http, TCP, UDP, or the like is used, or by adding identifier #2 to the response (S108).

The accepted request holding unit 308 registers the location information, the range from the location information, and identifier #1 included in the request (S103), and further registers identifier #2 and the host information of the request destination, namely the edge computer 2A-1. If identifier #1 is not set as a callback URL in the http protocol, the accepted request holding unit 308 also registers the host information of the edge computer 2B as the request source.

The response determination unit 310 outputs the result as to whether the request (S103) is successful or an error to the outgoing message generation unit 312 as a response. If the request (S103) is successful, that is, if the response (S108) indicates a request success, the response determination unit 310 outputs a request success to the outgoing message generation unit 312 as a response. If the request (S103) is an error, that is, if the response (S108) indicates a request error, the response determination unit 310 outputs a request error to the outgoing message generation unit 312 as a response. In addition, if the request analysis unit 305 determines that the region specified by the location information and the range from the location information included in the request (S103) is not included in the service area region information of telecommunications company A even partially, the response determination unit 310 also outputs a request error to the outgoing message generation unit 312 as a response. In this manner, the response determination unit 310 generates a response to the second request. For the gateway 3A, the second request is a request sent from the edge computer 2B operated by telecommunications company B which is another second telecommunications company. Note that the response determination unit 310 of the gateway 3 and the response determination unit 209 of the edge computer 2 handle different information, but the function itself is the same for both the response determination unit 310 of the gateway 3 and the response determination unit 209 of the edge computer 2.

The outgoing message generation unit 312 designates the request source of the request (S103), specifically the edge computer 2B, as the destination, converts the result of the request acquired from the response determination unit 310, that is, the response, into a format in which the response can be sent, generates a response message to the request (S103), and outputs the response message to the communication unit 301. The communication unit 301 sends the response message acquired from the outgoing message generation unit 312 by designating the edge computer 2B as the destination. Here, the response message sent from the gateway 3A is the response (S110) illustrated in the sequence diagram of FIG. 2.

In the edge computer 2B, the communication unit 201 receives the response (S110) sent from the gateway 3A, and outputs the response (S110) to the accepted message processing unit 202. The accepted message processing unit 202 outputs the response (S110) to the response processing unit 205. The response processing unit 205 ends the series of processes for the request (S103). It is possible that the response processing unit 205 performs some sort of process that depends on whether the transmission or request is successful or not, e.g. a process of sending the request (S103) again in the case of transmission failure, but the response processing unit 205 does not perform any specific process on the response (S110).

Figure 5:
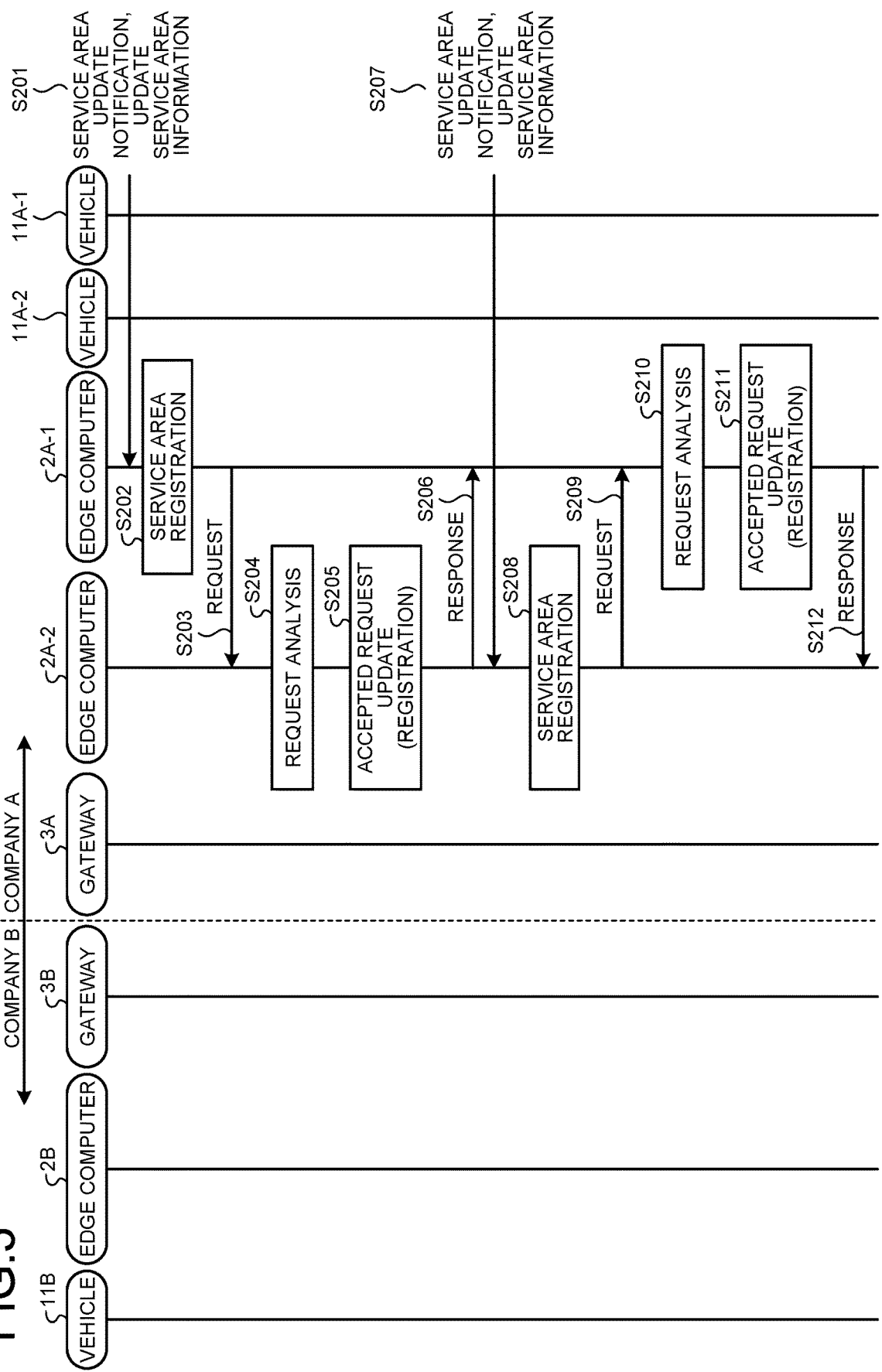
FIG. 5 is a sequence diagram illustrating an operation in which information sharing is requested between edge computers in the communication system according to the first embodiment.

Next, an operation in which information sharing is requested between the edge computers 2A-1 and 2A-2 will be described. FIG. 5 is a sequence diagram illustrating an operation in which information sharing is requested between the edge computers 2A-1 and 2A-2 in the communication system 20 according to the first embodiment.

The edge computer 2A-1 accepts service area update notification and update service area information from the above-described server (not illustrated in FIGS. 1 and 5) that manages the service area 4 (step S201). The edge computer 2A-1 performs a service area registration process on the accepted service area update notification and update service area information (step S202). Triggered by the input of the service area update notification and the update service area information, the edge computer 2A-1 sends a request message in a similar manner to the edge computer 2B illustrated in the sequence diagram of FIG. 2 (step S203).

The edge computer 2A-2 receives the request message (hereinafter referred to as the request (S203)) sent in step S203 from the edge computer 2A-1. The edge computer 2A-2 performs a request analysis process on the received request (S203) (step S204), and performs an accepted request update process (step S205). Specifically, the edge computer 2A-2 performs a process of registering the information included in the request (S203). The edge computer 2A-2 sends a response message to the request (S203) to the edge computer 2A-1 that has sent the request (S203) (step S206).

The edge computer 2A-1 receives the response message (hereinafter referred to as the response (S206)) sent in step S206 from the edge computer 2A-2.

Similarly, the edge computer 2A-2 accepts service area update notification and update service area information from the above-described server (not illustrated in FIGS. 1 and 5) that manages the service area 4 (step S207). The edge computer 2A-2 performs a service area registration process on the accepted service area update notification and update service area information (step S208). Triggered by the input of the service area update notification and the update service area information, the edge computer 2A-2 sends a request message in a similar manner to the edge computer 2A-1 described above (step S209).

The edge computer 2A-1 receives the request message (hereinafter referred to as the request (S209)) sent in step S209 from the edge computer 2A-2. The edge computer 2A-1 performs a request analysis process on the received request (S209) (step S210), and performs an accepted request update process (step S211). Specifically, the edge computer 2A-1 performs a process of registering the information included in the request (S209). The edge computer 2A-1 sends a response message to the request (S209) to the edge computer 2A-2 that has sent the request (S209) (step S212).

The edge computer 2A-2 receives the response message (hereinafter referred to as the response (S212)) sent in step S212 from the edge computer 2A-1.

In the sequence diagram illustrated in FIG. 5, the operation of each component in the edge computers 2A-1 and 2A-2 is similar to the above-described operation of the edge computer 2B, except for the destination of each message. Therefore, a detailed description using the configuration of each device will be omitted. In the sequence diagram illustrated in FIG. 5, the identifier included in the request (S203) sent from the edge computer 2A-1 is referred to as identifier #3, and the identifier included in the request (S209) sent from the edge computer 2A-2 is referred to as identifier #4. The target of the requests that the edge computers 2A-1 and 2A-2 send in the operation of the sequence diagram illustrated in FIG. 5 is the adjacent service area 4A, the service area 4A in the traveling direction of the roadway 10, the service area 4 on the same roadway 10, and the like. Therefore, the edge computers 2A-1 and 2A-2 can identify the edge computer 2 to request information sharing, that is, the destination, because the edge computers 2A-1 and 2A-2, which are operated by the same telecommunications company, know the configuration of the service area 4. It is assumed that the edge computers 2A-1 and 2A-2 send a request similar to the request (S103) to the identified edge computer 2.

In the sequence diagram illustrated in FIG. 5, it is assumed that the edge computer 2A-1 corresponding to the base station 1A-1 and the service area 4A-1 designates the service area 4A-2 as a designated region for information sharing. It is also assumed that the edge computer 2A-2 corresponding to the base station 1A-2 and the service area 4A-2 designates the service area 4A-1 as a designated region for information sharing. Note that the communication system 20 may perform either the operation of the sequence diagram illustrated in FIG. 2 or the operation of the sequence diagram illustrated in FIG. 5 first, or may perform the operations simultaneously in parallel. In addition, the communication system 20 may reverse the execution order of the request (S203) and the request (S209) in the operation of the sequence diagram illustrated in FIG. 5.

Figure 6:
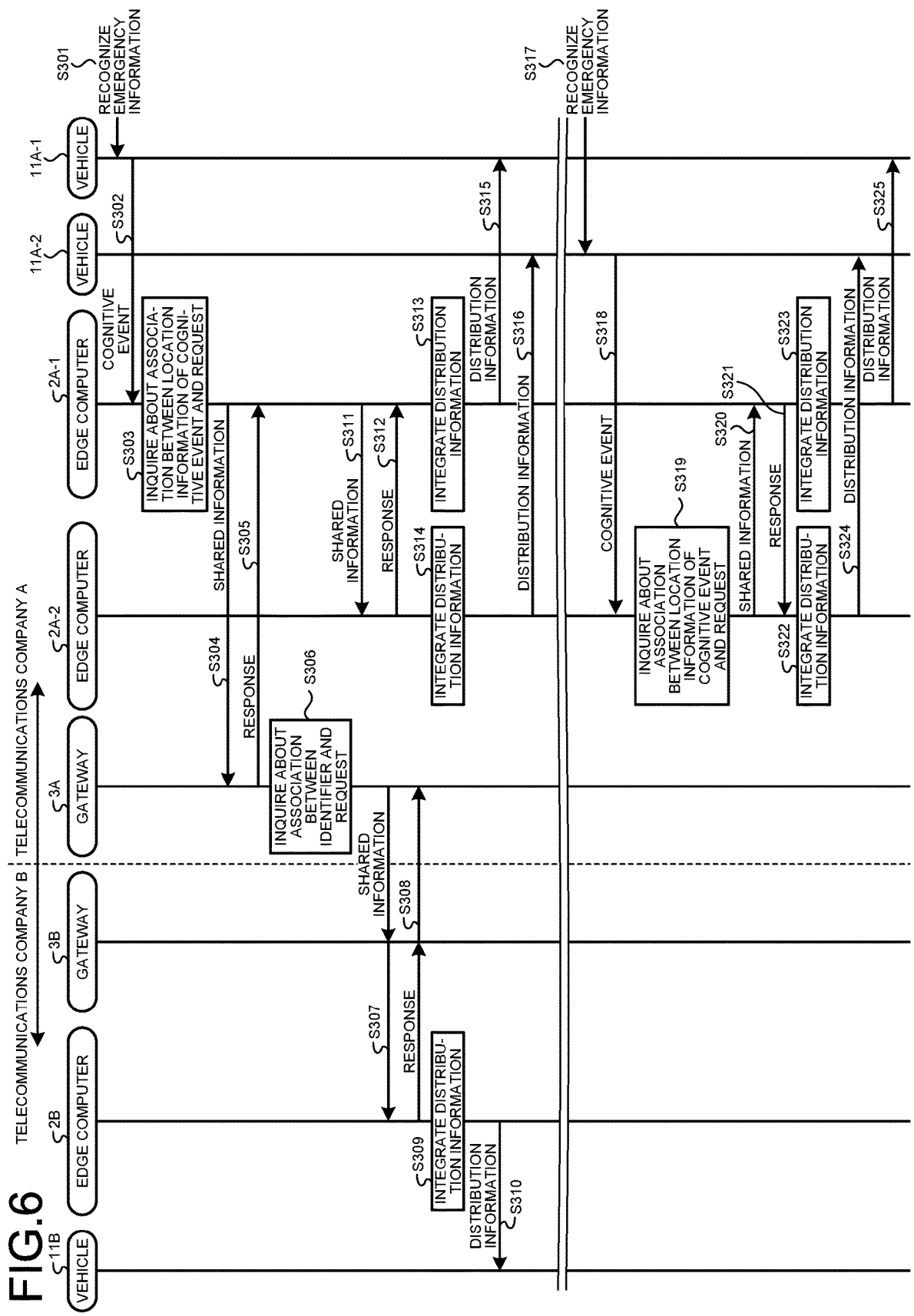
FIG. 6 is a sequence diagram illustrating an operation in which shared information is sent between edge computers in the communication system according to the first embodiment.

So far, the operation in which the edge computer 2 requests information sharing in the communication system 20 has been described. Next, an operation will be described in which emergency information is shared via the edge computer 2 from the vehicle 11A-1 that has recognized the emergency information, that is, the emergency information is distributed to the vehicles 11 in each service area 4. FIG. 6 is a sequence diagram illustrating an operation in which shared information is sent between the edge computers 2 in the communication system 20 according to the first embodiment. Specifically, FIG. 6 illustrates the operation procedure in which the edge computer 2A-1 of telecommunications company A sends shared information to the edge computer 2B of telecommunications company B, the edge computer 2A-1 of telecommunications company A sends shared information to the edge computer 2A-2 of the same telecommunications company A, and the edge computer 2A-2 of telecommunications company A sends shared information to the edge computer 2A-1 of the same telecommunications company A. Here, first, it is assumed that emergency information has occurred at the point 12 illustrated in FIG. 1, and the vehicle 11A-1 has recognized the emergency information. Note that it is assumed that the vehicle 11B has not recognized the emergency information at the point 12.

Upon recognizing the emergency information (step S301), the vehicle 11A-1 notifies the edge computer 2A-1 of the cognitive event indicating the event of the recognized emergency information via the base station 1A-1 (not illustrated in FIG. 6) (step S302). The cognitive event is exemplified by a traffic accident, a fallen object, a road cave-in, freezing, or the like, but is not necessarily specific information, and may be a simple indication that an event to be delivered as emergency notification has occurred. The vehicle 11A-1 adds information on the location where the emergency information has occurred, that is, information on the point 12, to the cognitive event (hereinafter referred to as the cognitive event (S302)) to be delivered in step S302. The information on the location where the emergency information has occurred is basically the same as the location information of the request (S103) illustrated in the sequence diagram of FIG. 2, but need not have the same data format or include the same information as the request (S103).

Upon receiving the cognitive event (S302) delivered from the vehicle 11A-1, the edge computer 2A-1 performs a process of inquiring about the association between the location information of the cognitive event and the request using the cognitive event (S302) (step S303). As the process of inquiring about the association between the location information of the cognitive event and the already-accepted request, the edge computer 2A-1 inquires whether the region indicated by the already-accepted request covers the location information included in the cognitive event (S302). The sequence diagram illustrated in FIG. 6 is based on the assumption that there is a request covering, or matching, the location information included in the cognitive event (S302). The matching request in the edge computer 2A-1 is the request (S105). Therefore, the edge computer 2A-1 sends the cognitive event (S302) as a shared information message together with held identifier #2 by designating the gateway 3A that is the request source of the request (S105) as the destination (step S304). Note that if identifier #2 is set as a callback URL using the http protocol, the edge computer 2A-1 uses the callback URL of identifier #2 as the URL of the http message of the shared information message (hereinafter referred to as the shared information (S304)) which is sent in step S304.

The gateway 3A sends a response message (hereinafter referred to as the response (S305)) to the shared information (S304) to the edge computer 2A-1 that has sent the shared information (S304) (step S305). The gateway 3A performs a process of inquiring about the association between the identifier and the request using identifier #2 included in the shared information (S304) (step S306). The gateway 3A, which has accepted and registered the request (S103) from the edge computer 2B, can easily search for identifier #1 and the request source of the request (S103) by searching the database for the corresponding record using identifier #2 included in the shared information (S304) as a key. In the communication system 20, sending the request (S105) assigned identifier #2 and the shared information (S304) assigned identifier #2 allows the gateway 3A to eliminate the need for comparison with the region requested in the request (S103), and to easily associate identifier #2 with the information sharing source of telecommunications company B. That is, in a case where the region requested in the request (S103) is so large, for example, that the gateway 3A needs to process many cognitive events, the gateway 3A can avoid a drastic increase in processing load.

On the basis of the search result, the gateway 3A sends a shared information message including the cognitive event by designating the edge computer 2B that is the request source of the request (S103) as the destination (step S307). For example, in a case where the edge computer 2B makes a plurality of information sharing demands, the gateway 3A adds identifier #1 to the shared information message (hereinafter referred to as the shared information (S307)) which is sent in step S307. This allows the edge computer 2B to easily examine the association with the request (S103), and to easily perform detailed services such as a thorough investigation of distribution information or division of regions in the service area 4B in processes such as the generation of distribution information to the vehicle 11B. If the http protocol is used and identifier #1 is set as a callback URL, the callback URL of identifier #1 is used as the URL of the http message of the shared information (S307). If the http protocol is not used in the transmission of the shared information (S307), the gateway 3A may or may not add identifier #1 to the shared information (S307) except in the presence of a plurality of information sharing demands.

The gateway 3B transfers the shared information (S307) sent from the gateway 3A to the destination, namely the edge computer 2B. The edge computer 2B receives the shared information (S307) transferred from the gateway 3B. The edge computer 2B sends a response message to the shared information (S307) to the gateway 3A that has sent the shared information (S307) (step S308). The gateway 3B transfers the response message (hereinafter referred to as the response (S308)) sent in step S308 from the edge computer 2B to the destination, namely the gateway 3A. The gateway 3A receives the response (S308) transferred from the gateway 3B.

The edge computer 2B performs a distribution information integration process of integrating the emergency information acquired with the shared information (S307) into the distribution information to be distributed from the edge computer 2B (step S309). The distribution information integration process is a process in which the edge computer 2B integrates the emergency information acquired with the shared information (S307) with other information, past emergency information, and the like. The edge computer 2B distributes the integrated distribution information to the vehicle 11B via the base station 1B (step S310).

Information sharing from the edge computer 2A-1 to the edge computer 2A-2 operated by the same telecommunications company A can be performed in a similar manner to information sharing from the edge computer 2A-1 to the gateway 3A. The edge computer 2A-1 sends the cognitive event (S302) as a shared information message together with held identifier #4 by designating the edge computer 2A-2 that is the request source of the request (S209) as the destination (step S311). The edge computer 2A-2 receives the shared information message (hereinafter referred to as the shared information (S311)) sent in step S311 from the edge computer 2A-1. The edge computer 2A-2 sends a response message (hereinafter referred to as the response (S312)) to the shared information (S311) (step S312).

The edge computer 2A-1 performs a distribution information integration process of integrating the emergency information acquired with the cognitive event (S302) into the distribution information to be distributed from the edge computer 2A-1 (step S313). The edge computer 2A-2 performs a distribution information integration process of integrating the emergency information acquired with the shared information (S311) into the distribution information to be distributed from the edge computer 2A-2 (step S314). The edge computer 2A-1 distributes the integrated distribution information to the vehicle 11A-1 via the base station 1A-1 (step S315). The edge computer 2A-2 distributes the integrated distribution information to the vehicle 11A-2 via the base station 1A-2 (step S316). Note that in the communication system 20, the order, simultaneity, and the like of the distribution of distribution information by the edge computer 2B (step S310), the distribution of distribution information by the edge computer 2A-1 (step S315), and the distribution of distribution information by the edge computer 2A-2 (step S316) do not matter here.

Note that telecommunications company A does not send shared information to telecommunications company B for a region in which telecommunications company B has not requested telecommunications company A to share information.

Here, a case where shared information is sent from the edge computer 2A-2 to the edge computer 2A-1, which are operated by the same telecommunications companies A, will be described. For example, suppose that the vehicle 11A-2 recognizes emergency information and distributes distribution information toward the vehicles 11 traveling in the opposite direction of FIG. 1, that is, in the direction from right to left in the drawing. It is assumed that the point of occurrence of the emergency information is a point in the service area 4A-2 that does not overlap with the service area 4B and the service area 4A-1. It is also assumed that the information sharing demand has been completed between the edge computer 2A-1 and the edge computer 2A-2 through the operation of the sequence diagram illustrated in FIG. 5.

Upon recognizing the emergency information (step S317), the vehicle 11A-2 notifies the edge computer 2A-2 of the cognitive event indicating the event of the recognized emergency information via the base station 1A-2 (not illustrated in FIG. 6) (step S318). Upon receiving the cognitive event (hereinafter referred to as the cognitive event (S318)) delivered in step S318 from the vehicle 11A-2 (step S318), the edge computer 2A-2 performs a process of inquiring about the association between the location information of the cognitive event and the request using the cognitive event (S318) (step S319). Step S319 by the edge computer 2A-2 is the same process as step S303 described above by the edge computer 2A-1. The edge computer 2A-2 sends the cognitive event (S318) as a shared information message together with held identifier #3 by designating the edge computer 2A-1 that is the request source of the request (S203) as the destination (step S320). The edge computer 2A-1 receives the shared information message (hereinafter referred to as the shared information (S320)) sent in step S320 from the edge computer 2A-2. The edge computer 2A-1 sends a response message (hereinafter referred to as the response (S321)) to the shared information (S320) (step S321).

The edge computer 2A-2 performs a distribution information integration process of integrating the emergency information acquired with the cognitive event (S318) into the distribution information to be distributed from the edge computer 2A-2 (step S322). The edge computer 2A-1 performs a distribution information integration process of integrating the emergency information acquired with the shared information (S320) into the distribution information to be distributed from the edge computer 2A-1 (step S323). The edge computer 2A-2 distributes the integrated distribution information to the vehicle 11A-2 via the base station 1A-2

(step S324). The edge computer 2A-1 distributes the integrated distribution information to the vehicle 11A-1 via the base station 1A-1 (step S325). Note that in the communication system 20, the order, simultaneity, and the like of the distribution of distribution information by the edge computer 2A-2 (step S324) and the distribution of distribution information by the edge computer 2A-1 (step S325) do not matter here.

Note that telecommunications company A does not send the shared information based on the cognitive event delivered in the cognitive event (S318) to telecommunications company B because telecommunications company B has not requested information sharing with respect to the region including the service area 4A-2 provided by the base station 1A-2 connected to the edge computer 2A-2.

The operation of the sequence diagram illustrated in FIG. 6 will be described in detail using the configuration of each device. In the edge computer 2A-1, in step S302 of the sequence diagram illustrated in FIG. 6, the communication unit 201 receives the cognitive event (S302) delivered from the vehicle 11A-1 via the base station 1A-1, and outputs the cognitive event (S302) to the accepted message processing unit 202. The accepted message processing unit 202 outputs the cognitive event (S302) to the request location information inquiry unit 206 and the distribution information integration unit 208.

The request location information inquiry unit 206 outputs a query in which the location information of the cognitive event (S302) is used as a key to the accepted request holding unit 207 in order to inquire whether the location information included in the cognitive event (S302) is included in the region specified by the location information and the range from the location information registered in the accepted request holding unit 207. The request location information inquiry unit 206 may be simply referred to as the request inquiry unit.

If the query acquired from the request location information inquiry unit 206 is included in the region specified by the location information and the range from the location information held, the accepted request holding unit 207 outputs identifier #2 to the request location information inquiry unit 206 as a query result. Note that the cognitive event (S302) may include information on the accuracy of the location information, for example, dilution of precision (DOP) of the Global Positioning System (GPS). In this case, the accepted request holding unit 207 may determine on the basis of the accuracy of the location information whether the query from the request location information inquiry unit 206 is included in a range wider than the region specified by the location information and the range from the location information held. If identifier #2 is not used as a callback URL in the http protocol, the accepted request holding unit 207 also has a registration of the host information of the request source, and thus also outputs the host information of the gateway 3A that is the request source to the request location information inquiry unit 206. If the query acquired from the request location information inquiry unit 206 is not included in the region specified by the location information and the range from the location information held, the accepted request holding unit 207 outputs an indication that the query is not included to the request location information inquiry unit 206 as a query result. The accepted request holding unit 207 is implemented by, for example, a database such as a list-type table or a relational database.

If the query result acquired from the accepted request holding unit 207 indicates that the location information included in the cognitive event (S302) is included in the region specified by the location information and the range from the location information registered in the accepted request holding unit 207, the request location information inquiry unit 206 outputs the cognitive event (S302) acquired from the accepted message processing unit 202 and identifier #2 acquired from the accepted request holding unit 207 in combination to the outgoing message generation unit 211. If identifier #2 is not used as a callback URL in the http protocol, the request location information inquiry unit 206 also outputs the host information of the gateway 3A that is the request source to the outgoing message generation unit 211. If the query result acquired from the accepted request holding unit 207 indicates that the location information included in the cognitive event (S302) is not included in the region specified by the location information and the range from the location information registered in the accepted request holding unit 207, the request location information inquiry unit 206 outputs nothing to the outgoing message generation unit 211. In this manner, in a case where the location information indicating the point of occurrence of the cognitive event acquired from the vehicle 11 via the base station 1 is included in the region specified by the second request, the request location information inquiry unit 206 generates shared information including the cognitive event and the identifier held in the accepted request holding unit 207. Note that the request location information inquiry unit 206 also performs similar processing in the case of the shared information (S311), that is, in the case where the host information of the request source is the edge computer 2A-2, which will be described later. First, processes related to the gateway 3A will be described, among the outputs to the outgoing message generation unit 211.

As described above, the outgoing message generation unit 211 converts the shared information, namely the cognitive event (S302) and identifier #2 acquired from the request location information inquiry unit 206, into a format in which the shared information can be sent, and generates a shared information message. The outgoing message generation unit 211 outputs the generated shared information message to the communication unit 201. If identifier #2 is set as a callback URL using the http protocol, identifier #2 is used as the URL of the http method. If identifier #2 is not set as a callback URL using the http protocol, the outgoing message generation unit 211 acquires the host information of the request source, and thus designates the host information of the request source, specifically the gateway 3A, as the destination. The communication unit 201 sends the shared information message generated by the outgoing message generation unit 211 as the shared information (S304) by designating the gateway 3A as the destination. Here, notifying the request source of a cognitive event on a one-off basis at the timing when the cognitive event occurs according to the request is referred to as push notification.

In the gateway 3A, the communication unit 301 receives the shared information (S304) sent from the edge computer 2A-1 in step S304 illustrated in the sequence diagram of FIG. 6, and outputs the shared information (S304) to the transfer determination unit 302. Since the destination of the shared information (S304) is the gateway 3A, the transfer determination unit 302 outputs the shared information (S304) to the accepted message processing unit 303. The accepted message processing unit 303 outputs the shared information (S304) to the request identifier inquiry unit 307 and the response determination unit 310. The case illustrated here shows that the request has been successful and telecommunications company A can send shared information to telecommunications company B, and it is assumed that the identifier included in the shared information (S304) is identifier #2. In order to distinguish between the identifier held in the accepted request holding unit 308 and the identifier included in the shared information (S304), the identifier included in the shared information (S304) will be referred to as identifier X in the following description of the operations of the accepted request holding unit 308 and the request identifier inquiry unit 307.

The response determination unit 310 outputs an indication of the success or failure of the reception of the shared information (S304) to the outgoing message generation unit 312 as a response. In the case of using the http protocol, the response determination unit 310 outputs an http status code. The outgoing message generation unit 312 converts the information acquired from the response determination unit 310 into a format in which the information can be sent, generates a response message addressed to the edge computer 2A-1 that has sent the shared information (S304), and outputs the response message to the communication unit 301. The communication unit 301 sends the message generated by the outgoing message generation unit 312 as the response (S305) by designating the edge computer 2A-1 as the destination.

The request identifier inquiry unit 307 outputs a query in which identifier X included in the shared information (S304) is used as a key to the accepted request holding unit 308 in order to inquire whether identifier X included in the shared information (S304) matches the identifier of an intra-network request registered in the accepted request holding unit 308, that is, the request (S105) in the gateway 3A.

The accepted request holding unit 308 searches the identifiers of the held intra-network requests to determine whether there is an identifier that matches identifier X in the query acquired from the request identifier inquiry unit 307. If there is an identifier that matches identifier X among the identifiers of the held intra-network requests, the accepted request holding unit 308 outputs identifier #1 to the request identifier inquiry unit 307 as a query result. If identifier #1 is not set as a callback URL using the http protocol, the accepted request holding unit 308 also has a registration of the host information of the request source, and thus also outputs the host information of the edge computer 2B that is the request source to the request identifier inquiry unit 307. If there is no identifier that matches identifier X among the identifiers of the held intra-network requests, the accepted request holding unit 308 outputs an indication that no identifier matches to the request identifier inquiry unit 307 as a query result. The accepted request holding unit 308 is implemented by, for example, a database such as a list-type table or a relational database.

If the query result acquired from the accepted request holding unit 308 indicates that identifier X included in the shared information (S304) matches the identifier of a request registered in the accepted request holding unit 308, the request identifier inquiry unit 307 outputs the shared information (S304) acquired from the accepted message processing unit 303 and identifier #1 acquired from the accepted request holding unit 308 in combination to the outgoing message generation unit 312. If identifier #1 is not set as a callback URL in the http protocol, the request identifier inquiry unit 307 also outputs the host information of the edge computer 2B that is the request source to the outgoing message generation unit 312. If the query result acquired from the accepted request holding unit 308 indicates that identifier X included in the shared information (S304) does not match the identifier of any request registered in the accepted request holding unit 308, the request identifier inquiry unit 307 outputs nothing to the outgoing message generation unit 312. The request identifier inquiry unit 307 may be simply referred to as the request inquiry unit.

The outgoing message generation unit 312 converts the information acquired from the request identifier inquiry unit 307 into a format in which the information can be sent, generates a shared information message including the shared information (S304) and identifier #1 and addressed to the host information of the request source, namely the edge computer 2B, and outputs the shared information message to the communication unit 301. The communication unit 301 sends the shared information message generated by the outgoing message generation unit 312 as the shared information (S307) by designating the edge computer 2B as the destination.

In the gateway 3B, the communication unit 301 receives the shared information (S307), and outputs the shared information (S307) to the transfer determination unit 302. Since the destination of the shared information (S307) is the edge computer 2B, the transfer determination unit 302 outputs the shared information (S307) to the communication unit 301. The communication unit 301 transfers the shared information (S307) to the edge computer 2B.

In the edge computer 2B, the communication unit 201 receives the shared information (S307) transferred from the gateway 3B, and outputs the shared information (S307) to the accepted message processing unit 202. The accepted message processing unit 202 outputs the shared information (S307) to the distribution information integration unit 208 and the response determination unit 209.

The response determination unit 209 outputs an indication of the success or failure of the reception of the shared information (S307) to the outgoing message generation unit 211 as a response. In the case of using the http protocol, the response determination unit 209 outputs an http status code. The processing by the response determination unit 209 is similar to the processing for the shared information (S304) by the gateway 3A.

The outgoing message generation unit 211 converts the information acquired from the response determination unit 209, that is, the response, into a format in which the response can be sent, generates a response message addressed to the gateway 3A that has sent the shared information (S307), and outputs the response message to the communication unit 201. The communication unit 201 sends the message generated by the outgoing message generation unit 211 as the response (S308) by designating the gateway 3A as the destination.

In the gateway 3B, the communication unit 301 receives the response (S308), and outputs the response (S308) to the transfer determination unit 302. Since the destination of the response (S308) is the gateway 3A, the transfer determination unit 302 outputs the response (S308) to the communication unit 301. The communication unit 301 transfers the response (S308) to the gateway 3A.

In the gateway 3A, the communication unit 301 receives the response (S308), and outputs the response (S308) to the transfer determination unit 302. Since the destination of the response (S308) is the gateway 3A, the transfer determination unit 302 outputs the response (S308) to the accepted message processing unit 303. The accepted message processing unit 303 outputs the response (S308) to the response processing unit 306. It is possible that the response processing unit 306 performs a process based on the success or failure of the transmission, request, or the like, e.g. a process of retransmission in the case of failure, but the response processing unit 306 here does not perform any specific process on the response (S308).

Returning to the description of the edge computer 2B, the cognitive event acquired by the distribution information integration unit 208 with the shared information (S307) is the emergency information recognized by the vehicle 11A-1 and provided by telecommunications company A. The distribution information integration unit 208 performs processes such as format conversion of the cognitive event into a format in which the cognitive event can be distributed to the vehicle 11B and information addition of temporal changes in the cognitive event, and integrates the cognitive event with the distribution information scheduled to be distributed by the edge computer 2B. The distribution information scheduled to be distributed by the edge computer 2B is, for example, an event recognized by the vehicle 11B or information on the point 12 that has been previously recognized by a vehicle (not illustrated) ahead of the vehicle 11A-1 and has already been shared. In addition, if the received shared information (S307) is the same, the distribution information integration unit 208 performs an update process including overwriting. For example, it is possible that the shared information (S307), that is, the cognitive event, includes the time of the recognition of the emergency information; therefore, the distribution information integration unit 208 performs a process of updating the recognition time to the latest time. In addition, a plurality of vehicles 11 (not illustrated) can recognize the same emergency information and deliver the cognitive event, in which case the distribution information integration unit 208 may perform statistical processing, e.g. averaging, on the point of occurrence of the emergency information. The distribution information integration unit 208 outputs the integrated distribution information to the outgoing message generation unit 211.

The outgoing message generation unit 211 converts the distribution information acquired from the distribution information integration unit 208 into a format in which the distribution information can be sent, and outputs the converted distribution information to the communication unit 201. The communication unit 201 sends the distribution information to the base station 1B (not illustrated in FIG. 6). The base station 1B distributes the distribution information toward the vehicle 11B in the service area 4B. Consequently, the vehicle 11B present in the service area 4B can receive the distribution information.

In the present embodiment, the emergency information recognized by the vehicle 11A-1 is sent from the edge computer 2A-1 to the edge computer 2B via the gateway 3A and the like, and the distribution information integration unit 208 of the edge computer 2B conducts information processing for distribution, but the present disclosure is not limited thereto. For example, the edge computer 2A-1 may conduct information processing for distribution before sending the information as the shared information (S304). The information processing includes, for example, processes which are supposed to be performed by the distribution information integration unit 208 of the edge computer 2B but can be performed by the edge computer 2A-1, e.g. information addition of temporal changes, update including overwriting, and if the edge computer 2A-1 is notified by a plurality of vehicles 11 of the same emergency information, statistical processing for the same event.

Returning to the description of the operation of the edge computer 2A-1, the edge computer 2A-1 sends the shared information (S311) to the edge computer 2A-2 using a method similar to that used for sending the shared information (S304). The only differences are that the identifier held by the accepted request holding unit 207 in the edge computer 2A-1 is identifier #4 and the destination of the shared information (S311) is the edge computer 2A-2. The edge computer 2A-2 sends the response (S312) using a method similar to that used by the edge computer 2B to send the response (S308). Using a method similar to that used by the edge computer 2B, the edge computers 2A-1 and 2A-2 perform a distribution information integration process (step S313 and step S314), and distribute the distribution information (step S315 and step S316).

For the cognitive event (S318) delivered from the vehicle 11A-2, the edge computer 2A-2 performs a process of inquiring about the association between the location information of the cognitive event and the request (step S319), and sends the shared information (S320) to the edge computer 2A-1, using a method similar to that used by the edge computer 2A-1. The only differences are that the identifier held by the accepted request holding unit 207 in the edge computer 2A-2 is identifier #3 and the destination of the shared information (S320) is the edge computer 2A-1. The edge computer 2A-1 sends the response (S321) using a method similar to that used by the edge computer 2B to send the response (S308). Using a method similar to that used by the edge computer 2B, the edge computers 2A-1 and 2A-2 perform a distribution information integration process (step S322 and step S323), and distribute the distribution information (step S324 and step S325).

Note that the edge computer 2A-2 does not send shared information such as the shared information (S304) to the gateway 3A unlike the edge computer 2A-1 since a request based on an information sharing demand has not been made from telecommunications company B.

Here, a method will be described in which the accepted message processing unit 202 discriminates between different types of messages when switching the output destination of messages such as a request, a push notification of shared information, a cognitive event from the vehicle 11, a response, update service area information, and service area update notification. In the case of not using the http protocol, the accepted message processing unit 202 can easily discriminate with a method such as addition of a discrimination flag to a message received by the communication unit 201 or use of a dedicated message. In the case of using the http protocol, the accepted message processing unit 202 can easily discriminate between responses and other messages because the http method differs between http request messages and http response messages. The accepted message processing unit 202 can discriminate between messages other than responses by differently determined URL paths of http messages. The expression "differently determined URL paths of http messages" means, for example, that request messages are accepted by a path subordinate to a specific path dedicated to requests, or that push notifications such as the shared information (S307) are accepted by a path subordinate to a specific path dedicated to push notifications and different from the specific path for request messages. The same applies to update service area information, service area update notification, and the like. In addition, the accepted message processing unit 202 may use a specific http method for information sharing requests, and may use an http method for push notifications different from that for information sharing requests.

Figure 7:
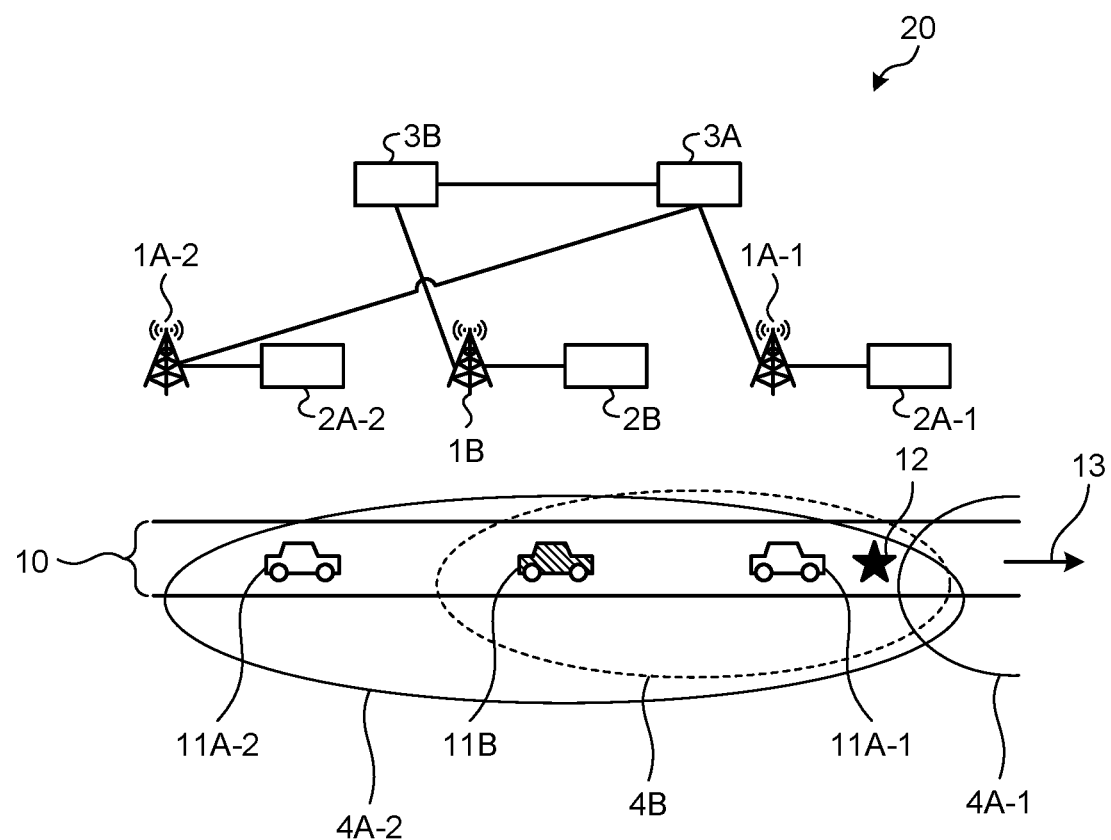
FIG. 7 is a second diagram illustrating an exemplary configuration of the communication system according to the first embodiment.
Figure 8:
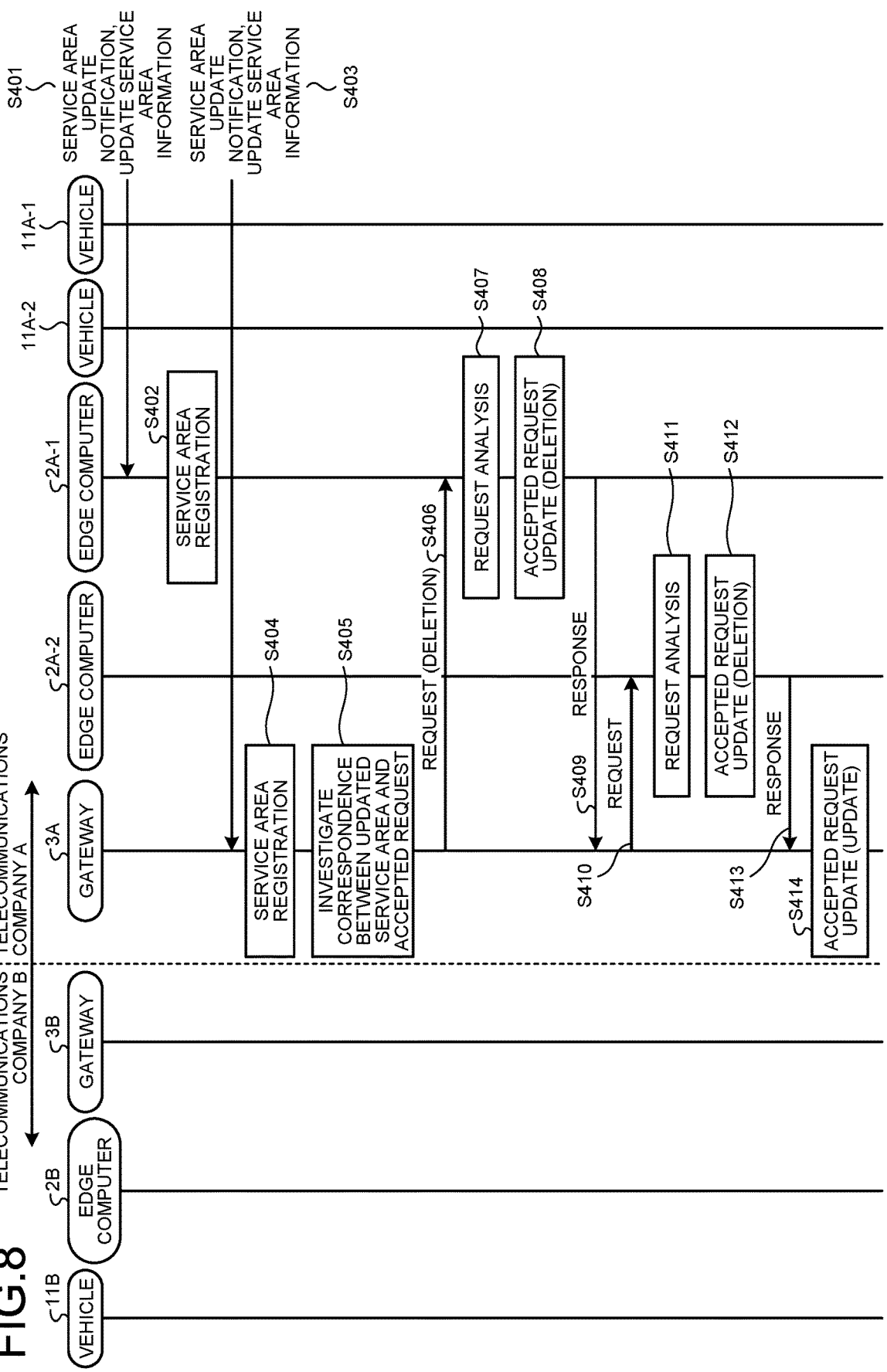
FIG. 8 is a sequence diagram illustrating an operation in which the service areas of telecommunications company A are updated in the communication system according to the first embodiment.

Next, a case will be described in which, from the state where the operations of the sequence diagrams illustrated in FIGS. 2 and 5 have been completed in the communication system 20, the service areas 4A-1 and 4A-2 are updated as illustrated in FIG. 7, in which the point 12 is included in the service area 4A-2. FIG. 7 is a second diagram illustrating an exemplary configuration of the communication system 20 according to the first embodiment. In the post-update state of the service area 4 illustrated in FIG. 7, the vehicle 11A-1 can communicate with the base station 1A-2. Here, a case will be described in which in order to share information on the point 12 illustrated in FIG. 7, the edge computer 2B cancels the information sharing with the edge computer 2A-1 corresponding to the service area 4A-1 and newly registers to share information with the edge computer 2A-2 corresponding to the service area 4A-2, and shared information is sent from the edge computer 2A-2. The request update after the change of the service areas 4A-1 and 4A-2 illustrated in FIG. 7 will be described with reference to the sequence diagram illustrated in FIG. 8. FIG. 8 is a sequence diagram illustrating an operation in which the service areas 4A-1 and 4A-2 of telecommunications company A are updated in the communication system 20 according to the first embodiment.

Upon accepting service area update notification and update service area information (step S401), the edge computer 2A-1 performs a service area registration process in a similar manner to the above-described edge computer 2B (step S402). Upon accepting service area update notification and update service area information (step S403), the gateway 3A performs a service area registration process in a similar manner to the above-described edge computer 2B (step S404).

The gateway 3A performs a process of investigating the correspondence between the updated service area 4A and the accepted request (step S405), and determines whether an information sharing request has been accepted for the updated service area 4A. The gateway 3A sends a request by designating the edge computer 2A-1 as the destination (step S406). The request message (hereinafter referred to as the request (S406)) sent in step S406 is for the gateway 3A to update, specifically delete, the request (S105) registered in the edge computer 2A-1 corresponding to the service area 4A-1. With the operations of the sequence diagrams illustrated in FIGS. 2 and 5 finished, the edge computer 2A-1 has accepted the request (S105); therefore, the gateway 3A sends the request (S406) that is a message from which the cancellation of information sharing is recognizable in order to cancel the information sharing with the edge computer 2A-1.

Specifically, in the case of not using http for the request (S406), the gateway 3A adds a flag from which the update of the registered request is recognizable or sets a negative value, which cannot represent a region, for the range from the location information. In the case of using http for the request (S406), the gateway 3A performs a process of using an http method different from that for the request (S103), e.g. the DELETE method, or the PUT method, UPDATE method, or PATCH method in which a negative value, which cannot represent a region, is set for the range from the location information. Note that the gateway 3A adds identifier #2 to the request (S406). In a case where the URL of the resource of the edge computer 2A-1 is included in the Location field of the response (S108) using the http protocol, the gateway 3A need not add identifier #2 to the request (S406), and only needs to use the destination URL of the http message of the request (S406) as the URL of the Location field.

The edge computer 2A-1 receives the request (S406), performs a request analysis process in a similar manner to that on the request (S105) (step S407), and performs an accepted request update process (step S408). Specifically, since identifier #2 has already been registered for the service area 4A-1, the edge computer 2A-1 deletes the registration for the service area 4A-1 in accordance with the demand for cancellation of information sharing based on the request (S406), and sends a response message (hereinafter referred to as the response (S409)) (step S409).

The gateway 3A sends a request in order to newly request the edge computer 2A-2 to share information (step S410). The identifier that the gateway 3A assigns to the request message (hereinafter referred to as the request (S410)) to be sent in step S410 may be the same as or different from the identifier of the request (S105). However, in the case where the gateway 3A uses the http protocol and uses a URL as the identifier, if the path is supposed to include the location information and the range from the location information, the identifier of the request (S410) and the identifier of the request (S105) are different.

In a similar manner to when the edge computer 2A-1 receives the request (S105), the edge computer 2A-2 performs a request analysis process (step S411), performs an accepted request update process (step S412), and sends a response message (step S413).

The gateway 3A receives the response message (hereinafter referred to as the response (S413)) sent in step S413 from the edge computer 2A-2, and updates the record corresponding to the request (S105) to a new record corresponding to the request (S410) in an accepted request update process (step S414).

In the communication system 20, even after the update of the service areas 4A-1 and 4A-2 of telecommunications company A, the operation of the sequence diagram illustrated in FIG. 8 enables information sharing from telecommunications company A to telecommunications company B by sending shared information from a transmission source different from that of the shared information (S304) illustrated in the sequence diagram of FIG. 6. Note that in the communication system 20, the request (S406) sent from the gateway 3A is for cancelling the information sharing. However, in the case of updating the location information and the range from the location information, it is also possible to use messages of the request (S406) and the response (S409) indicating the update of the location information and the range from the location information.

The operation of the sequence diagram illustrated in FIG. 8 will be described in detail using the configuration of each device. Note that the processes of the edge computer 2A-1 in steps S401 and S402 are the same as the processes of the edge computer 2A-1 in steps S201 and S202 illustrated in the sequence diagram of FIG. 5.

In the gateway 3A, the communication unit 301 receives service area update notification and update service area information, and outputs the service area update notification and the update service area information to the transfer determination unit 302. Determining that the destination of the service area update notification and the update service area information is the gateway 3A, the transfer determination unit 302 outputs the service area update notification and the update service area information to the accepted message processing unit 303. The accepted message processing unit 303 outputs the update service area information to the service area information holding unit 304, and outputs the service area update notification to the service area update unit 309.

The service area update unit 309 checks through host information matching whether a record corresponding to the updated service area 4A has been registered in the accepted request holding unit 308. The process in the service area update unit 309 corresponds to the process of investigating the correspondence between the updated service area 4A and the accepted request in the sequence diagram illustrated in FIG. 8. If there is a record registered, the service area update unit 309 outputs the host information of the edge computer 2A-1 to the intra-network request generation unit 311 in order to cancel the information sharing. In the case of updating the request, the service area update unit 309 adds identifier #2 corresponding to the request (S105) acquired from the accepted request holding unit 308. The information output from the service area update unit 309 leads to the transmission of the request (S406) from the gateway 3A; as described above, in order to make a message from which the cancellation of information sharing is recognizable, the location information, the range from the location information, a flag, and the like may be added thereto.

As described above, the intra-network request generation unit 311 generates a request for requesting the cancellation of information sharing with the service area 4A-1, and outputs the request to the outgoing message generation unit 312. The outgoing message generation unit 312 converts the request acquired from the intra-network request generation unit 311 into a format in which the request can be sent, generates a request message, and outputs the request message to the communication unit 301. The communication unit 301 sends the request message acquired from the outgoing message generation unit 312 as the request (S406) by designating the edge computer 2A-1 as the destination. Note that in the case of updating the request, the identifier included in the request (S406) is identifier #2 output from the service area update unit 309.

The edge computer 2A-1 processes the request (S406) in a similar manner to the edge computer 2A-1 processes the request (S105), and sends the response (S409). However, in the edge computer 2A-1, the request analysis unit 204 instructs the accepted request holding unit 207 to delete the record of identifier #2 in accordance with the cancellation of information sharing based on the request (S406). The accepted request holding unit 207 deletes the record of identifier #2 in accordance with the instruction to delete the record of identifier #2 from the request analysis unit 204.

In the gateway 3A, the communication unit 301 receives the response (S409), and outputs the response (S409) to the transfer determination unit 302. Since the destination of the response (S409) is the gateway 3A, the transfer determination unit 302 outputs the response (S409) to the accepted message processing unit 303. The accepted message processing unit 303 outputs the response (S409) to the response processing unit 306.

Upon acquiring the response (S409), the response processing unit 306 outputs an instruction to delete the record of the request registered with the request (S105) to the accepted request holding unit 308. For example, the response processing unit 306 gives a deletion instruction to the accepted request holding unit 308 by using intra-network identifier #2 as a key. In addition, if the response (S409) is a response to the update of the request, the response processing unit 306 determines whether it is necessary to send a new information sharing demand. The response processing unit 306 makes the determination, for example, based on whether the host information of the new demand transmission destination has been acquired from the intra-network request generation unit 311. In response to determining that it is necessary to send a new information sharing demand, the response processing unit 306 outputs, to the intra-network request generation unit 311, the location information and the range from the location information acquired from the intra-network request generation unit 311, and the host information of the edge computer 2A-2 that is the new demand transmission destination.

The intra-network request generation unit 311 generates the request (S410) using a method similar to that used for the request (S105) in order to make a new intra-network request. In this case, identifier #2 included in the request (S410) may be the same as identifier #2 of the request (S105), or may be newly determined.

As in the case of the response (S108), the response processing unit 306 acquires the response (S413), and outputs the response (S413) to the accepted request holding unit 308.

The accepted request holding unit 308 deletes the information on the request corresponding to the registered request (S105) on the basis of the data included in the response (S409) acquired from the response processing unit 306. The accepted request holding unit 308 registers a record corresponding to the new request on the basis of the response (S413) acquired from the response processing unit 306. Other operations of the gateway 3A and the edge computers 2A-1 and 2A-2 are similar to the operations of the gateway 3A and the edge computer 2A-1 in the sequence diagram illustrated in FIG. 2.

So far, the case where the service area 4A is changed in telecommunications company A that has accepted the information sharing request has been described. Next, a case where the configuration of the service area 4B of telecommunications company B is changed will be described. For example, in a case where a new service area 4 (not illustrated) is constructed in the configuration of the service area 4B of telecommunications company B, information sharing can be implemented using a request from the edge computer 2B in charge of the newly constructed service area 4B. In addition, information sharing deletion can be implemented by the gateway 3B making a request for deletion as an update of the request (S105), as in the case of the request (S406). For example, in a case where the request has been successfully registered in the gateway 3A, the gateway 3B can implement the update by making a request in which the location information and the range from the location information are replaced with new location information and a new range from the location information.

Next, hardware configurations of the edge computer 2 and the gateway 3 will be described. In the edge computer 2, the communication unit 201 is a communication instrument. The components of the edge computer 2 except the communication unit 201 are implemented by processing circuitry. Similarly, in the gateway 3, the communication unit 301 is a communication instrument. The components of the gateway 3 except the communication unit 301 are implemented by processing circuitry. In the edge computer 2 and the gateway 3, the processing circuitry may be a memory and a processor that executes a program stored in the memory, or may be dedicated hardware. The processing circuitry is also called a control circuit.

Figure 9:
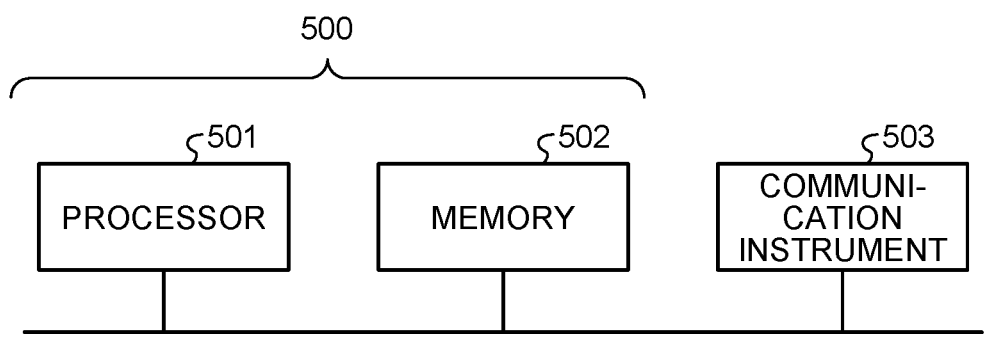
FIG. 9 is a diagram illustrating an exemplary configuration in which processing circuitry provided in the edge computer or the gateway is implemented by a processor and a memory, according to the first embodiment.

FIG. 9 is a diagram illustrating an exemplary configuration in which processing circuitry 500 provided in the edge computer 2 or the gateway 3 is implemented by a processor 501 and a memory 502, according to the first embodiment. The edge computer 2 and the gateway 3 are configured by the processing circuitry 500 and a communication instrument 503. The processing circuitry 500 illustrated in FIG. 9 is a control circuit and includes the processor 501 and the memory 502. In a case where the processing circuitry 500 is configured with the processor 501 and the memory 502, each function of the processing circuitry 500 is implemented by software, firmware, or a combination of software and firmware. Software or firmware is described as a program and stored in the memory 502. In the processing circuitry 500, the processor 501 reads and executes the program stored in the memory 502, thereby implementing each function. That is, the processing circuitry 500 includes the memory 502 for storing the program that results in the processing of the edge computer 2 or the gateway 3. This program can be said to be a program for causing the edge computer 2 or the gateway 3 to execute each function implemented by the processing circuitry 500. This program may be provided by a storage medium in which the program is stored, or may be provided by other means such as a communication medium.

It can also be said that the program for controlling the edge computer 2 is a program that causes the edge computer 2 to execute: generating a first request that is a request including location information and a range from the location information specifying a region in which information sharing is requested, and an identifier from which a demander that requests the information sharing is identifiable; holding a second request that is a request based on an information sharing demand from another edge computer 2 in a case where shared information based on the information sharing demand regarding the region is sendable in response to the second request; and generating the shared information in a case where location information indicating a point of occurrence of a cognitive event acquired from the vehicle 11 via the base station 1 is included in a region specified by the second request, the shared information including the cognitive event and an identifier held in the accepted request holding unit 207.

It can also be said that the program for controlling the gateway 3 is a program that causes the gateway 3 to execute: determining to transfer a first request to another communication device operated by a second telecommunications company, the first request being a request sent from the edge computer 2 and including location information and a range from the location information specifying a region in which information sharing is requested, and an identifier from which a demander that requests the information sharing is identifiable; analyzing a second request that is an information sharing demand from another edge computer 2 operated by the second telecommunications company, and determining whether a region specified by the second request is included in the service area 4A of the first telecommunications company; and generating a response to the second request on the basis of an analysis result.

The processor 501 is exemplified by a central processing unit (CPU), a processing device, an arithmetic device, a microprocessor, a microcomputer, or a digital signal processor (DSP). Examples of the memory 502 include a non-volatile or volatile semiconductor memory, a magnetic disk, a flexible disk, an optical disc, a compact disc, a mini disc, a digital versatile disc (DVD), and the like. Examples of non-volatile or volatile semiconductor memories include a random access memory (RAM), a read only memory (ROM), a flash memory, an erasable programmable ROM (EPROM), an electrically EPROM (EEPROM, registered trademark), and the like.

Figure 10:
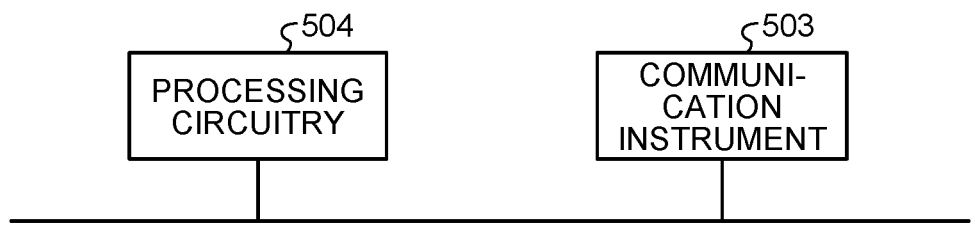
FIG. 10 is a diagram illustrating an exemplary configuration in which processing circuitry provided in the edge computer or the gateway is configured by dedicated hardware, according to the first embodiment.

FIG. 10 is a diagram illustrating an exemplary configuration in which processing circuitry 504 provided in the edge computer 2 or the gateway 3 is configured by dedicated hardware, according to the first embodiment. For example, the processing circuitry 504 illustrated in FIG. 10 is a single circuit, a composite circuit, a programmed processor, a parallel programmed processor, an application specific integrated circuit (ASIC), a field-programmable gate array (FPGA), or a combination thereof. The processing circuitry may be partially implemented by dedicated hardware, and partially implemented by software or firmware. In this manner, the processing circuitry can implement the above-described functions using dedicated hardware, software, firmware, or a combination thereof.

Figure 11:
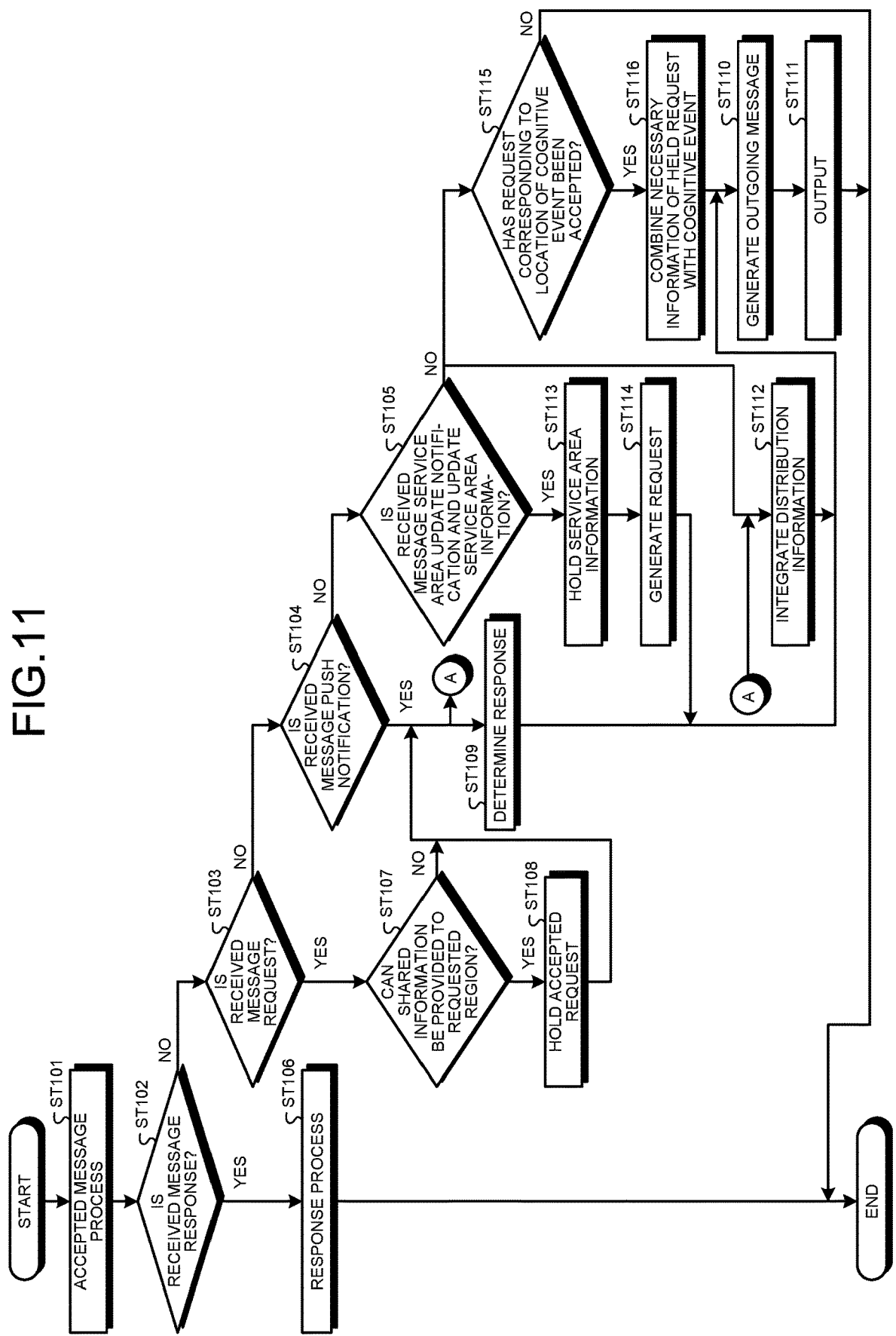
FIG. 11 is a flowchart illustrating the operation of the edge computer based on the program that is executed by the edge computer according to the first embodiment.

The programs that are executed by the edge computer 2 and the gateway 3 will be described. First, the program that is executed by the edge computer 2 will be described. FIG. 11 is a flowchart illustrating the operation of the edge computer 2 based on the program that is executed by the edge computer 2 according to the first embodiment.

In the flowchart of the edge computer 2 illustrated in FIG. 11, steps ST101 to ST105 are processes in the accepted message processing unit 202. The accepted message process in step ST101 is a process in the accepted message processing unit 202 including the above-described unencapsulation. Steps ST102 to ST105 correspond to the above-described output destination switching process in the accepted message processing unit 202. The edge computer 2 determines in step ST102 whether the received message is a response as described above, and in response to determining that the received message is a response message (step ST102: Yes), performs step ST106. In response to determining that the received message is not a response message (step ST102: No), the edge computer 2 determines in step ST103 whether the received message is a request as described above. In response to determining that the received message is a request message (step ST103: Yes), the edge computer 2 performs step ST107. In response to determining that the received message is not a request message (step ST103: No), the edge computer 2 determines in step ST104 whether the received message is a push notification as described above. In response to determining that the received message is a push notification message (step ST104: Yes), the edge computer 2 performs step ST109. In response to determining that the received message is not a push notification message (step ST104: No), the edge computer 2 determines in step ST105 whether the received message is service area update notification and update service area information as described above. In response to determining that the message is service area update notification and update service area information (step ST105: Yes), the edge computer 2 performs step ST113.

The case where the message is a response message (step ST102: Yes) is the case where the edge computer 2 has received a response message. Step ST106 is the process in the case that the received message is a response, and as described above, in the first embodiment, the edge computer 2 ends the procedure without performing any specific process.

The case where the message is a request message (step ST103: Yes) is the case where the edge computer 2 has received a request message. Step ST107 is the process in the case that the received message is the request (S105), for example, and the edge computer 2 makes an inquiry from the request analysis unit 204 to the accepted request holding unit 207 and determines whether the request made can be accepted. If the request has been accepted, the edge computer 2 determines that shared information can be provided to the requested region, that is, the region indicated by the location information and the range from the location information requested (step ST107: Yes). In the case of step ST107: Yes, the edge computer 2 performs an accepted request holding process for causing the accepted request holding unit 207 to hold the request content (step ST108). If the request has not been accepted, the edge computer 2 determines that shared information cannot be provided to the requested region, that is, the region indicated by the location information and the range from the location information requested (step ST107: No). In the case of step ST107: No or after step ST108, the edge computer 2 performs the response determination process in step ST109 corresponding to the above-described process in the response determination unit 209.

The outgoing message generation process in step ST110 and the output process in step ST111 correspond to the above-described processes in the outgoing message generation unit 211. In step ST110, the outgoing message generation unit 211 performs processing such as encapsulation. In step ST111, the outgoing message generation unit 211 performs the process of outputting the message to the communication unit 201. For example, the outgoing message generation unit 211 outputs the message to a memory area or the like in the communication unit 201 in order to send the response (S108) to the request (S105). The edge computer 2 can also perform processing for updating the location information and the range from the location information for information sharing in the order of step ST103: Yes, step ST107: Yes, step ST108, step ST109, step ST110, and step ST111.

The case where the message is a push notification message (step ST104: Yes) is the case where the edge computer 2 has received a push notification message. Step ST112 is the process in the case that the received message is a push notification, and corresponds to the above-described distribution information integration process in the distribution information integration unit 208. After step ST112, for example, in order to distribute distribution information in step S310 to the vehicle 11, the edge computer 2 performs steps ST110 and ST111, and performs output to a memory area or the like in the communication unit 201. In response to determining that the message is a push notification message (step ST104: Yes), the edge computer 2 further performs steps ST109, ST110, and ST111. In step ST111, for example, the edge computer 2 performs output to a memory area or the like in the communication unit 201 in order to send the response (S308) to the push notification of the shared information (S307).

The case where the message is a message of service area update notification and update service area information (step ST105: Yes) is the case where the edge computer 2 has received a message of service area update notification and update service area information. Step ST113 corresponds to the above-described process in the service area information holding unit 203, and the service area information holding unit 203 holds the updated service area information. Step ST114 corresponds to the above-described process in the request generation unit 210, and the request generation unit 210 generates a request for information sharing with the request (S103), for example. Thereafter, the edge computer 2 performs steps ST110 and ST111, and performs output to a memory area or the like in the communication unit 201 in order to send the request (S103), for example.

Step ST105: No is the process in the case that the vehicle 11 has recognized emergency information and delivered the cognitive event (S302), and the edge computer 2 has received the message of the cognitive event (S302) from the vehicle 11. The branch located right after step ST105: No relates to the case where the edge computer 2 distributes distribution information to the corresponding service area 4, and to the transmission of shared information to other telecommunications companies. The reason why the edge computer 2 performs step ST112 after step ST105: No is to distribute distribution information throughout the corresponding service area 4. Step ST112 is a process in the distribution information integration unit 208. For example, in order to distribute distribution information in step S315, the edge computer 2 performs steps ST110 and ST111 after step ST112, and performs output to a memory area or the like in the communication unit 201. The reason why the edge computer 2 performs step ST115 after step ST105: No is to send shared information to other telecommunications companies.

Steps ST115 and ST116 are processes in the request location information inquiry unit 206. Step ST115 is the query process from the request location information inquiry unit 206 to the accepted request holding unit 207, and has conditional branches that depend on the result of the query. If the result of the query indicates that there is a request corresponding to the location of the cognitive event, that is, the request has been accepted (step ST115: Yes), the request location information inquiry unit 206 performs step ST116. In step ST116, as described above, the request location information inquiry unit 206 combines a part of the request held by the accepted request holding unit 207, e.g. identifier #2, with the cognitive event. That is, the request location information inquiry unit 206 combines necessary information on the held request with the cognitive event. For example, in order to send the shared information (S304), the edge computer 2 further performs steps ST110 and ST111, and performs output to a memory area or the like in the communication unit 201. If the result of the query indicates that there is no request corresponding to the location of the cognitive event, that is, the request has not been accepted (step ST115: No), the edge computer 2 ends the procedure.

Figure 12:
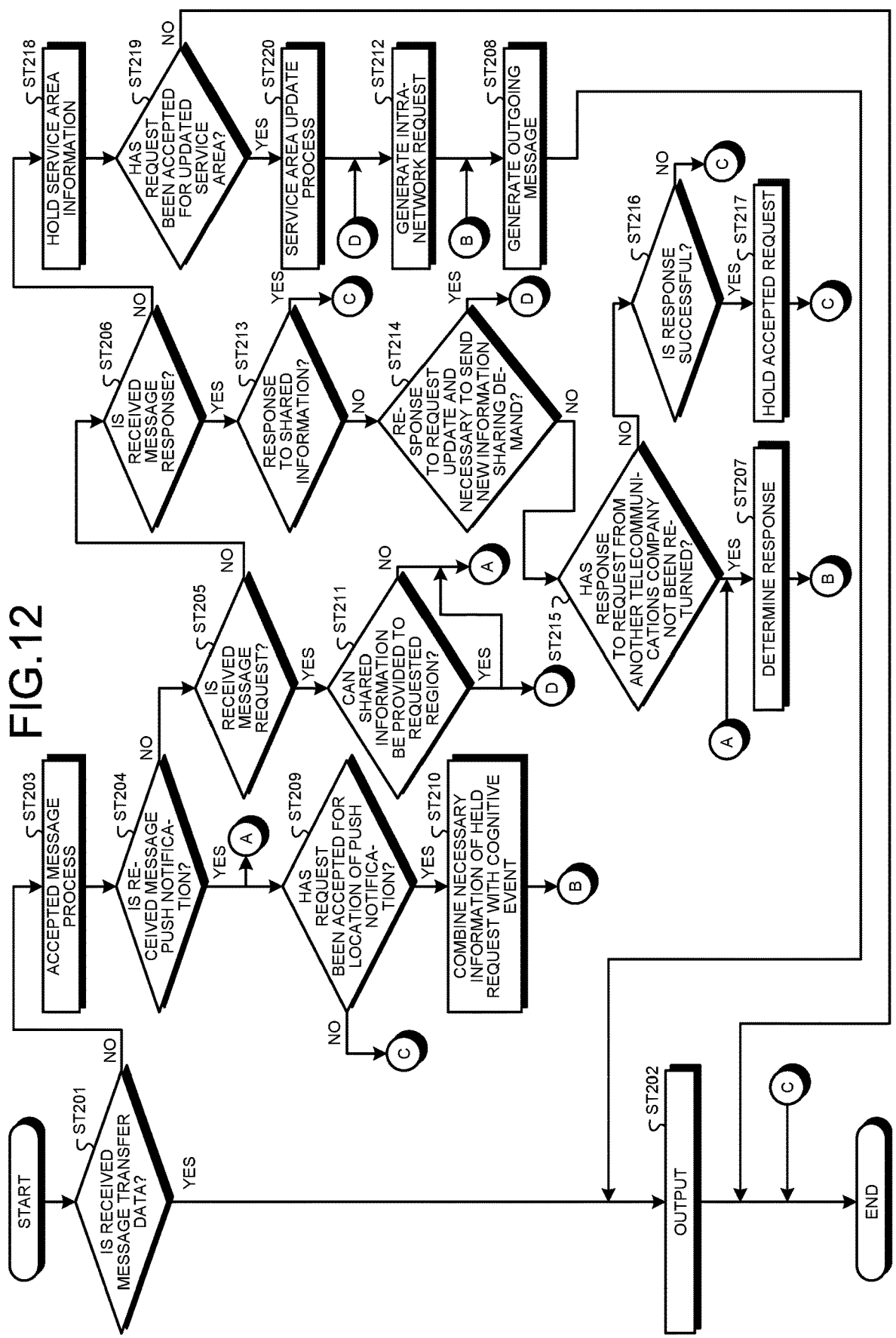
FIG. 12 is a flowchart illustrating the operation of the gateway based on the program that is executed by the gateway according to the first embodiment.

Next, the program that is executed by the gateway 3 will be described. FIG. 12 is a flowchart illustrating the operation of the gateway 3 based on the program that is executed by the gateway 3 according to the first embodiment.

In the flowchart of the gateway 3 illustrated in FIG. 12, step ST201 is a process in the transfer determination unit 302. In response to determining in the above-described determination process that the received message is transfer data (step ST201: Yes), the transfer determination unit 302 outputs the message of the transfer data to a memory area or the like in the communication unit 301 (step ST202).

Steps ST203 to ST206 are processes in the accepted message processing unit 303. In the case where the received message is not transfer data (step ST201: No), step ST203 is a process in the accepted message processing unit 303 including the above-described unencapsulation. Step ST203 is the same process as step ST101 described above in the edge computer 2. Steps ST204 to ST206 correspond to the above-described output destination switching process in the accepted message processing unit 303. The gateway 3 determines in step ST204 whether the received message is a push notification as described above, and in response to determining that the received message is a push notification (step ST204: Yes), performs steps ST207 and ST209. Step ST207 is the same process as step ST109 described above in the edge computer 2. In response to determining that the received message is not a push notification (step ST204: No), the gateway 3 determines in step ST205 whether the received message is a request as described above. In response to determining that the received message is a request (step ST205: Yes), the gateway 3 performs step ST211. Step ST205 is the same process as step ST103 described above in the edge computer 2. In response to determining that the received message is not a request (step ST205: No), the gateway 3 determines in step ST206 whether the received message is a response as described above. In response to determining that the received message is a response (step ST206: Yes), the gateway 3 performs step ST213. Step ST206 is the same process as step ST102 described above in the edge computer 2.

The case where the message is a push notification message (step ST204: Yes) is the case where the gateway 3 has received a push notification message. In response to determining that the message is a push notification message (step ST204: Yes), the gateway 3 performs the response determination process in step ST207 corresponding to the response determination unit 310 described above. Steps ST208 and ST202 subsequent to step ST207 correspond to the above-described processes in the outgoing message generation unit 312. Consequently, the gateway 3 can send the response (S110), for example. Step ST207 is the same process as step ST109 described above in the edge computer 2. Step ST208 is the same process as step ST110 described above in the edge computer 2. Step ST202 is the same process as step ST111 described above in the edge computer 2. Note that step ST202 corresponds to a subroutine common to the transfer determination unit 302 and the outgoing message generation unit 312.

Furthermore, in response to determining that the message is a push notification message (step ST204: Yes), the gateway 3 proceeds to conditional branches through step ST209 corresponding to the query process from the request identifier inquiry unit 307 to the accepted request holding unit 308. If the result of the query indicates that there is a record having the identifier same as the identifier of the push notification, that is, the request has been accepted for the location indicated by the push notification (step ST209: Yes), the gateway 3 performs step ST210. In step ST210, as described above, the request identifier inquiry unit 307 combines a part of the request held by the accepted request holding unit 308, e.g. identifier #1, with the cognitive event. That is, the request identifier inquiry unit 307 combines necessary information on the held request with the cognitive event. For example, in order to send the shared information (S307), the gateway 3 further performs steps ST208 and ST202, and performs output to a memory area or the like in the communication unit 301. If the result of the query indicates that there is no record having the identifier same as the identifier of the push notification, that is, the request has not been accepted for the location indicated by the push notification (step ST209: No), the gateway 3 ends the procedure.

The case where the message is a request message (step ST205: Yes) is the case where the gateway 3 has received a request message. The gateway 3 performs step ST211 corresponding to the above-described process in the request analysis unit 305. The request analysis unit 305 makes an inquiry to the accepted request holding unit 308, and determines whether the request made can be accepted. If the request has been accepted, the request analysis unit 305 selects No (step ST211: No). In response to determining that shared information can be provided to the requested region, that is, the region indicated by the location information and the range from the location information requested (step ST211: Yes), the gateway 3 performs a process of generating an intra-network request (step ST212). In the case of step ST211: No or step ST211: Yes, the gateway 3 performs step ST207. The intra-network request generation unit 311 performs in step ST212 the process of generating an intra-network request as described above. Subsequently, the gateway 3 performs steps ST208 and ST202, and performs output to a memory area or the like in the communication unit 301 in order to send the request (S105), for example.

The case where the message is a response message (step ST206: Yes) is the case where the gateway 3 has received a response message. The gateway 3 performs step ST213 corresponding to the above-described process in the response processing unit 306. Step ST213 is the process in the response processing unit 306 in the case that the response is the response (S308) to the shared information (S307), for example. If the response is a response to shared information (step ST213: Yes), the gateway 3 ends the procedure. If the response is not a response to shared information (step ST213: No), the gateway 3 proceeds to step ST214 that has conditional branches that depend on whether the response is a response to a request update and it is necessary to send a new information sharing demand. If the response is a response to a request update and it is necessary to send a new information sharing demand (step ST214: Yes), the gateway 3 performs step ST212. This is the case where the gateway 3 has received the response (S409). In order to send the request (S410), the gateway 3 performs steps ST212, ST208, and ST202, and performs output to a memory area or the like in the communication unit 301.

If the response is not a response to a request update and it is not necessary to send a new information sharing demand (step ST214: No), the gateway 3 proceeds to step ST215 that has further conditional branches. If a response to a request from another telecommunications company has not been returned (step ST215: Yes), the gateway 3 performs steps ST207, ST208, and ST202, and performs output to a memory area or the like in the communication unit 301 in order to send a response corresponding to the response (S108). The gateway 3 performs step ST216 regardless of whether step ST215: Yes or a response to a request from another telecommunications company has been returned (step ST215: No). If the response is successful (step ST216: Yes), the gateway 3 holds the accepted request in step ST217, specifically, performs an accepted request update process. Step ST217 corresponds to the accepted request update process after the reception of the response (S108) described above, and the accepted request update process for updating the existing record of the request (S103) in the accepted request holding unit 308 to a record corresponding to the request (S410) for the edge computer 2A-2 after the reception of the response (S413) related to the request update. If the response is not successful (step ST216: No) or after step ST217, the gateway 3 ends the procedure. Steps ST213 to ST216 correspond to processes in the response processing unit 306. Step ST217 corresponds to a process in the accepted request holding unit 308.

Step ST206: No is the process in the case that the gateway 3 has received service area update notification and update service area information, and the updated service area information is held (step ST218). Subsequently, the gateway 3 determines whether a request has been accepted for the updated service area 4 (step ST219). Step ST219 corresponds to the process of investigating the correspondence between the updated service area 4 and the accepted request in the sequence diagram illustrated in FIG. 8. In response to determining that the request has been accepted for the updated service area 4 (step ST219: Yes), the gateway 3 performs a service area update process (step ST220) and steps ST212, ST208, and ST202, and performs output to a memory area or the like in the communication unit 301 in order to send the request (S406). Steps ST219 and ST220 correspond to processes in the service area update unit 309, and include a query from the service area update unit 309 to the accepted request holding unit 308. In response to determining that a request has not been accepted for the updated service area 4 (step ST219: No), the gateway 3 ends the procedure.

In the present embodiment, the gateways 3 are separated into the gateway 3A of telecommunications company A and the gateway 3B of telecommunications company B; however, a system configuration in which the functions of the gateway 3A and the gateway 3B are combined may be used. In addition, although the gateway 3 and the edge computer 2 are separated in the configuration of the communication system 20 illustrated in FIG. 1, some edge computer 2 may have the function of the gateway 3. If the edge computer 2 having the function of the gateway 3 includes the communication unit 301 capable of communicating with other edge computers 2 in the network, the edge computer 2 having the function of the gateway 3 may share information with other telecommunications companies. The communication between the edge computer 2 having the function of the gateway 3 and other edge computers 2 in the network may be direct communication or may be communication that involves relays, bridges, routing, or the like.

Although the present embodiment has been described on the basis of the system configuration in which the edge computer 2 and the base station 1 are connected on a one-to-one basis, two or more base stations 1 may be connected to the edge computer 2. The edge computer 2 may hold the service area information of each base station 1 in the service area information holding unit 203, and make an information sharing request for the region corresponding to each base station 1. In this case, the edge computer 2 need not make an information sharing request for all of the plurality of connected base stations 1.

Although the communication system 20 illustrated in FIG. 1 has the system configuration in which the edge computer 2 is directly connected to the gateway 3 and has a two-layer structure of the gateway 3 and the edge computer 2, a system configuration in which the edge computers 2 are formed by two or more layers in a tree-like configuration may be used. For example, the system configuration may have the edge computer 2 for a wide area and the edge computer 2 in charge of a narrower region, or the edge computers 2 may be classified according to the data type to be handled, e.g. local situations such as traffic accidents, fallen objects, road cave-ins, or freezing, and traffic jams.

Although the description of drawings such as FIGS. 3 and 4 is based on the premise that the communication unit 201 performs transmission and reception using one interface as viewed from the edge computer 2, transmission and reception may be performed using different interfaces. The edge computer 2 may include two or more communication units 201. In addition, the edge computer 2 may include different communication units 201 for the telecommunications company network to which the edge computer 2 belongs and for other telecommunications company networks. The above description of the communication unit 201 of the edge computer 2 also applies to the communication unit 301 of the gateway 3.

As described above, according to the present embodiment, in the communication system 20, the edge computer 2B of telecommunications company B sends a request that is an information sharing demand including location information, a range from the location information, and an identifier, and the gateway 3A of telecommunications company A different from telecommunications company B determines the edge computer 2A capable of sending shared information in response to the demand from the edge computer 2B. The edge computer 2A receives emergency information recognized by the vehicle 11A capable of communicating with telecommunications company A, and sends shared information including the emergency information to the edge computer 2B, and the edge computer 2B sends the shared information to the vehicle 11B capable of communicating with telecommunications company B.

Consequently, in the communication system 20, information such as emergency information that has not been recognized by the vehicle 11B capable of communicating with telecommunications company B and that has been recognized by the vehicle 11A capable of communicating with telecommunications company A can be sent from telecommunications company A to telecommunications company B on the basis of the information sharing demand. Therefore, the vehicle 11B capable of communicating with telecommunications company B can also obtain the emergency information recognized by the vehicle 11A incapable of communicating with telecommunications company B. That is, the communication system 20 can share information such as emergency information recognized by one or more vehicles 11 between different telecommunications companies without the need that each telecommunications company uses information on the network configuration of other telecommunications companies, and distribute the information to the vehicles 11 capable of communicating with the base station 1 of each telecommunications company. In the communication system 20, shared information can be sent without the need that the gateway 3 connecting the telecommunications company networks selects the base station 1 from which the shared information is to be sent from the location information included in the shared information.

Second Embodiment

In the first embodiment, upon an information sharing demand from the edge computer 2B to the gateway 3A, the gateway 3A terminates the information sharing demand from the edge computer 2B and selects the edge computer 2A-1 to request information sharing, and the edge computer 2A-1 requested by the gateway 3A serves as the transmission source of shared information. A second embodiment describes a case in which, upon an information sharing demand from the edge computer 2B to the gateway 3A, the gateway 3A terminates the information sharing demand from the edge computer 2B, requests all the edge computers 2A in the network to share information, and sorts out the shared information sent from all the edge computers 2A. Note that in the second embodiment, the configuration of the communication system 20 is the same as the configuration of the communication system 20 in the first embodiment illustrated in FIG. 1.

Figure 13:
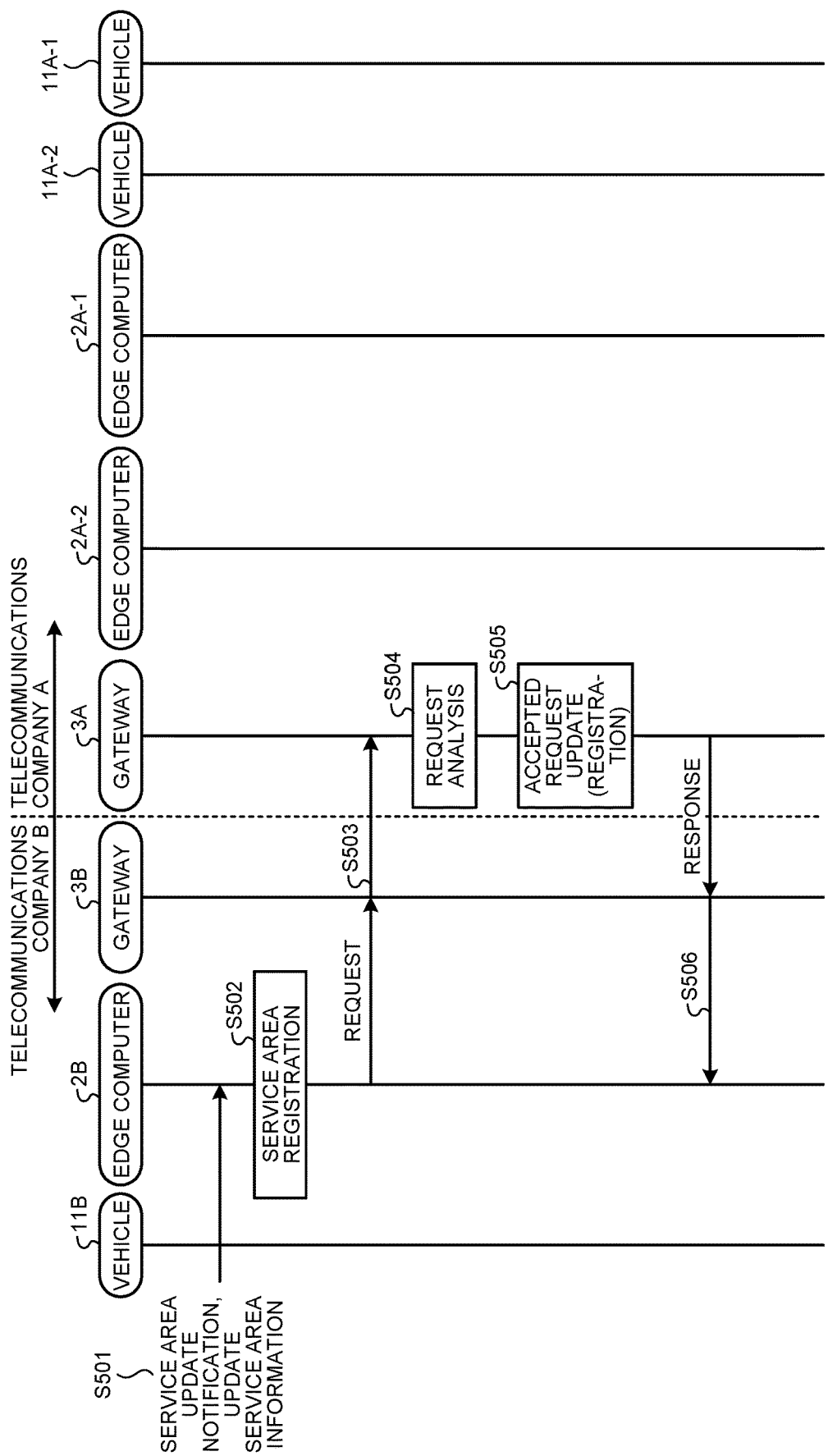
FIG. 13 is a sequence diagram illustrating an operation in which the edge computer of telecommunications company B requests telecommunications company A to share information in the communication system according to a second embodiment.

The operation of each device provided in the communication system 20 will be described. FIG. 13 is a sequence diagram illustrating an operation in which the edge computer 2B of telecommunications company B requests telecommunications company A to share information in the communication system 20 according to the second embodiment. In the sequence diagram illustrated in FIG. 13, steps S501 to S503 in the edge computer 2B are the same processes as steps S101 to S103 illustrated in the sequence diagram of FIG. 2. In addition, in the sequence diagram illustrated in FIG. 13, the transfer process by the gateway 3B and the reception process by the gateway 3A are also the same as the processes of the gateway 3B and the gateway 3A in the sequence diagram illustrated in FIG. 2. The request message (hereinafter referred to as the request (S503)) sent in step S503 from the edge computer 2B in the sequence diagram illustrated in FIG. 13 is the same as the request (S103) sent from the edge computer 2B in the sequence diagram illustrated in FIG. 2.

The gateway 3A performs a request analysis process on the request (S503) (step S504). The gateway 3A determines in the request analysis process whether the region specified by the location information and the range from the location information included in the request (S503) is included in the service area 4 of telecommunications company A. In response to determining that the region specified by the location information and the range from the location information included in the request (S503) is included in the service area 4A of telecommunications company A, the gateway 3A performs an accepted request update process (step S505), and sends a response as the result of accepting the request (step S506). The response message (hereinafter referred to as the response (S506)) sent in step S506 from the gateway 3A is the same as the response (S110) sent from the gateway 3A in the first embodiment. The gateway 3B transfers the response (S506) to the edge computer 2B. The edge computer 2B receives the response (S506) transferred from the gateway 3B.

Figure 14:
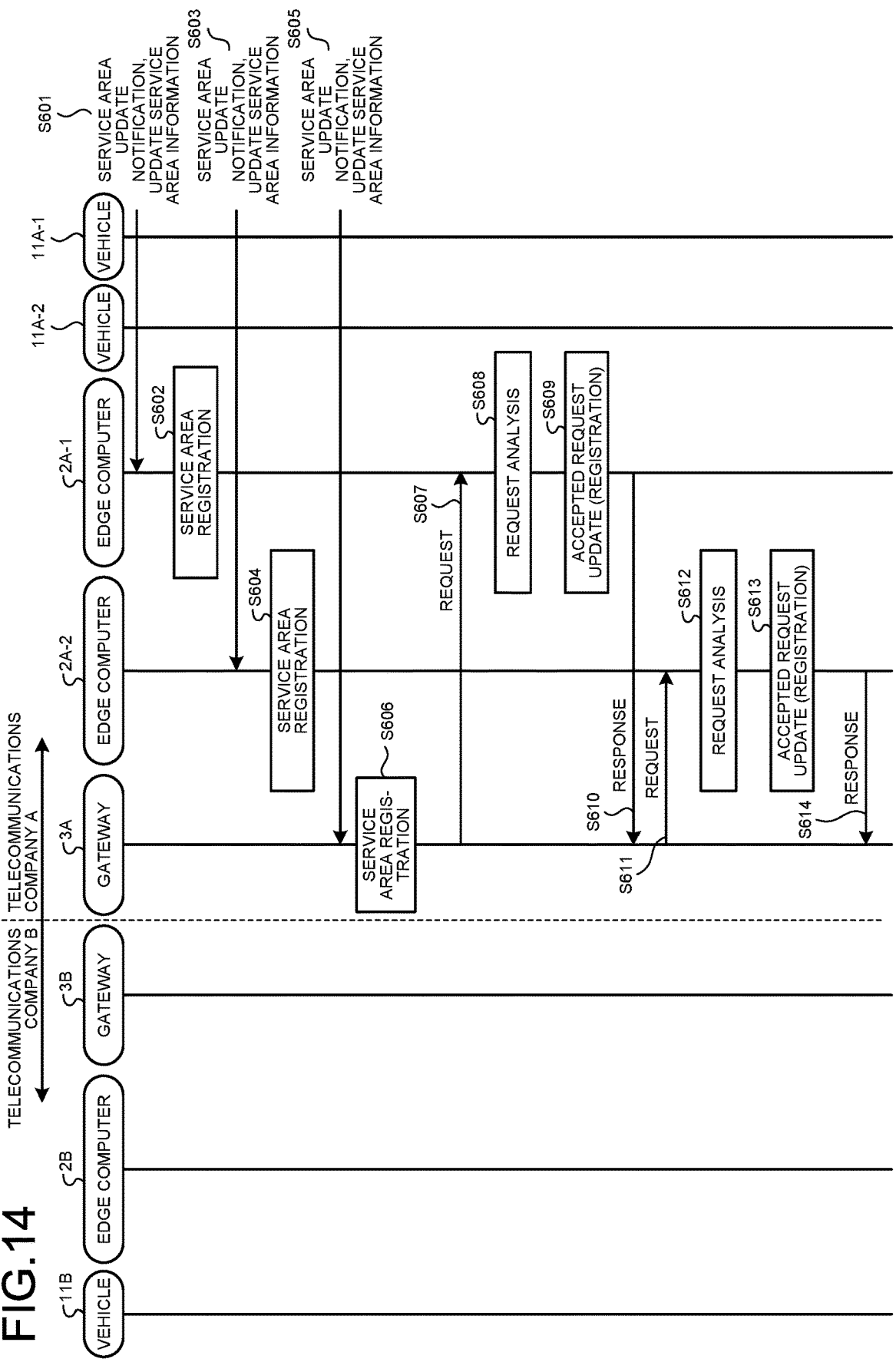
FIG. 14 is a sequence diagram illustrating an operation of requesting information sharing within telecommunications company A in the communication system according to the second embodiment.

Next, an operation in which an information sharing demand is made within telecommunications company A will be described. FIG. 14 is a sequence diagram illustrating an operation of requesting information sharing within telecommunications company A in the communication system 20 according to the second embodiment. The edge computer 2A-1 accepts service area update notification and update service area information (step S601), and performs a service area registration process (step S602). Similarly, the edge computer 2A-2 accepts service area update notification and update service area information (step S603), and performs a service area registration process (step S604). The gateway 3A accepts service area update notification and update service area information (step S605), and performs a service area registration process (step S606). Triggered by the service area update notification and the update service area information, the gateway 3A sends an information sharing request to all the edge computers 2A in the network.

The gateway 3A sends a request message for requesting information sharing to the edge computer 2A-1 in the network (step S607). It is assumed that the region indicated by the location information and the range from the location information included in the request message (hereinafter referred to as the request (S607)) sent in step S607 from the gateway 3A coincides with the service area 4A-1 provided by the base station 1A-1 connected to the edge computer 2A-1 that receives the request (S607).

The edge computer 2A-1 receives the request (S607), and performs a request analysis process on the request (S607) (step S608). In the request analysis process, the edge computer 2A-1 compares the region indicated by the location information and the range from the location information included in the request (S607) with the service area 4A-1 provided by the base station 1A-1 connected to the edge computer 2A-1, and determines whether it is possible to provide shared information. The sequence diagram illustrated in FIG. 14 represents a case where the request (S607) succeeds. The edge computer 2A-1 performs an accepted request update process (step S609), and sends a response message (hereinafter referred to as the response (S610)) (step S610).

Similarly, the gateway 3A sends a request message for requesting information sharing to the edge computer 2A-2 in the network (step S611). It is assumed that the region indicated by the location information and the range from the location information included in the request message (hereinafter referred to as the request (S611)) sent in step S611 from the gateway 3A coincides with the service area 4A-2 provided by the base station 1A-2 connected to the edge computer 2A-2 that receives the request (S611).

The edge computer 2A-2 receives the request (S611), and performs a request analysis process on the request (S611) (step S612). In the request analysis process, the edge computer 2A-2 compares the region indicated by the location information and the range from the location information included in the request (S611) with the service area 4A-2 provided by the base station 1A-2 connected to the edge computer 2A-2, and determines whether it is possible to provide shared information. The sequence diagram illustrated in FIG. 14 represents a case where the request (S611) succeeds. The edge computer 2A-2 performs an accepted request update process (step S613), and sends a response (step S614).

The request analysis process (step S608 and step S612) in the edge computers 2A-1 and 2A-2 may be skipped as long as the location information and the range from the location information included in the request sent by the gateway 3A indicate a region acceptable by the edge computer 2A. Note that in the sequence diagram illustrated in FIG. 14, the reason why the gateway 3A makes a request to the edge computers 2A-1 and 2A-2 is that the gateway 3A has not made a request to the edge computers 2A-1 and 2A-2 in the network. The gateway 3A may skip the request to the edge computer 2A which has already been requested. Consequently, the gateway 3A requests all the edge computers 2A in the network to share information, and sorts out the shared information sent from all the edge computers 2A in accordance with the demand from the edge computer 2A, so that it is possible to send a cognitive event such as emergency information from telecommunications company A to telecommunications company B.

The operation in which information sharing is requested between the edge computers 2A-1 and 2A-2 can be performed through the sequence diagram illustrated in FIG. 5 as in the first embodiment. Here, it is assumed that the edge computers 2A-1 and 2A-2 have also performed the operation of the sequence diagram illustrated in FIG. 5. Note that the operations illustrated in the sequence diagrams of FIGS. 13, 14, and 5 can be performed in random order. Here, it is assumed that the information sharing demand for sending cognitive event notification as shared information from all the edge computers 2A of telecommunications company A to the gateway 3A has succeeded through the operation of the sequence diagram illustrated in FIG. 14, the information sharing demand for sending shared information from telecommunications company A to telecommunications company B has succeeded through the operation of the sequence diagram illustrated in FIG. 13, and the information sharing demand between the edge computers 2A-1 and 2A-2 in telecommunications company A has been met through the operation of the sequence diagram illustrated in FIG. 5.

Figure 15:
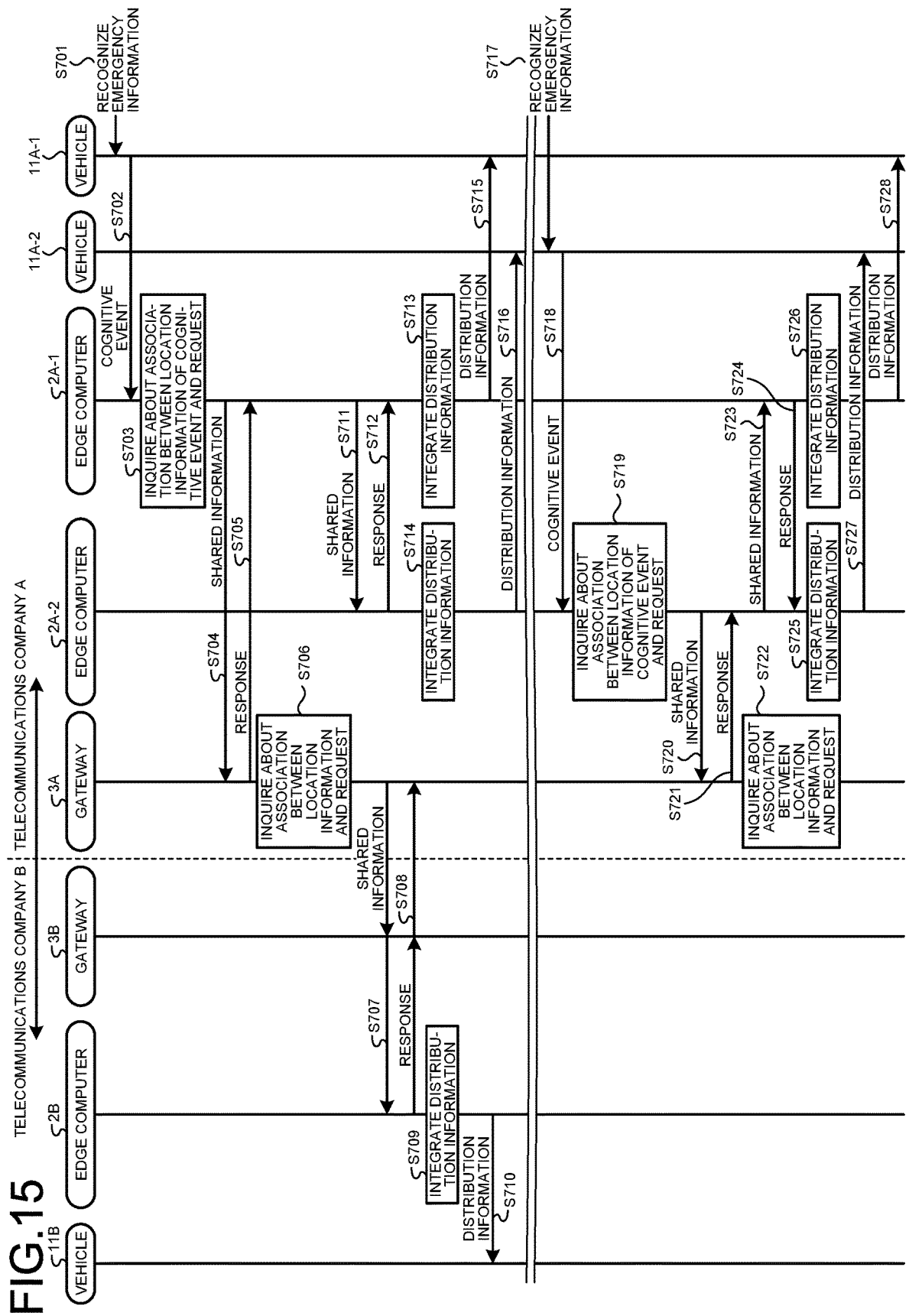
FIG. 15 is a sequence diagram illustrating an operation in which shared information is sent between edge computers in the communication system according to the second embodiment.

Next, an operation will be described in which emergency information is shared via the edge computer 2 from the vehicle 11 that has recognized the emergency information, that is, the emergency information is distributed to the vehicles 11 in each service area 4. FIG. 15 is a sequence diagram illustrating an operation in which shared information is sent between the edge computers 2 in the communication system 20 according to the second embodiment. Upon recognizing emergency information (step S701), the vehicle 11A-1 notifies the edge computer 2A-1 of the cognitive event indicating the event of the recognized emergency information via the base station 1A-1 (not illustrated in FIG. 15) (step S702). The cognitive event (hereinafter referred to as the cognitive event (S702)) delivered in step S702 from the vehicle 11A-1 is the same as the cognitive event (S302) in the first embodiment illustrated in the sequence diagram of FIG. 6.

Upon receiving the cognitive event (S702) delivered from the vehicle 11A-1, the edge computer 2A-1 performs a process of inquiring about the association between the location information of the cognitive event and the request using the cognitive event (S702) (step S703), as in the first embodiment. The edge computer 2A-1 sends the cognitive event (S702) as a shared information message by designating the gateway 3A that is the request source of the matching request (S607) as the destination (step S704).

The gateway 3A sends a response to the shared information message (hereinafter referred to as the shared information (S704)) sent in step S704 from the edge computer 2A-1 (step S705). The response message (hereinafter referred to as the response (S705)) sent in step S705 from the gateway 3A is the same as the response (S305) in the first embodiment illustrated in the sequence diagram of FIG. 6. The gateway 3A inquires about the association between the location information included in the shared information (S704) and the request sent from telecommunications company B (step S706). Specifically, the gateway 3A determines whether there is a request corresponding to the location information of the shared information (S704) and sent from telecommunications company B. The result of the inquiry indicates that there is a matching request (S503), and thus the gateway 3A sends a shared information message (step S707). The shared information message (hereinafter referred to as the shared information (S707)) sent in step S707 from the gateway 3A is the same as the shared information (S307) in the first embodiment illustrated in the sequence diagram of FIG. 6.

Note that the gateway 3A inquires whether there is a request corresponding to the location information with respect to the shared information (S704), but the request (S607), the request (S611), and the request (S503) may be associated with each other. As in the first embodiment, if identifier #2 has also been sent together with the shared information (S704), the gateway 3A can perform the inquiry process after the reception of the shared information (S704) not with respect to the location information but by means of simpler identifier matching. In this case, the shared information (S704) is the same as the shared information (S304) in the first embodiment illustrated in the sequence diagram of FIG. 6.

The gateway 3B transfers the shared information (S707) to the edge computer 2B. The edge computer 2B receives the shared information (S707), and sends a response message as in the first embodiment (step S708). The response message (hereinafter referred to as the response (S708)) sent in step S708 from the edge computer 2B is the same as the response (S308) in the first embodiment illustrated in the sequence diagram of FIG. 6.

The edge computer 2B performs a distribution information integration process of integrating the emergency information acquired with the shared information (S707) into the distribution information to be distributed from the edge computer 2B (step S709). Step S709 is the same process as step S309 in the first embodiment illustrated in the sequence diagram of FIG. 6. The edge computer 2B distributes the integrated distribution information to the vehicle 11B via the base station 1B (step S710). The distribution information distributed in step S710 is the same as the distribution information distributed in step S310 in the first embodiment illustrated in the sequence diagram of FIG. 6.

The edge computer 2A-1 sends the cognitive event (S702) to the edge computer 2A-2 as a shared information message (step S711). The edge computer 2A-2 receives the shared information message (hereinafter referred to as the shared information (S711)) sent in step S711 from the edge computer 2A-1. The edge computer 2A-2 sends a response message (hereinafter referred to as the response (S712)) to the shared information (S711) (step S712). The edge computer 2A-1 performs a distribution information integration process of integrating the emergency information delivered with the cognitive event (S702) into the distribution information to be distributed from the edge computer 2A-1 (step S713). The edge computer 2A-2 performs a distribution information integration process of integrating the emergency information acquired with the shared information (S711) into the distribution information to be distributed from the edge computer 2A-2 (step S714). The edge computer 2A-1 distributes the integrated distribution information to the vehicle 11A-1 via the base station 1A-1 (step S715). The edge computer 2A-2 distributes the integrated distribution information to the vehicle 11A-2 via the base station 1A-2 (step S716).

Upon recognizing emergency information (step S717), the vehicle 11A-2 notifies the edge computer 2A-2 of the cognitive event indicating the event of the recognized emergency information via the base station 1A-2 (step S718). The cognitive event (hereinafter referred to as the cognitive event (S718)) delivered in step S718 from the vehicle 11A-2 is the same as the cognitive event (S318) in the first embodiment illustrated in the sequence diagram of FIG. 6. Upon receiving the cognitive event (S718), the edge computer 2A-2 performs a process of inquiring about the association between the location information of the cognitive event and the request using the cognitive event (S718) (step S719), as in the first embodiment. The edge computer 2A-2 sends the cognitive event (S718) as a shared information message by designating the gateway 3A that is the request source of the matching request (S611) as the destination (step S720). The shared information message (hereinafter referred to as the shared information (S720)) sent in step S720 from the edge computer 2A-2 is the same as the shared information (S320) in the first embodiment illustrated in the sequence diagram of FIG. 6. However, if each piece of shared information includes an identifier, the identifier of the shared information (S320) is different from the identifier of the shared information (S720).

The gateway 3A sends a response message to the shared information (S720) (step S721). The response message (hereinafter referred to as the response (S721)) sent in step S721 from the gateway 3A is the same as the above-described responses such as the response (S305) and the response (S705). The gateway 3A inquires about the association between the location information included in the shared information (S720) and the request sent from telecommunications company B (step S722). The result of the inquiry indicates that there is no matching request, and thus the gateway 3A does nothing.

The edge computer 2A-2 sends the cognitive event (S718) to the edge computer 2A-1 as a shared information message (step S723). The edge computer 2A-1 receives the shared information message (hereinafter referred to as the shared information (S723)) sent in step S723 from the edge computer 2A-2. The edge computer 2A-1 sends a response message (hereinafter referred to as the response (S724)) to the shared information (S723) (step S724). The edge computer 2A-2 performs a distribution information integration process of integrating the emergency information delivered with the cognitive event (S718) into the distribution information to be distributed from the edge computer 2A-2 (step S725). The edge computer 2A-1 performs a distribution information integration process of integrating the emergency information acquired with the shared information (S723) into the distribution information to be distributed from the edge computer 2A-1 (step S726). The edge computer 2A-2 distributes the integrated distribution information to the vehicle 11A-2 via the base station 1A-2 (step S727). The edge computer 2A-1 distributes the integrated distribution information to the vehicle 11A-1 via the base station 1A-1 (step S728).

Figure 16:
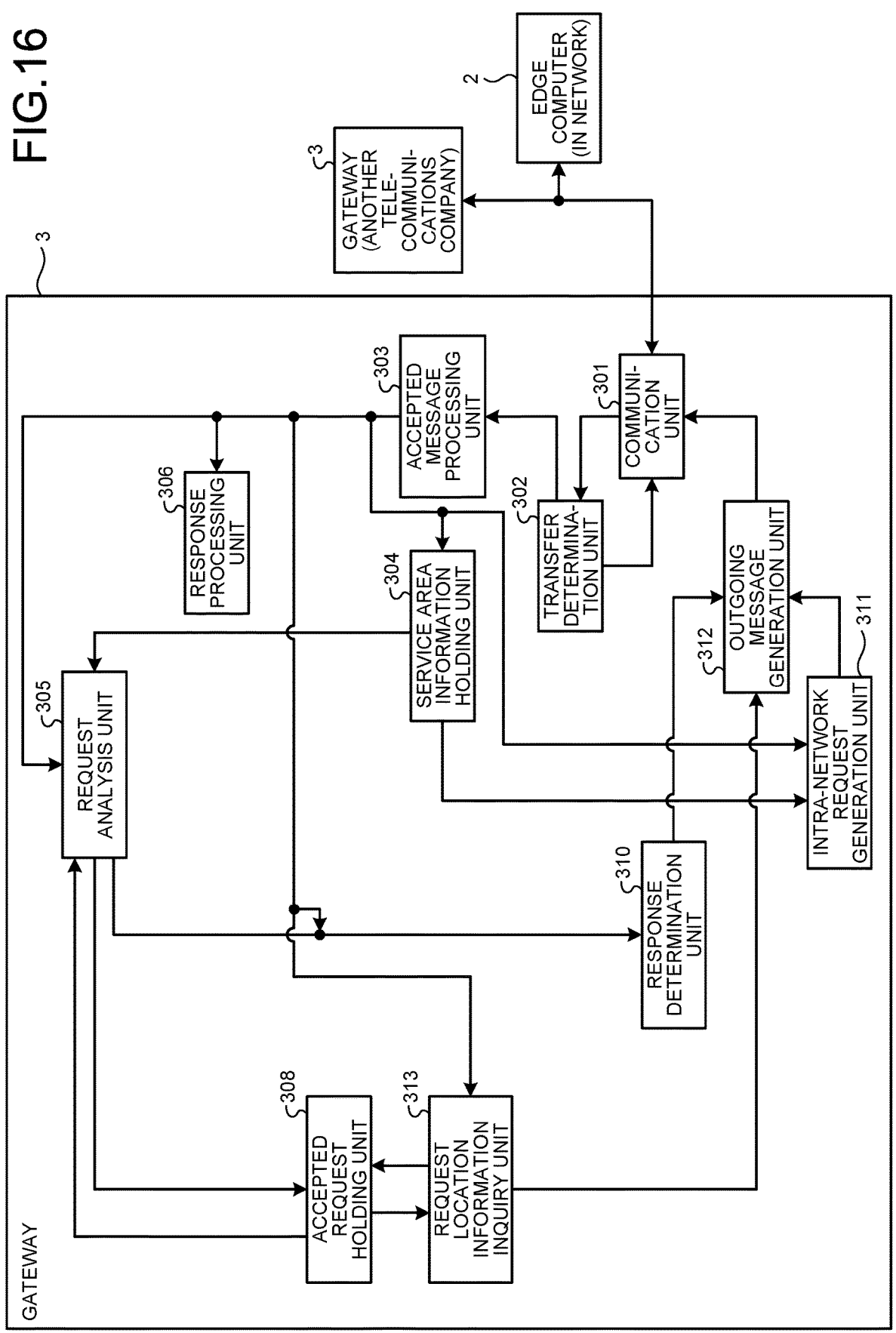
FIG. 16 is a block diagram illustrating an exemplary configuration of a gateway according to the second embodiment.

The operations of the sequence diagrams illustrated in FIGS. 13 to 15 will be described in detail using the configuration of each device. The configuration of the edge computer 2 is the same as the configuration in the first embodiment illustrated in FIG. 3. FIG. 16 is a block diagram illustrating an exemplary configuration of the gateway 3 according to the second embodiment. The gateway 3 includes the communication unit 301, the transfer determination unit 302, the accepted message processing unit 303, the service area information holding unit 304, the request analysis unit 305, the response processing unit 306, the accepted request holding unit 308, the response determination unit 310, the intra-network request generation unit 311, the outgoing message generation unit 312, and a request location information inquiry unit 313.

First, the sequence diagram illustrated in FIG. 13 will be described. The edge computer 2B accepts service area update notification and update service area information in step S501 in the sequence diagram illustrated in FIG. 13. In the edge computer 2B, the service area information holding unit 203 acquires and holds the update service area information via the communication unit 201 and the accepted message processing unit 202. In addition, the request generation unit 210 acquires the service area update notification via the communication unit 201 and the accepted message processing unit 202. Triggered by the service area update notification, the request generation unit 210 determines and outputs the region in which information sharing is requested and identifier #1 on the basis of the service area region information acquired from the service area information holding unit 203. The edge computer 2B sends the message of the request (S503) via the outgoing message generation unit 211 and the communication unit 201.

As in the first embodiment, the gateway 3B determines in the transfer determination unit 302 whether to transfer the request (S503), and transfers the request (S503) via the communication unit 301.

In the gateway 3A, as in the first embodiment, the request analysis unit 305 acquires data of the request (S503) via the communication unit 301, the transfer determination unit 302, and the accepted message processing unit 303.

The request analysis unit 305 determines whether the region specified by the location information and the range from the location information included in the request (S503) is included in the service area 4A of telecommunications company A acquired from the service area information holding unit 304. In response to determining that the region specified by the location information and the range from the location information included in the request (S503) is included in the service area 4A of telecommunications company A, the request analysis unit 305 checks whether a record matching identifier #1 or the location information and the range from the location information has been registered in the accepted request holding unit 308. The request analysis unit 305 outputs the location information, the range from the location information, and identifier #1 to the accepted request holding unit 308 in order to check whether a corresponding record has been registered in the accepted request holding unit 308. In response to determining that the region specified by the location information and the range from the location information is included in the service area 4A of telecommunications company A, the request analysis unit 305 outputs the determination result to the response determination unit 310. In response to determining that the region specified by the location information and the range from the location information is not included in the service area 4A of telecommunications company A, the request analysis unit 305 outputs, to the response determination unit 310, an error indicating that the region is not included. If the request has already been registered in the accepted request holding unit 308, the request analysis unit 305 can output an indication of either success or failure to the response determination unit 310. However, in the case of failure, the output from the response determination unit 310 desirably includes an indication that the reason for the error is the existence of the registered request. Unlike in the first embodiment, the request analysis unit 305 outputs nothing to the intra-network request generation unit 311.

As in the first embodiment, the response determination unit 310 generates the response (S506) to the request (S503), and outputs the response (S506) to the outgoing message generation unit 312. The outgoing message generation unit 312 converts the response (S506) into a format in which the response (S506) can be sent, and outputs the converted response (S506) to the communication unit 301. The communication unit 301 sends the response (S506).

As in the first embodiment, the gateway 3B transfers the response (S506) to the edge computer 2B through processes in the communication unit 301 and the transfer determination unit 302.

In the edge computer 2B, as in the first embodiment, the response processing unit 205 acquires data of the response (S506) via the communication unit 201 and the accepted message processing unit 202.

Next, the sequence diagram illustrated in FIG. 14 will be described. The gateway 3A receives service area update notification and update service area information, and holds service area region information in the service area information holding unit 304. Triggered by the service area update notification, the intra-network request generation unit 311 outputs the request (S607) and the request (S611) to the outgoing message generation unit 312 on the basis of the region information acquired from the service area information holding unit 304. The outgoing message generation unit 312 converts the request (S607) and the request (S611) into a format in which these can be sent, and outputs the converted request (S607) and request (S611) to the communication unit 301. The communication unit 301 sends the request (S607) and the request (S611). Note that whereas the intra-network request generation unit 311 in the first embodiment sends a request to only the edge computer 2A that needs to be requested in accordance with the output from the request analysis unit 305, the intra-network request generation unit 311 in the second embodiment sends a request to all the edge computers 2A on the basis of the service area region information acquired from the service area information holding unit 304. However, as described above, in the case of an update of the service area 4A, the intra-network request generation unit 311 only needs to send a request to the necessary edge computer 2A.

As in the first embodiment, the edge computer 2A-1 sends the response (S610) to the request (S607). The edge computer 2A-2 sends the response (S614) to the request (S611) in a similar manner to the edge computer 2A-1.

In the gateway 3A, the response processing unit 306 acquires the response (S610) and the response (S614) via the communication unit 301, the transfer determination unit 302, and the accepted message processing unit 303, and ends the intra-network request procedure.

Regarding the sequence diagram illustrated in FIG. 5, the edge computers 2A-1 and 2A-2 perform processes similar to those in the first embodiment.

Next, the sequence diagram illustrated in FIG. 15 will be described. In FIG. 15, the processes of each device from steps S701 to S704 are the same as the processes of each device in the first embodiment. In the gateway 3A, the request location information inquiry unit 313 acquires the shared information (S704) via the communication unit 301, the transfer determination unit 302, and the accepted message processing unit 303. The request location information inquiry unit 313 performs a process similar to that performed by the request location information inquiry unit 206 of the edge computer 2 in the first embodiment. The request location information inquiry unit 313 outputs a query in which the location information of the cognitive event (S702) is used as a key to the accepted request holding unit 308 in order to inquire whether the location information of the cognitive event (S702) is included in the region specified by the location information and the range from the location information registered in the accepted request holding unit 308.

If the query acquired from the request location information inquiry unit 313 is included in the region specified by the location information and the range from the location information held, the accepted request holding unit 308 outputs identifier #2 to the request location information inquiry unit 313. The accepted request holding unit 308 of the gateway 3A in the second embodiment is the same as the accepted request holding unit 207 of the edge computer 2 in the first embodiment.

If the query result acquired from the accepted request holding unit 308 indicates that the location information included in the cognitive event (S702) is included in the region specified by the location information and the range from the location information registered in the accepted request holding unit 308, the request location information inquiry unit 313 outputs the cognitive event (S702) acquired from the accepted message processing unit 303 and identifier #2 acquired from the accepted request holding unit 308 in combination to the outgoing message generation unit 312. If the query result acquired from the accepted request holding unit 308 indicates that the location information included in the cognitive event (S702) is not included in the region specified by the location information and the range from the location information registered in the accepted request holding unit 308, the request location information inquiry unit 313 outputs nothing to the outgoing message generation unit 312. The request location information inquiry unit 313 may be simply referred to as the request inquiry unit.

In the gateway 3A, the outgoing message generation unit 312 and the communication unit 301 perform the processes similar to those in the first embodiment, and send the shared information (S707) to the edge computer 2B.

In the gateway 3B, the communication unit 301 and the transfer determination unit 302 perform the processes similar to those in the first embodiment, and transfer the shared information (S707) to the edge computer 2B.

The edge computer 2B processes the shared information (S707) in a similar manner to the first embodiment, and sends the response (S708). Furthermore, in the edge computer 2B, the distribution information integration unit 208 acquires the shared information (S707), performs processes such as format conversion of the cognitive event into a format in which the cognitive event can be distributed to the vehicle 11B and information addition of temporal changes in the cognitive event, and integrates the cognitive event with the distribution information scheduled to be distributed by the edge computer 2B. The distribution information integration unit 208 outputs the integrated distribution information to the outgoing message generation unit 211. The outgoing message generation unit 211 and the communication unit 201 perform the processes similar to those in the first embodiment, and distribute the distribution information toward the vehicle 11B in the service area 4B via the base station 1B.

In the gateway 3B, the communication unit 301 and the transfer determination unit 302 perform the processes similar to those in the first embodiment, and transfer the response (S708) to the gateway 3A.

The processes of the edge computers 2A-1 and 2A-2 from steps S711 to S716 are the same as the processes of the edge computers 2A-1 and 2A-2 from steps S311 to S316 illustrated in the sequence diagram of FIG. 6. In addition, the processes of the edge computer 2A-2 and the gateway 3A from steps S717 to S721 are the same as the processes of the edge computer 2A-1 and the gateway 3A from steps S701 to S705 described above.

In the gateway 3A, the request location information inquiry unit 313 acquires the shared information (S720) via the communication unit 301, the transfer determination unit 302, and the accepted message processing unit 303. The request location information inquiry unit 313 outputs a query in which the location information of the cognitive event (S718) is used as a key to the accepted request holding unit 308 in order to inquire whether the location information of the cognitive event (S718) is included in the region specified by the location information and the range from the location information registered in the accepted request holding unit 308. If the query result acquired from the accepted request holding unit 308 indicates that the location information included in the cognitive event (S718) is not included in the region specified by the location information and the range from the location information registered in the accepted request holding unit 308, the request location information inquiry unit 313 outputs nothing to the outgoing message generation unit 312. That is, because the result of the inquiry indicates that the location information included in the shared information (S720) does not match any record held by the accepted request holding unit 308, the gateway 3A sends nothing to telecommunications company B.

Steps S723 to S728 are the same processes as steps S711 to S716, except that the starting points differ between the edge computers 2A-1 and 2A-2.

If the service area 4 is changed in the communication system 20, each device can cope with the changed service area 4 by performing the operations of the sequence diagrams illustrated in FIGS. 13 and 14.

Figure 17:
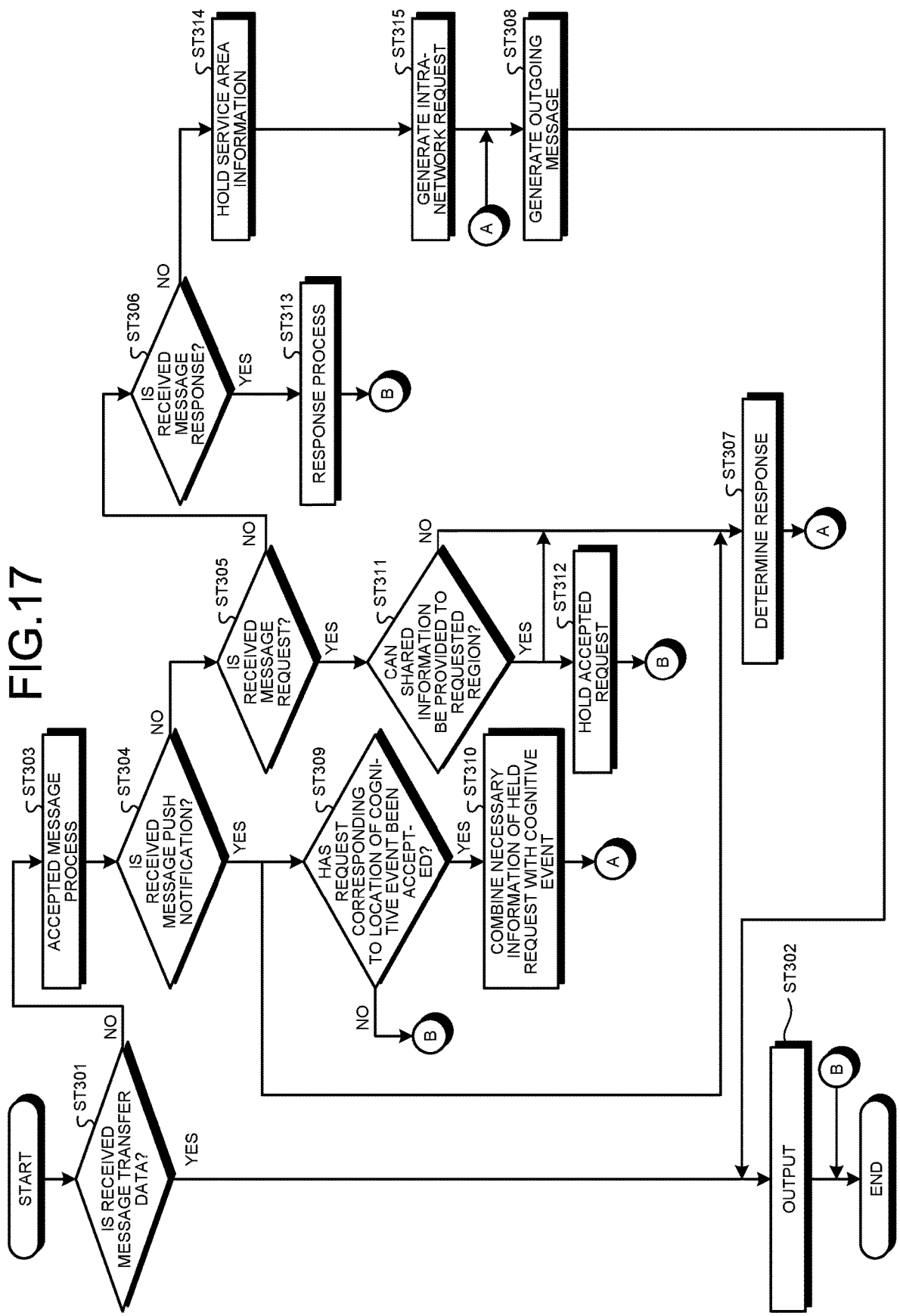
FIG. 17 is a flowchart illustrating the operation of the gateway based on the program that is executed by the gateway according to the second embodiment.

In the second embodiment, the hardware configurations of the edge computer 2 and the gateway 3 are the same as those in the first embodiment. The program that is executed by the edge computer 2 is the same as the flowchart in FIG. 11 described in the first embodiment. Here, the program that is executed by the gateway 3 will be described. FIG. 17 is a flowchart illustrating the operation of the gateway 3 based on the program that is executed by the gateway 3 according to the second embodiment.

In the flowchart of the gateway 3 illustrated in FIG. 17, step ST301 is a process in the transfer determination unit 302. In response to determining in the above-described determination process that the received message is transfer data (step ST301: Yes), the transfer determination unit 302 outputs the message of the transfer data to a memory area or the like in the communication unit 301 (step ST302). Steps ST301 and ST302 are the same processes as steps ST201 and ST202 in the first embodiment illustrated in the flowchart of FIG. 12.

Steps ST303 to ST306 are processes in the accepted message processing unit 303. In the case where the received message is not transfer data (step ST301: No), step ST303 is a process in the accepted message processing unit 303 including the above-described unencapsulation. Step ST303 is the same process as step ST203 in the first embodiment. Steps ST304 to ST306 correspond to the above-described output destination switching process in the accepted message processing unit 303. Step ST304 is the same process as step ST204 in the first embodiment, step ST305 is the same process as step ST205 in the first embodiment, and step ST306 is the same process as step ST206 in the first embodiment. The gateway 3 determines in step ST304 whether the received message is a push notification as described above, and in response to determining that the received message is a push notification (step ST304: Yes), performs steps ST307 and ST309. In response to determining that the received message is not a push notification (step ST304: No), the gateway 3 determines in step ST305 whether the received message is a request as described above. In response to determining that the received message is a request (step ST305: Yes), the gateway 3 performs step ST311. In response to determining that the received message is not a request (step ST305: No), the gateway 3 determines in step ST306 whether the received message is a response as described above. In response to determining that the received message is a response (step ST306: Yes), the gateway 3 performs step ST313.

The case where the message is a push notification message (step ST304: Yes) is the case where the gateway 3 has received a push notification message. In response to determining that the message is a push notification message (step ST304: Yes), the gateway 3 performs the response determination process in step ST307 corresponding to the response determination unit 310 described above. After step ST307, the gateway 3 performs an outgoing message generation process (step ST308). Steps ST308 and ST302 subsequent to step ST307 correspond to the above-described processes in the outgoing message generation unit 312. Consequently, the gateway 3 can send the response (S705), for example. Step ST307 is the same process as step ST207 in the first embodiment.

Furthermore, in response to determining that the message is a push notification message (step ST304: Yes), the gateway 3 proceeds to conditional branches through step ST309 corresponding to the query process from the request location information inquiry unit 313 to the accepted request holding unit 308. If the result of the query indicates that there is a request corresponding to the location of the cognitive event, that is, the request has been accepted (step ST309: Yes), the gateway 3 performs step ST310. Steps ST309 and ST310 are processes in the request location information inquiry unit 313. In step ST310, as described above, the request location information inquiry unit 313 combines a part of the request held by the accepted request holding unit 308, e.g. identifier #1, with the cognitive event. For example, in order to send the shared information (S707), the gateway 3 further performs steps ST308 and ST302, and performs output to a memory area or the like in the communication unit 301. If the result of the query indicates that there is no request corresponding to the location of the cognitive event, that is, the request has not been accepted (step ST309: No), the gateway 3 ends the procedure. Step ST309 is the same process as step ST115 of the edge computer 2 in the first embodiment, and step ST310 is the same process as step ST116 of the edge computer 2 in the first embodiment.

The case where the message is a request message (step ST305: Yes) is the case where the gateway 3 has received a request message. The gateway 3 performs step ST311 corresponding to the above-described process in the request analysis unit 305. The request analysis unit 305 makes an inquiry to the accepted request holding unit 308, and determines whether the request made can be accepted. If the request has been accepted, the request analysis unit 305 selects No (step ST311: No). In response to determining that shared information can be provided to the region indicated by the location information and the range from the location information requested (step ST311: Yes), the gateway 3 holds the request in step ST312, and ends the procedure. In addition, regardless of whether step ST311: No or step ST311: Yes, the gateway 3 performs a response determination process in step ST307 in order to send the response (S506) to the request (S503), for example. Subsequently, the gateway 3 performs steps ST308 and ST302, and performs output to a memory area or the like in the communication unit 301 in order to send the response (S506), for example. Step ST311 is the same process as step ST211 in the first embodiment, and step ST312 is the same process as step ST217 in the first embodiment.

The case where the message is a response message (step ST306: Yes) is the case where the gateway 3 has received a response message. The gateway 3 performs step ST313 corresponding to the above-described process in the response processing unit 306. Step ST313 is the response process in the response processing unit 306 in the case that the response is the response (S708) to the shared information (S707), for example. Similarly to the edge computer 2 in the first embodiment, the gateway 3 does not perform any specific process as the response process, and ends the procedure.

Step ST306: No is the process in the case that the gateway 3 has received service area update notification and update service area information, and the updated service area information is held (step ST314). Upon holding the updated service area information in step ST314, the gateway 3 performs steps ST315, ST308, and ST302, and performs output to a memory area or the like in the communication unit 301 in order to send the request (S607), for example. Step ST314 is the same process as step ST218 in the first embodiment, and step ST315 is the same process as step ST212 in the first embodiment. Note that in the second embodiment, the gateway 3 sends a request to all the service areas 4 output by the service area information holding unit 304 through steps ST315, ST308, and ST302.

In the second embodiment, the differences from the first embodiment have been mainly described, but the http protocol described in the first embodiment can also be applied.

As described above, according to the present embodiment, in the communication system 20, the edge computer 2B of telecommunications company B sends a request that is an information sharing demand including location information, a range from the location information, and an identifier, and the gateway 3A of telecommunications company A different from telecommunications company B requests all the edge computers 2A of the same telecommunications company A to share information in response to the demand from the edge computer 2B, acquires shared information from all the edge computers 2A of the same telecommunications company A, and sends the shared information to the edge computer 2B. The edge computer 2B sends the shared information to the vehicle 11B capable of communicating with telecommunications company B.

Consequently, as in the first embodiment, the communication system 20 can share information such as emergency information recognized by one or more vehicles 11 between different telecommunications companies without the need that each telecommunications company uses information on the network configuration of other telecommunications companies. In the second embodiment, in the communication system 20, the gateway 3A can acquire shared information from all the edge computers 2A of the same telecommunications company A and send the shared information to the edge computer 2B without identifying the edge computer 2A that sends the shared information. In addition, in the communication system 20, even when the configuration of the service area 4A is changed in telecommunications company A, the vehicle 11B capable of communicating with telecommunications company B can continuously obtain shared information without the need that the edge computer 2B of telecommunications company B makes an information sharing demand again.

Third Embodiment

In the first embodiment and the second embodiment, the gateway 3A accepts an information sharing demand from the edge computer 2B. A third embodiment describes a case where the edge computer 2A accepts an information sharing demand from the edge computer 2B. Note that in the third embodiment, the configuration of the communication system 20 is the same as the configuration of the communication system 20 in the first embodiment illustrated in FIG. 1.

Figure 18:
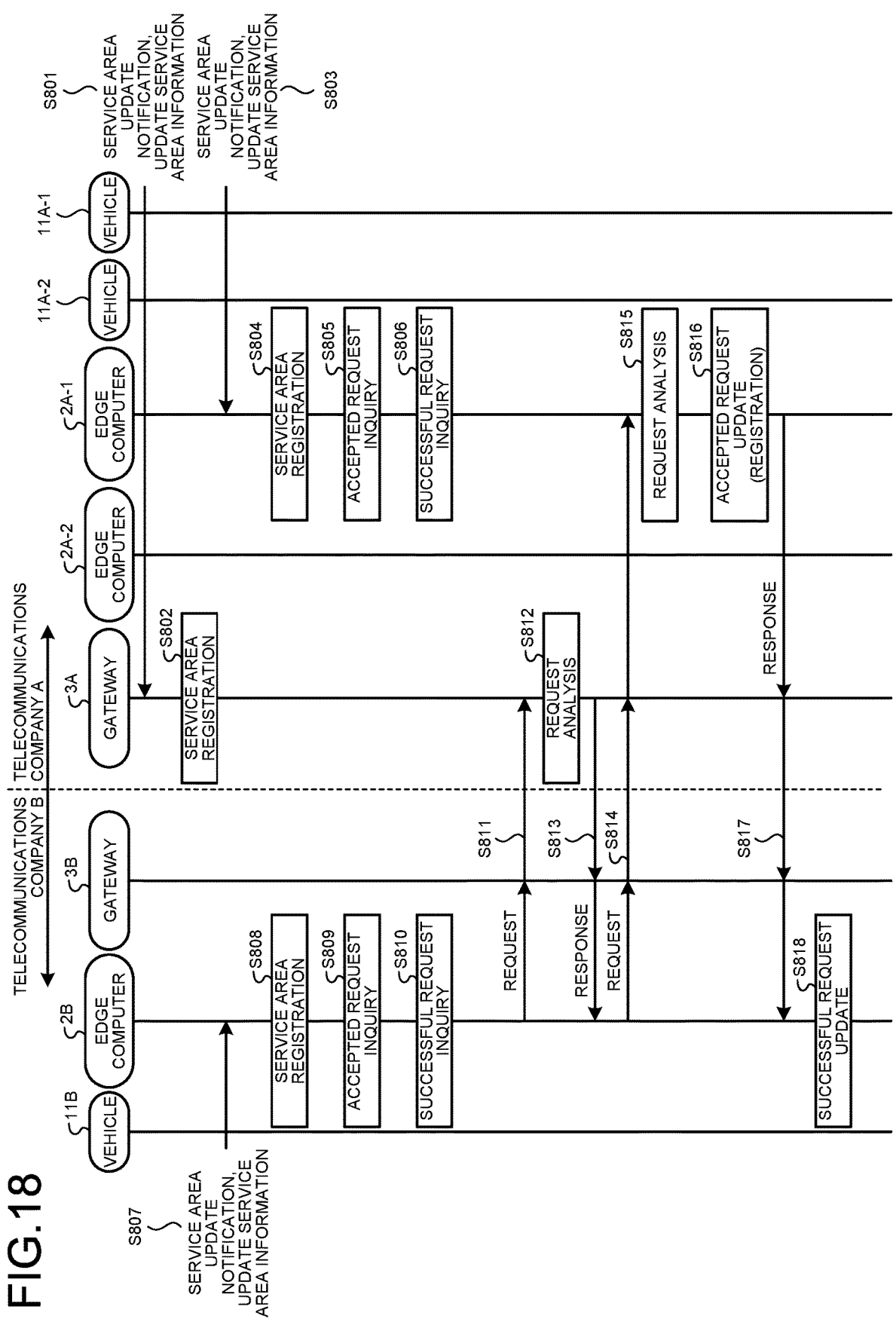
FIG. 18 is a sequence diagram illustrating an operation in which the edge computer of telecommunications company B requests telecommunications company A to share information in the communication system according to a third embodiment.

The operation of each device provided in the communication system 20 will be described. FIG. 18 is a sequence diagram illustrating an operation in which the edge computer 2B of telecommunications company B requests telecommunications company A to share information in the communication system 20 according to the third embodiment.

The gateway 3A accepts service area update notification and update service area information (step S801), and performs a service area registration process (step S802). The edge computer 2A-1 accepts service area update notification and update service area information (step S803), and performs a service area registration process (step S804). The edge computer 2A-1 performs an accepted request inquiry process (step S805) and performs a successful request inquiry process (step S806). The edge computer 2B accepts service area update notification and update service area information (step S807), and performs a service area registration process (step S808). The edge computer 2B performs an accepted request inquiry process (step S809) and performs a successful request inquiry process (step S810). Note that the accepted request inquiry process (step S805) and the successful request inquiry process (step S806) of the edge computer 2A-1 and the accepted request inquiry process (step S809) and the successful request inquiry process (step S810) of the edge computer 2B will be described in detail later in the section of service area update.

Triggered by the service area update notification, the edge computer 2B sends a request message to the gateway 3A that is a default destination in order to request telecommunications company A to share information (step S811). The request message (hereinafter referred to as the request (S811)) sent in step S811 from the edge computer 2B includes location information and a range from the location information. The gateway 3B transfers the request (S811) to the gateway 3A.

Upon receiving the request (S811), the gateway 3A performs a request analysis process on the request (S811) (step S812). The gateway 3A determines in the request analysis process whether the region specified by the location information and the range from the location information included in the request (S811) is included in the service area 4A of telecommunications company A. In response to determining that the region specified by the location information and the range from the location information included in the request (S811) is included in the service area 4A of telecommunications company A, the gateway 3A designates, as the request destination, the edge computer 2A-1 connected to the base station 1A-1 that provides the corresponding service area 4A-1. Note that in the determination of whether the region specified by the location information and the range from the location information is included in the service area 4A of telecommunications company A, the gateway 3A may regard "partially included" as "included".

The gateway 3A sends a response message including the edge computer 2A-1 that is the request destination determined in the request analysis process by designating the edge computer 2B that is the request source of the request (S811) as the destination (step S813). In the case of using the http protocol, the response message (hereinafter referred to as the response (S813)) sent in step S813 from the gateway 3 is an http response. The gateway 3 preferably sends the request destination determined in the request analysis process using http status code 3xx for redirection in the http response. Specifically, the gateway 3 can use status code 301 Moved Permanently, status code 302 Found, status code 307 Temporary Redirect, status code 308 Permanent Redirect, or the like. The use of these status codes allows the gateway 3A to add the request destination determined in the request analysis process to the Location field of the http response header.

Note that in the communication system 20, it is assumed that the default destination is determined in advance between telecommunications company B and telecommunications company A. Steps S811 to S813 are processes in which the edge computer 2B inquires of the gateway 3A that is the default destination about the edge computer 2A to request information sharing. The default destination to which the edge computer 2B makes an inquiry is not necessarily the gateway 3A, and may be any of the edge computers 2A.

The gateway 3B transfers the response (S813) sent from the gateway 3A to the edge computer 2B.

Upon receiving the response (S813), the edge computer 2B sends a request message by designating as the destination the request destination included in the response (S813), that is, the edge computer 2A-1 (step S814). The request message (hereinafter referred to as the request (S814)) sent in step S814 from the edge computer 2B includes the location information, the range from the location information, and an identifier. The identifier included in the request (S814) is referred to as identifier #1 in the third embodiment. The request (S814) is the same as requests such as the request (S105) in the first embodiment and the request (S607) in the second embodiment.

The gateway 3B transfers the request (S814) to the gateway 3A. The gateway 3A transfers the request (S814) to the destination, namely the edge computer 2A-1.

On the request (S814), the edge computer 2A-1 performs a request analysis process (step S815) and an accepted request update process (step S816), in a similar manner to the edge computer 2A-1 processes the request (S105) in the first embodiment, the request (S607) in the second embodiment, and the like. The edge computer 2A-1 sends a response message by designating the edge computer 2B as the destination (step S817).

The gateway 3A transfers, to the gateway 3B, the response message (hereinafter referred to as the response (S817)) sent in step S817 from the edge computer 2A-1. The gateway 3B transfers the response (S817) transferred from the gateway 3A to the edge computer 2B.

The edge computer 2B receives the response (S817), and if the request (S814) is successful, performs a successful request update process (step S818). The successful request update process (step S818) of the edge computer 2B will be described in detail later in the section of service area update.

Identifiers that the edge computer 2B adds to request messages will be described. The edge computer 2B does not know the network configuration of telecommunications company A, specifically, the configurations of the gateway 3 and the edge computer 2, and does not know whether the default destination is the gateway 3A or the edge computer 2A. Therefore, the edge computer 2B may add identifier #1 to the request (S811) to cope with a case where the default destination is the edge computer 2A, that is, to avoid a situation where a response indicating request acceptance cannot be received. Adding identifier #1 to the request (S811) results in the request (S811) and the request (S814) having the same message format, and thus the edge computer 2B can reduce the amount of computation required for message generation. Through the sequence diagram illustrated in FIG. 18, the information sharing demand from the edge computer 2B to telecommunications company A is completed, so that telecommunications company A, specifically the edge computer 2A-1 in the example of FIG. 18, can provide a push notification of shared information.

Regarding the sequence diagram illustrated in FIG. 5, the edge computers 2A-1 and 2A-2 perform operations similar to those in the first embodiment. Note that in the communication system 20, the sequence diagram illustrated in FIG. 18 and the sequence diagram illustrated in FIG. 5 can be performed in random order, but here it is assumed that the operation of the sequence diagram illustrated in FIG. 5 is performed after the operation of the sequence diagram illustrated in FIG. 18 is performed.

Figure 19:
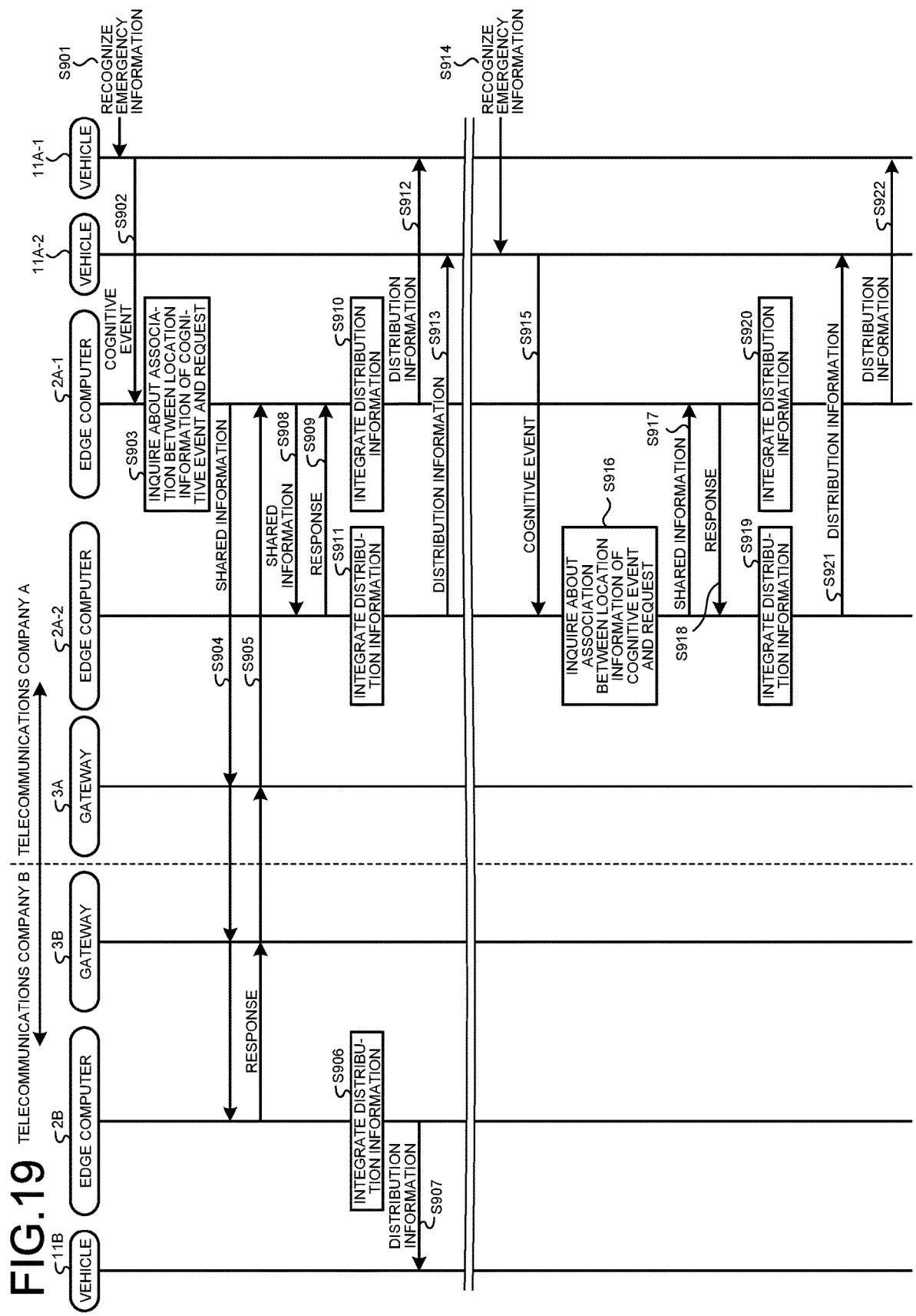
FIG. 19 is a sequence diagram illustrating an operation in which shared information is sent between edge computers in the communication system according to the third embodiment.

Next, an operation will be described in which emergency information is shared via the edge computer 2 from the vehicle 11 that has recognized the emergency information, that is, the emergency information is distributed to the vehicles 11 in each service area 4. FIG. 19 is a sequence diagram illustrating an operation in which shared information is sent between the edge computers 2 in the communication system 20 according to the third embodiment. Upon recognizing emergency information (step S901), the vehicle 11A-1 notifies the edge computer 2A-1 of the cognitive event indicating the event of the recognized emergency information via the base station 1A-1 (not illustrated in FIG. 19) (step S902). The cognitive event (hereinafter referred to as the cognitive event (S902)) delivered in step S902 from the vehicle 11A-1 is the same as cognitive events such as the cognitive event (S302) in the first embodiment illustrated in the sequence diagram of FIG. 6 and the cognitive event (S702) in the second embodiment illustrated in the sequence diagram of FIG. 15.

Upon acquiring the cognitive event (S902) delivered from the vehicle 11A-1 (step S902), the edge computer 2A-1 performs a process of inquiring about the association between the location information of the cognitive event and the request using the cognitive event (S902) (step S903), as in the first and second embodiments. The edge computer 2A-1 sends the cognitive event (S902) as a shared information message (hereinafter referred to as the shared information (S904)) by designating the edge computer 2B that is the request source of the matching request (S814) as the destination (step S904).

As in the first embodiment, for example, in a case where the edge computer 2B makes a plurality of information sharing demands, the edge computer 2A-1 can add identifier #1 to the shared information (S904) to allow the edge computer 2B to easily examine the association with the request (S811). The edge computer 2B can easily perform detailed services such as a thorough investigation of distribution information or division of regions in the service area 4 in processes such as the generation of distribution information to the vehicle 11B. If the http protocol is used and identifier #1 is set as a callback URL, the callback URL of identifier #1 is used as the URL of the http message of the shared information (S904). If the http protocol is not used in the transmission of the shared information (S904), the edge computer 2A-1 may or may not add identifier #1 to the shared information (S904) except when the edge computer 2B makes a plurality of information sharing demands.

The gateway 3A transfers the shared information (S904) sent from the edge computer 2A-1 to the gateway 3B. The gateway 3B transfers the shared information (S904) transferred from the gateway 3A to the edge computer 2B. The edge computer 2B receives the shared information (S904), and sends a response message as in the first and second embodiments (step S905). The response message (hereinafter referred to as the response (S905)) sent in step S905 from the edge computer 2B is the same as responses such as the response (S308) in the first embodiment illustrated in the sequence diagram of FIG. 6 and the response (S708) in the second embodiment illustrated in the sequence diagram of FIG. 15.

The gateway 3B transfers the response (S905) sent from the edge computer 2B to the gateway 3A. The gateway 3A transfers the response (S905) transferred from the gateway 3B to the edge computer 2A-1. The edge computer 2A-1 receives the response (S905) transferred from the gateway 3A.

The edge computer 2B performs a distribution information integration process of integrating the emergency information acquired with the shared information (S904) into the distribution information to be distributed from the edge computer 2B (step S906). Step S906 is the same as processes such as step S309 in the first embodiment illustrated in the sequence diagram of FIG. 6 and step S709 in the second embodiment illustrated in the sequence diagram of FIG. 15. The edge computer 2B distributes the integrated distribution information to the vehicle 11B via the base station 1B (step S907).

The edge computer 2A-1 sends the cognitive event (S902) to the edge computer 2A-2 as a shared information message (step S908). The edge computer 2A-2 receives the shared information message (hereinafter referred to as the shared information (S908)) sent in step S908 from the edge computer 2A-1. The edge computer 2A-2 sends a response message (hereinafter referred to as the response (S909)) to the shared information (S908) (step S909). The edge computer 2A-1 performs a distribution information integration process of integrating the emergency information acquired with the cognitive event (S902) into the distribution information to be distributed from the edge computer 2A-1 (step S910). The edge computer 2A-2 performs a distribution information integration process of integrating the emergency information acquired with the shared information (S908) into the distribution information to be distributed from the edge computer 2A-2 (step S911). The edge computer 2A-1 distributes the integrated distribution information to the vehicle 11A-1 via the base station 1A-1 (step S912). The edge computer 2A-2 distributes the integrated distribution information to the vehicle 11A-2 via the base station 1A-2 (step S913).

Upon recognizing emergency information (step S914), the vehicle 11A-2 notifies the edge computer 2A-2 of the cognitive event indicating the event of the recognized emergency information via the base station 1A-2 (step S915). The cognitive event (hereinafter referred to as the cognitive event (S915)) delivered in step S915 from the vehicle 11A-2 is the same as cognitive events such as the cognitive event (S318) in the first embodiment illustrated in the sequence diagram of FIG. 6 and the cognitive event (S718) in the second embodiment illustrated in the sequence diagram of FIG. 15. Upon acquiring the cognitive event (S915), the edge computer 2A-2 performs a process of inquiring about the association between the location information of the cognitive event and the request using the cognitive event (S915) (step S916), as in the first and second embodiments. The edge computer 2A-2 sends the cognitive event (S915) as a shared information message by designating the edge computer 2A-1 that is the request source of the matching request (S203) as the destination (step S917). The edge computer 2A-1 receives the shared information message (hereinafter referred to as the shared information (S917)) sent in step S917 from the edge computer 2A-2.

The edge computer 2A-1 sends a response message (hereinafter referred to as the response (S918)) to the shared information (S917) (step S918). The edge computer 2A-2 performs a distribution information integration process of integrating the emergency information acquired with the cognitive event (S915) into the distribution information to be distributed from the edge computer 2A-2 (step S919). The edge computer 2A-1 performs a distribution information integration process of integrating the emergency information acquired with the shared information (S917) into the distribution information to be distributed from the edge computer 2A-1 (step S920). The edge computer 2A-2 distributes the integrated distribution information to the vehicle 11A-2 via the base station 1A-2 (step S921). The edge computer 2A-1 distributes the integrated distribution information to the vehicle 11A-1 via the base station 1A-1 (step S922). Note that the edge computer 2A-2 has not been requested to share information by telecommunications company B, specifically the edge computer 2B, and thus does not send the cognitive event (S915) as shared information addressed to telecommunications company B as a result of the process of inquiring about the association between the location information of the cognitive event (S915) and the request.

Figure 20:
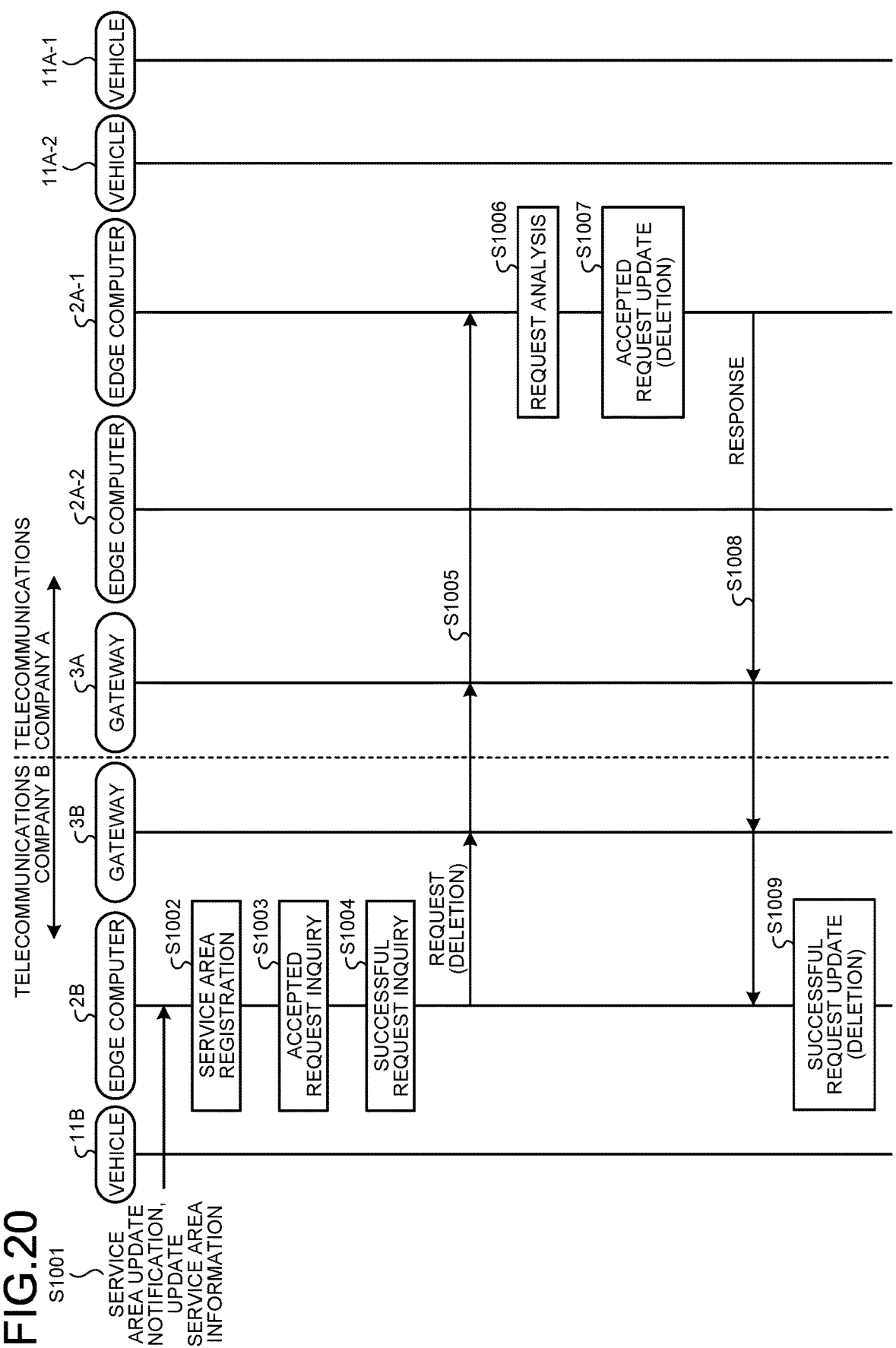
FIG. 20 is a sequence diagram illustrating an operation in which the service area of telecommunications company B is updated in the communication system according to the third embodiment.

Next, operations associated with an update of the service area 4 will be described. First, a case where the service area 4B of telecommunications company B is updated will be described. FIG. 20 is a sequence diagram illustrating an operation in which the service area 4B of telecommunications company B is updated in the communication system 20 according to the third embodiment. FIG. 20 illustrates an operation in which the service area 4B of the base station 1B corresponding to the edge computer 2B is changed, and the information sharing demand is updated from the edge computer 2B of telecommunications company B that is the demander to the edge computer 2A-1 of telecommunications company A that is the demandee. Regarding the execution order of the operations, it is assumed that the operation of the sequence diagram illustrated in FIG. 20 is performed following the operation of the sequence diagram illustrated in FIG. 18, and the operation of the sequence diagram illustrated in FIG. 5 has not been performed.

First, the successful request update process (step S818) in FIG. 18 will be briefly described. As illustrated in FIG. 18, in response to the edge computer 2B being notified with the response (S817) of the success of the request (S814), the edge computer 2B holds the request destination host information of the request (S814) and identifier #1 sent in the request (S814) as the successful request update process (step S818). After executing the operation of the sequence diagram illustrated in FIG. 18, the edge computer 2B accepts service area update notification and update service area information (step S1001), and performs a service area registration process (step S1002). The edge computer 2B performs an accepted request inquiry process (step S1003) and performs a successful request inquiry process (step S1004). In response to determining in the successful request inquiry process (step S1004) that there is a record held in the successful request update process (step S818), the edge computer 2B sends a request message (step S1005) in order to temporarily cancel, or delete, the already-completed information sharing demand.

The request message (hereinafter referred to as the request (S1005)) sent in step S1005 from the edge computer 2B is a message from which the cancellation of information sharing is recognizable, like the request (S406) sent to cancel the information sharing in the first embodiment. The edge computer 2B sends the request (S1005) including identifier #1 by designating the host information of the request destination held in the successful request update process as the destination.

The gateway 3B transfers the request (S1005) sent from the edge computer 2B to the gateway 3A. The gateway 3A transfers the request (S1005) transferred from the gateway 3B to the destination, namely the edge computer 2A-1.

The edge computer 2A-1 performs a request analysis process (step S1006) and an accepted request update process (step S1007), as in the case of the request (S814). Since the record of identifier #1 has been registered in the edge computer 2A-1 as an information sharing demand, the edge computer 2A-1 identifies the held information sharing request using identifier #1 of the request (S1005) as a key in the request analysis process (step S1006). The edge computer 2A-1 deletes the registration of the identified record in accordance with the cancellation of information sharing of the request (S1005), and sends a response (step S1008). Here, it is assumed that the registration deletion has succeeded in the edge computer 2A-1.

The gateway 3A transfers, to the gateway 3B, the response message (hereinafter referred to as the response (S1008)) sent from the edge computer 2A-1. The gateway 3B transfers the response (S1008) transferred from the gateway 3A to the destination, namely the edge computer 2B.

Upon receiving the response (S1008), the edge computer 2B deletes the record of identifier #1 of the held request (S1005) through a successful request update process (step S1009). As a result of the operation of the sequence diagram illustrated in FIG. 20, the information sharing demand completed through the operation of the sequence diagram illustrated in FIG. 18 is deleted from the edge computer 2B and the edge computer 2A-1. The communication system 20 can make an information sharing demand corresponding to the updated service area 4 by making an information sharing demand again on the basis of the region of the updated service area 4 as in the sequence diagram illustrated in FIG. 18. Note that in the successful request inquiry process (step S810) in the sequence diagram illustrated in FIG. 18, because there is no record held in the successful request update process, the edge computer 2B does not send a request for cancellation of information sharing.

Figure 21:
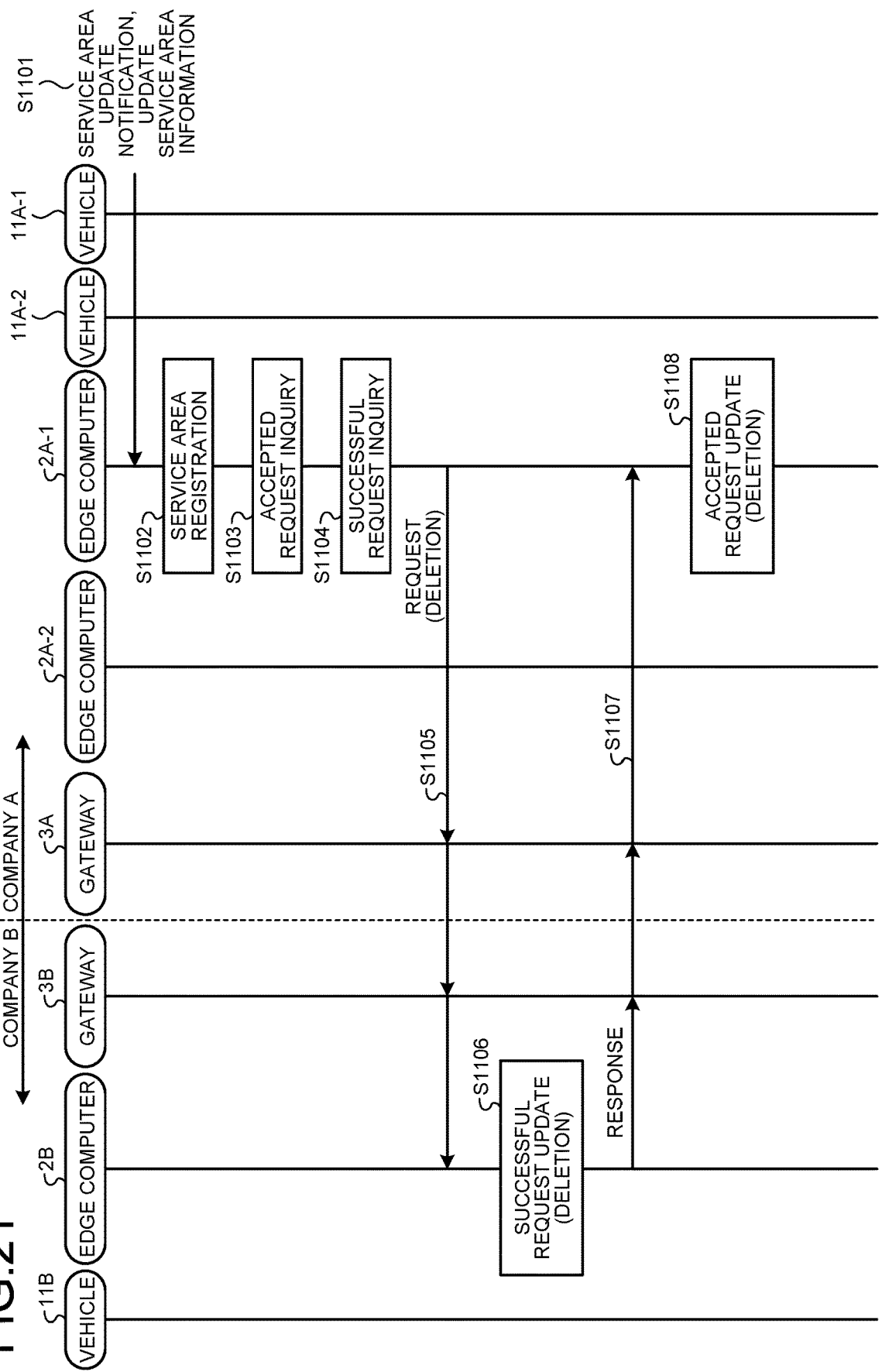
FIG. 21 is a sequence diagram illustrating an operation in which the service area of telecommunications company A is updated in the communication system according to the third embodiment.

Next, a case where the service area 4A-1 of telecommunications company A is updated will be described. FIG. 21 is a sequence diagram illustrating an operation in which the service area 4A-1 of telecommunications company A is updated in the communication system 20 according to the third embodiment. FIG. 21 illustrates an operation in which the service area 4A-1 corresponding to the edge computer 2A-1 is changed, and the information sharing demand is updated from the edge computer 2A-1 of telecommunications company A that is the demandee to the edge computer 2B of telecommunications company B that is the demander. Regarding the execution order of the operations, it is assumed that the operation of the sequence diagram illustrated in FIG. 21 is performed following the operation of the sequence diagram illustrated in FIG. 18, and the operation of the sequence diagram illustrated in FIG. 5 has not been performed.

The edge computer 2A-1 accepts service area update notification and update service area information (step S1101), and performs a service area registration process (step S1102). After the service area registration process (step S1102), the edge computer 2A-1 performs an accepted request inquiry process (step S1103) and a successful request inquiry process (step S1104) as processing on the acceptance side of information sharing. The edge computer 2A-1 checks in the successful request inquiry process whether there is an accepted information sharing demand (step S1104), and if there is an accepted information sharing demand, sends a request message including identifier #1 to the demander of the information sharing demand in order to cancel the request (step S1105).

The gateway 3A transfers, to the gateway 3B, the request message (hereinafter referred to as the request (S1105)) sent in step S1105 from the edge computer 2A-1. The gateway 3B transfers the request (S1105) transferred from the gateway 3A to the destination, namely the edge computer 2B.

The edge computer 2B, which is the information sharing demander, performs a successful request update process in response to the request (S1105) (step S1106), and deletes the held record of identifier #1. The edge computer 2B sends a response message to the request (S1105) (step S1107).

The gateway 3B transfers, to the gateway 3A, the response message (hereinafter referred to as the response (S1107)) sent in step S1107 from the edge computer 2B. The gateway 3A transfers the response (S1107) transferred from the gateway 3B to the destination, namely the edge computer 2A-1.

Upon receiving the response (S1107), the edge computer 2A-1 performs an accepted request update process (step S1108), and deletes the record corresponding to the information sharing request specified by the request (S1105), specifically, the record including identifier #1. As a result of the operation of the sequence diagram illustrated in FIG. 21, the information sharing demand completed through the operation of the sequence diagram illustrated in FIG. 18 is deleted from the edge computer 2B and the edge computer 2A-1. The communication system 20 can make an information sharing demand corresponding to the updated service area 4 by making the information sharing demand illustrated in the sequence diagram of FIG. 18 again on the basis of the region of the updated service area 4. Note that in the accepted request update process (step S816) in the sequence diagram illustrated in FIG. 18, because there is no record held in the successful request update process, the edge computer 2A-1 does not send a request for cancellation of information sharing.

Figure 22:
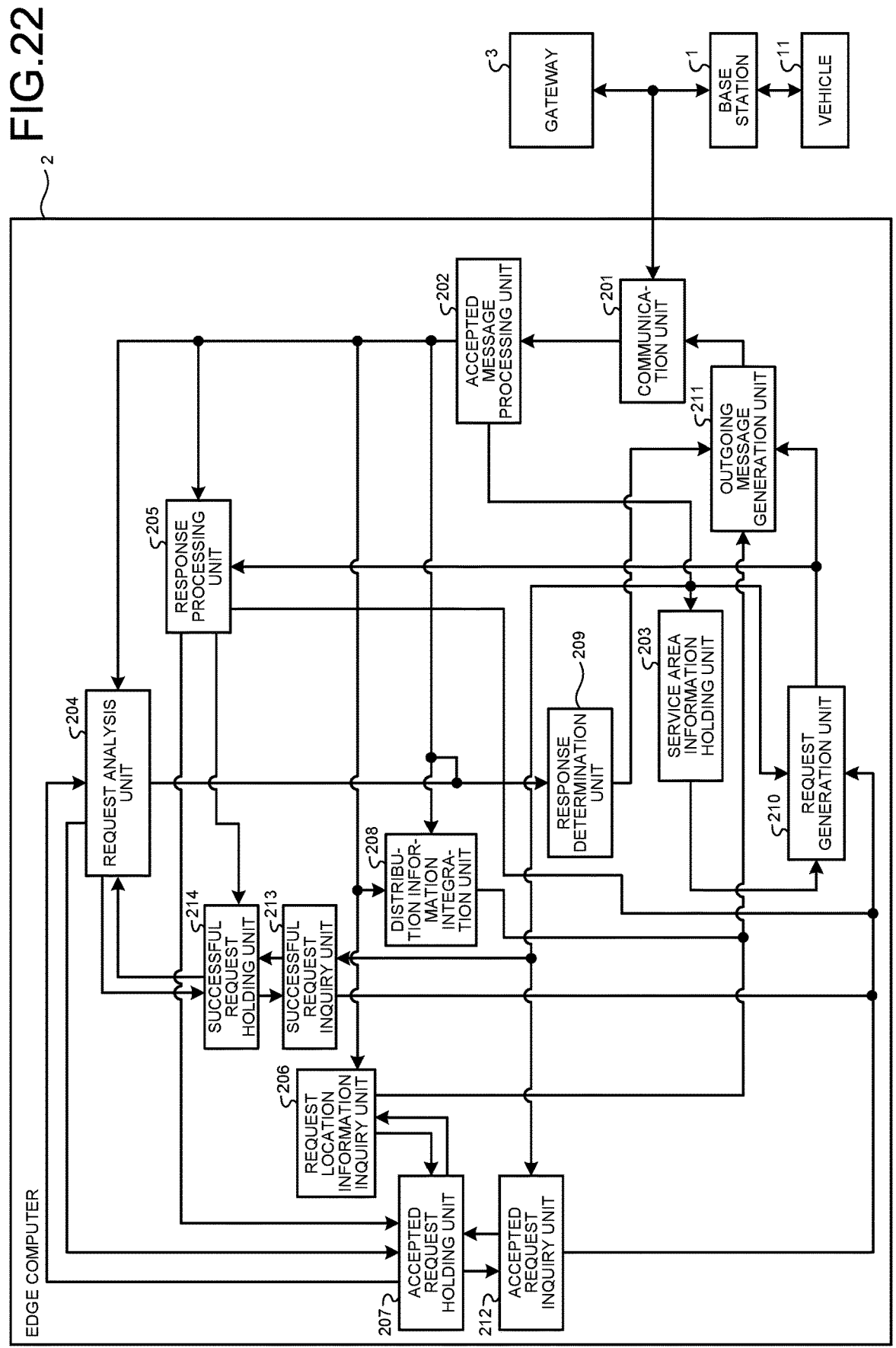
FIG. 22 is a block diagram illustrating an exemplary configuration of an edge computer according to the third embodiment.
Figure 23:
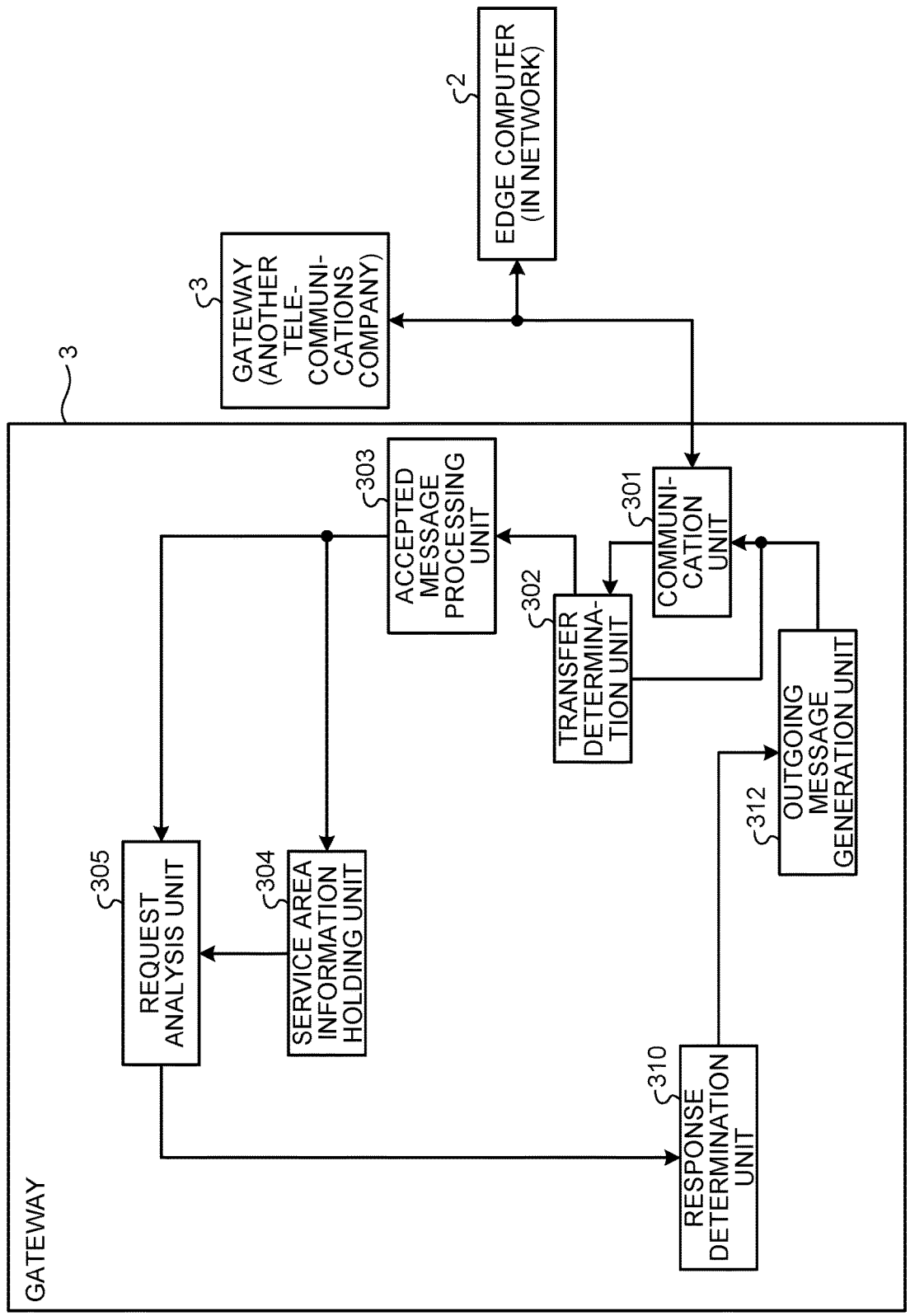
FIG. 23 is a block diagram illustrating an exemplary configuration of a gateway according to the third embodiment.

The operations of the sequence diagrams illustrated in FIGS. 18 to 21 will be described in detail using the configuration of each device. FIG. 22 is a block diagram illustrating an exemplary configuration of the edge computer 2 according to the third embodiment. The edge computer 2 according to the third embodiment is obtained by adding an accepted request inquiry unit 212, a successful request inquiry unit 213, and a successful request holding unit 214 to the configuration of the edge computer 2 in the first embodiment illustrated in FIG. 3. FIG. 23 is a block diagram illustrating an exemplary configuration of the gateway 3 according to the third embodiment. The gateway 3 according to the third embodiment includes the communication unit 301, the transfer determination unit 302, the accepted message processing unit 303, the service area information holding unit 304, the request analysis unit 305, the response determination unit 310, and the outgoing message generation unit 312.

First, the operation of requesting information sharing illustrated in FIG. 18 will be described. The edge computer 2B accepts service area update notification and update service area information. In the edge computer 2B, the service area information holding unit 203 acquires the update service area information via the communication unit 201 and the accepted message processing unit 202. In addition, the request generation unit 210 acquires the service area update notification via the communication unit 201 and the accepted message processing unit 202.

Triggered by the service area update notification, the request generation unit 210 determines the region in which information sharing is requested and identifier #1 on the basis of the service area region information acquired from the service area information holding unit 203. The request generation unit 210 converts the region in which information sharing is requested into location information and a range from the location information. The request generation unit 210 outputs, as the request (S811), the location information and the range from the location information obtained through conversion, identifier #1 determined, and the host information acquired from the service area information holding unit 203. The outgoing message generation unit 211 converts the acquired request (S811) into a format in which the request (S811) can be sent, and outputs the converted request (S811) to the communication unit 201. The communication unit 201 sends, from the edge computer 2B, the message of the request (S811) acquired from the outgoing message generation unit 211. Note that the destination of the request (S811) is the gateway 3A which is the default destination as described above. The request generation unit 210 outputs the location information, the range from the location information, and identifier #1 to the response processing unit 205 for the case that a redirection destination is specified in the response (S813) to the sent request (S811). In addition, the request generation unit 210 also outputs the host information of the request destination as one element for holding the successful request.

In the gateway 3B, the communication unit 301 receives the request (S811) sent from the edge computer 2B, and outputs the request (S811) to the transfer determination unit 302. Since the destination is the gateway 3A, the transfer determination unit 302 outputs the request (S811) to the communication unit 301. The communication unit 301 transfers the request (S811) to the gateway 3A.

In the gateway 3A, the communication unit 301 receives the request (S811) transferred from the gateway 3B, and outputs the request (S811) to the transfer determination unit 302. Since the destination is the gateway 3A, the transfer determination unit 302 outputs the request (S811) to the accepted message processing unit 303. The accepted message processing unit 303 outputs the request (S811) to the request analysis unit 305.

The request analysis unit 305 collates each piece of service area information in the network held by the service area information holding unit 304 with the region specified by the location information and the range from the location information included in the request (S811), and determines the edge computer 2A-1 corresponding to the service area 4 in which information sharing is possible. The request analysis unit 305 outputs, to the response determination unit 310, the edge computer 2A-1 corresponding to the determined service area 4 in which information sharing is possible.

As in the first and second embodiments, the response determination unit 310 outputs an indication of the success or failure of the request to the outgoing message generation unit 312 as a response in order to send the response (S813) to the request (S811). In the case of not using the http protocol, the indication may be either request success or request failure; in this example, the gateway 3A is not a host capable of sharing information but a host with a different request destination, and thus an error including the host information of the edge computer 2A determined by the request analysis unit 305 is output. In the case of using the http protocol, as described above, http status code 3xx for redirection is used in the http response, and the URL of the redirection destination is included in the Location field of the http response header. The outgoing message generation unit 312 converts the response (S813) acquired from the response determination unit 310 into a format in which the response (S813) can be sent, and outputs the converted response (S813) to the communication unit 301. The communication unit 301 sends the response (S813) acquired from the outgoing message generation unit 312 from the gateway 3A by designating the edge computer 2B that is the request source of the request (S811) as the destination. In this manner, in the gateway 3A, the request analysis unit 305 determines the edge computer 2A connected to the base station 1A that provides the service area including the region specified by the second request. The response determination unit 310 generates a response specifying the edge computer 2A determined by the request analysis unit 305.

In the gateway 3B, the communication unit 301 receives the response (S813) sent from the gateway 3A, and outputs the response (S813) to the transfer determination unit 302. Since the destination is the edge computer 2B, the transfer determination unit 302 outputs the response (S813) to the communication unit 301. The communication unit 301 transfers the response (S813) to the edge computer 2B.

In the edge computer 2B, the communication unit 201 receives the response (S813), and outputs the response (S813) to the accepted message processing unit 202. The accepted message processing unit 202 outputs the response (S813) to the response processing unit 205. The response processing unit 205 determines whether redirection, i.e. transmission of the request addressed to a different destination, is required on the basis of the response result indicated by the response (S813). In the case of not using the http protocol, the response processing unit 205 determines whether the redirection destination host information is included in the response (S813). In the case of using the http protocol, the response processing unit 205 can make a determination using the http status code of the response (S813). In response to determining that redirection is required, the response processing unit 205 outputs, to the request generation unit 210, new destination host information and the output from the request generation unit 210, namely the location information, the range from the location information, and identifier #1. The new destination host information is, for example, a URL in the case of using the http protocol.

The request generation unit 210 generates the request (S814) from the location information and the range from the location information, identifier #1 determined, and the host information of the redirection destination included in the response (S813), and outputs the request (S814) to the outgoing message generation unit 211. The host information of the redirection destination included in the response (S813) is the edge computer 2A-1, and is indicated by a URL in the case of using the http protocol. In the case of using the http protocol, the URL of the redirection destination is designated, and thus identifier #1 is changed to the designated URL. The outgoing message generation unit 211 converts the acquired request (S814) into a format in which the request (S814) can be sent, and outputs the converted request (S814) to the communication unit 201. The communication unit 201 sends, from the edge computer 2B, the request (S814) acquired from the outgoing message generation unit 211.

The gateway 3B transfers the request (S814) to the gateway 3A as in the case of the request (S811). The gateway 3A transfers the request (S814) to the edge computer 2A-1 in a similar manner to the gateway 3B.

In the edge computer 2A-1, the communication unit 201 receives the request (S814), and outputs the request (S814) to the accepted message processing unit 202. The accepted message processing unit 202 outputs the request (S814) to the request analysis unit 204.

The request analysis unit 204 determines whether the region specified by the location information and the range from the location information included in the request (S814) is included in the service area 4A-1 of the base station 1A-1 output from the service area information holding unit 203. In the determination of whether the region specified by the location information and the range from the location information is included in the service area 4A-1, the request analysis unit 204 may regard "partially included" as "included".

In response to determining that the region specified by the location information and the range from the location information included in the request (S814) is included in the service area 4A-1 of the base station 1A-1 acquired from the service area information holding unit 203, the request analysis unit 204 checks whether a record matching identifier #1 or the location information and the range from the location information has been registered in the accepted request holding unit 207 described later. The request analysis unit 204 outputs the location information, the range from the location information, and identifier #1 to the accepted request holding unit 207 in order to check whether a corresponding record has been registered in the accepted request holding unit 207. If identifier #1 is not set as a callback URL in the http protocol, the request analysis unit 204 also outputs the host information of the request source in the checking of whether the request (S814) has been registered in the accepted request holding unit 207 described later. If the request has already been registered in the accepted request holding unit 207, the request analysis unit 204 can output an indication of either success or failure to the response determination unit 209. However, in the case of failure, the output from the response determination unit 310 described later desirably includes an indication that the reason for the error is the existence of the registered request. Note that the edge computer 2A-1 may skip the determination of whether the region specified by the location information and the range from the location information is included in the service area 4A-1, since the request (S814) has been sent to the edge computer 2A-1 as a result of the redirection in the gateway 3A.

In the present embodiment, the request with identifier #1 has not been registered; therefore, the accepted request holding unit 207 registers the location information, the range from the location information, and identifier #1 output by the request analysis unit 204. If identifier #1 is not set as a callback URL in the http protocol, the accepted request holding unit 207 also registers the host information of the request source. In the present embodiment, the identifier held in the accepted request holding unit 207 is identifier #1 given by the edge computer 2B which is another processing device.

The response determination unit 209 generates the response (S817) as to whether the region specified by the location information and the range from the location information is included in the service area 4A-1, and outputs the response (S817) to the outgoing message generation unit 211. The outgoing message generation unit 211 converts the response (S817) into a format in which the response (S817) can be sent, and outputs the converted response (S817) to the communication unit 201. The communication unit 201 sends the response (S817) acquired from the outgoing message generation unit 211 by designating the edge computer 2B as the destination.

The gateway 3A transfers the response (S817) sent from the edge computer 2A-1 to the gateway 3B. The gateway 3B transfers the response (S817) transferred from the gateway 3A to the edge computer 2B.

In the edge computer 2B, the communication unit 201 receives the response (S817), and outputs the response (S817) to the accepted message processing unit 202. The accepted message processing unit 202 outputs the response (S817) to the response processing unit 205. If the response (S817) is to the request (S814) and the information sharing demand is successful, the response processing unit 205 outputs, to the successful request holding unit 214, the host information of the request destination, the location information, and the range from the location information acquired from the request generation unit 210. The operation of the successful request holding unit 214 will be described in the section of update of the service area 4. The operation of requesting information sharing illustrated in FIG. 18 is as above.

Next, the information sharing operation illustrated in FIG. 19 will be described. In the edge computer 2A-1, the communication unit 201 receives the cognitive event (S902) delivered from the vehicle 11A-1 via the base station 1A-1, and outputs the cognitive event (S902) to the accepted message processing unit 202. The accepted message processing unit 202 outputs the cognitive event (S902) to the request location information inquiry unit 206 and the distribution information integration unit 208. The processing of the distribution information integration unit 208 in the edge computer 2A-1 will be described later because the processing is performed after the reception of the response (S909).

As in the first embodiment, the request location information inquiry unit 206 outputs a query in which the location information of the cognitive event (S902) is used as a key to the accepted request holding unit 207 in order to inquire whether the location information included in the cognitive event (S902) is included in the region specified by the location information and the range from the location information registered in the accepted request holding unit 207.

If the query acquired from the request location information inquiry unit 206 is included in the region specified by the location information and the range from the location information held, the accepted request holding unit 207 outputs identifier #1 to the request location information inquiry unit 206 as a query result.

If the query result acquired from the accepted request holding unit 207 indicates that the location information included in the cognitive event (S902) is included in the region specified by the location information and the range from the location information registered in the accepted request holding unit 207, the request location information inquiry unit 206 outputs the cognitive event (S902) acquired from the accepted message processing unit 202 and identifier #1 acquired from the accepted request holding unit 207 in combination as the shared information (S904) to the outgoing message generation unit 211. If the query result acquired from the accepted request holding unit 207 indicates that the location information included in the cognitive event (S902) is not included in the region specified by the location information and the range from the location information registered in the accepted request holding unit 207, the request location information inquiry unit 206 outputs nothing to the outgoing message generation unit 211. The process of inquiring about the association between the location information of the cognitive event and the request in the sequence diagram of FIG. 19 corresponds to the process of the request location information inquiry unit 206 and the accepted request holding unit 207.

The outgoing message generation unit 211 converts the shared information (S904) into a format in which the shared information (S904) can be sent, and sends the converted shared information (S904) to the communication unit 201. If identifier #1 is set as a callback URL using the http protocol, identifier #1 is used as the URL of the http method. The communication unit 201 sends the shared information (S904) acquired from the outgoing message generation unit 211 by designating the edge computer 2B as the destination. The processing up to the transmission of the shared information (S904) in the edge computer 2A-1 is the same as the processing up to the transmission of the shared information (S304) in the edge computer 2A-1 according to the first embodiment illustrated in the sequence diagram of FIG. 6.

The gateway 3A transfers the shared information (S904) sent from the edge computer 2A-1 to the gateway 3B. The gateway 3B transfers the shared information (S904) transferred from the gateway 3A to the edge computer 2B.

In the edge computer 2B, the communication unit 201 receives the shared information (S904), and outputs the shared information (S904) to the accepted message processing unit 202. The accepted message processing unit 202 outputs the shared information (S904) to the distribution information integration unit 208 and the response determination unit 209.

Regarding the success or failure of the reception of the shared information (S904), the response determination unit 209 generates the response (S905) addressed to the edge computer 2A-1 that has sent the shared information (S904), and outputs the response (S905) to the outgoing message generation unit 211. In the case of using the http protocol, the response determination unit 209 outputs an http status code. This is the same as the operation of the response determination unit 209 in the edge computer 2B according to the first embodiment. The outgoing message generation unit 211 converts the response (S905) into a format in which the response (S905) can be sent, and outputs the converted response (S905) to the communication unit 201. The communication unit 201 sends the response (S905) acquired from the outgoing message generation unit 211 by designating the edge computer 2A-1 as the destination.

The gateway 3B transfers the response (S905) sent from the edge computer 2B to the gateway 3A. The gateway 3A transfers the response (S905) transferred from the gateway 3B to the edge computer 2A-1.

In the edge computer 2B, the distribution information integration unit 208 performs the process similar to that performed by the distribution information integration unit 208 of the edge computer 2B according to the first embodiment. The distribution information integration unit 208 performs integration with other distribution information on the basis of the shared information (S904), and outputs the integrated distribution information to the outgoing message generation unit 211. The outgoing message generation unit 211 converts the distribution information acquired from the distribution information integration unit 208 into a format in which the distribution information can be sent, and outputs the converted distribution information to the communication unit 201. The communication unit 201 sends the distribution information acquired from the outgoing message generation unit 211 to the base station 1B. The base station 1B distributes the distribution information toward the vehicle 11B in the service area 4B.

In the edge computer 2A-1, the communication unit 201 receives the response (S905), and outputs the response (S905) to the accepted message processing unit 202. The accepted message processing unit 202 outputs the response (S905) to the response processing unit 205. In the third embodiment, the response processing unit 205 does not perform any specific process on the response (S905).

In the communication system 20, the processing from the transmission of the shared information (S908) by the edge computer 2A-1 (step S908) to the distribution of the distribution information by the edge computer 2A-1 (step S922) is similar to the processing from the transmission of the shared information (S311) by the edge computer 2A-1 (step S311) to the distribution of the distribution information by the edge computer 2A-1 (step S325) in the first embodiment.

Next, the operations illustrated in FIGS. 20 and 21 associated with a change in the service area 4 of telecommunications companies will be described. Regarding the execution order of the operations, it is assumed that the operation of the sequence diagram illustrated in FIG. 20 or 21 is performed following the operation of the sequence diagram illustrated in FIG. 18, and the operation of the sequence diagram illustrated in FIG. 5 has not been performed.

First, the sequence diagram illustrated in FIG. 20 for the case that the service area 4B is changed in telecommunications company B will be described. When the edge computer 2B receives service area update notification and update service area information, the service area information holding unit 203 acquires the update service area information via the communication unit 201 and the accepted message processing unit 202, and holds the service area region information. In addition, the successful request inquiry unit 213 acquires the service area update notification via the communication unit 201 and the accepted message processing unit 202.

Triggered by the service area update notification, the successful request inquiry unit 213 reads a record held in the successful request holding unit 214. If there is no record held in the successful request holding unit 214, the successful request inquiry unit 213 ends the procedure. If there is a record held in the successful request holding unit 214, the successful request inquiry unit 213 outputs, to the request generation unit 210, the host information of the demandee and identifier #1 output from the successful request holding unit 214 in order to cancel the information sharing demand. Note that the successful request inquiry unit 213 may add the location information, the range from the location information, a flag, and the like to the output to the request generation unit 210 in order to make a message from which the cancellation of information sharing is recognizable, as in the case of the request (S406) in the first embodiment. In the request (S1005), if the DELETE method of the http protocol is used, for example, identifier #1 allows the reception side to recognize the cancellation of information sharing, and thus it is not necessary to add the location information, the range from the location information, or a flag.

The request generation unit 210 generates the request (S1005) on the basis of the output from the successful request inquiry unit 213, and outputs the request (S1005) to the outgoing message generation unit 211. The outgoing message generation unit 211 converts the request (S1005) into a format in which the request (S1005) can be sent, and outputs the converted request (S1005) to the communication unit 201. The communication unit 201 sends the request (S1005) acquired from the outgoing message generation unit 211 by designating the edge computer 2A-1 as the destination. Like the request (S406), the request (S1005) is a message that allows the reception side to recognize the cancellation of information sharing.

The gateway 3B transfers the request (S1005) sent from the edge computer 2B to the gateway 3A. The gateway 3A transfers the request (S1005) transferred from the gateway 3B to the edge computer 2A-1.

Upon receiving the request (S1005), the edge computer 2A-1 deletes the record of identifier #1 in the accepted request holding unit 207 and then sends the response (S1008) in a similar manner to when the edge computer 2A-1 receives the request (S406) in the first embodiment.

The gateway 3A transfers the response (S1008) sent from the edge computer 2A-1 to the gateway 3B. The gateway 3B transfers the response (S1008) transferred from the gateway 3A to the edge computer 2B.

In the edge computer 2B, the communication unit 201 receives the response (S1008), and outputs the response (S1008) to the accepted message processing unit 202. The accepted message processing unit 202 outputs data of the response (S1008) to the response processing unit 205. If the response (S1008) is successful, the response processing unit 205 instructs the successful request holding unit 214 to delete the record for which the cancellation of information sharing has been requested in the request (S1005). The successful request holding unit 214 deletes the corresponding record in accordance with the deletion instruction. Note that when the operation of the sequence diagram illustrated in FIG. 20 is performed, the only record registered in the successful request holding unit 214 of the edge computer 2B is the record for the request (S814). The edge computer 2B may make a plurality of information sharing cancellation demands to a plurality of edge computers 2 or the same edge computer 2, in which case the edge computer 2B only needs to send a plurality of messages equivalent to the request (S1005). The operations in the response processing unit 205 and the successful request holding unit 214 correspond to the successful request update (deletion) process in the sequence diagram illustrated in FIG. 20.

With the above operation, telecommunications company B, specifically the edge computer 2B, can cancel, using the request (S1005), the information sharing from telecommunications company A to telecommunications company B based on the request (S814). The edge computer 2B can cope with the updated service area 4B by newly performing the operation illustrated in the sequence diagram of FIG. 18 to make an information sharing demand based on the updated service area 4B.

Next, the sequence diagram of FIG. 21 for the case that the service area 4A-1 is changed in telecommunications company A will be described. When the edge computer 2A-1 receives service area update notification and update service area information, the service area information holding unit 203 acquires the update service area information via the communication unit 201 and the accepted message processing unit 202, and holds the service area region information. In addition, the accepted request inquiry unit 212 acquires the service area update notification via the communication unit 201 and the accepted message processing unit 202.

Triggered by the service area update notification, the accepted request inquiry unit 212 reads a record held in the accepted request holding unit 207. If no information sharing demand has been accepted, there is no record held, and thus the accepted request inquiry unit 212 ends the procedure. If an information sharing demand has been accepted and there is a record held, the accepted request inquiry unit 212 outputs, to the request generation unit 210, the host information of the edge computer 2B that is the demander and identifier #1 acquired from the accepted request holding unit 207 in order to cancel the information sharing demand. Note that the accepted request inquiry unit 212 may add the location information, the range from the location information, a flag, and the like to the output to the request generation unit 210 in order to make a message from which the cancellation of information sharing is recognizable, as in the case of the request (S406) in the first embodiment. In the request (S1105), if the DELETE method of the http protocol is used, for example, identifier #1 allows the reception side to recognize the cancellation of information sharing, and thus it is not necessary to add the location information, the range from the location information, or a flag.

The request generation unit 210 generates the request (S1105) on the basis of the output from the successful request inquiry unit 213, and outputs the request (S1105) to the outgoing message generation unit 211. The outgoing message generation unit 211 converts the request (S1105) into a format in which the request (S1105) can be sent, and outputs the converted request (S1105) to the communication unit 201. The communication unit 201 sends the request (S1105) acquired from the outgoing message generation unit 211 by designating the edge computer 2B as the destination. Like the request (S406), the request (S1105) is a message that allows the reception side to recognize the cancellation of information sharing.

The gateway 3A transfers the request (S1105) sent from the edge computer 2A-1 to the gateway 3B. The gateway 3B transfers the request (S1105) transferred from the gateway 3A to the edge computer 2B.

In the edge computer 2B, the communication unit 201 receives the request (S1105), and outputs the request (S1105) to the accepted message processing unit 202. The accepted message processing unit 202 outputs data of the request (S1105) to the request analysis unit 204. The request analysis unit 204 determines whether the request (S1105) is a demand for cancellation of information sharing, and in response to determining that the request (S1105) is a demand for cancellation of information sharing, instructs the successful request holding unit 214 to delete the record of identifier #1 included in the request (S1105). The successful request holding unit 214 deletes the record including identifier #1 in accordance with the deletion instruction from the request analysis unit 204, and outputs the deletion result to the request analysis unit 204. In order to send the response (S1107), the request analysis unit 204 outputs the state of the deletion result in the successful request holding unit 214 to the response determination unit 209. The response determination unit 209 outputs the deletion result in the successful request holding unit 214 to the outgoing message generation unit 211 as the response (S1107). The outgoing message generation unit 211 converts the response (S1107) into a format in which the response (S1107) can be sent, and outputs the converted response (S1107) to the communication unit 201. The communication unit 201 sends the response (S1107) acquired from the outgoing message generation unit 211 by designating the edge computer 2A-1 as the destination.

The gateway 3B transfers the response (S1107) sent from the edge computer 2B to the gateway 3A. The gateway 3A transfers the response (S1107) transferred from the gateway 3B to the edge computer 2A-1.

In the edge computer 2A-1, the communication unit 201 receives the response (S1107), and outputs the response (S1107) to the accepted message processing unit 202. The accepted message processing unit 202 outputs the response (S1107) to the response processing unit 205. The response processing unit 205 determines whether the response (S1107) is a response to the demand for cancellation of information sharing. In response to determining that the response (S1107) is a response to the demand for cancellation of information sharing, the response processing unit 205 instructs the accepted request holding unit 207 to delete the record of identifier #1 included in the request (S1105). The accepted request holding unit 207 deletes the record of identifier #1 in accordance with the deletion instruction from the response processing unit 205. The operations in the response processing unit 205 and the accepted request holding unit 207 correspond to the accepted request update (deletion) process in the sequence diagram illustrated in FIG. 21.

With the above operation, telecommunications company A, specifically the edge computer 2A-1, can cancel, using the request (S1105), the information sharing from telecommunications company A to telecommunications company B based on the request (S814). The edge computer 2B can cope with the updated service area 4A-1 by newly performing the operation illustrated in the sequence diagram of FIG. 18 to make an information sharing demand based on the updated service area 4A-1.

Figure 24:
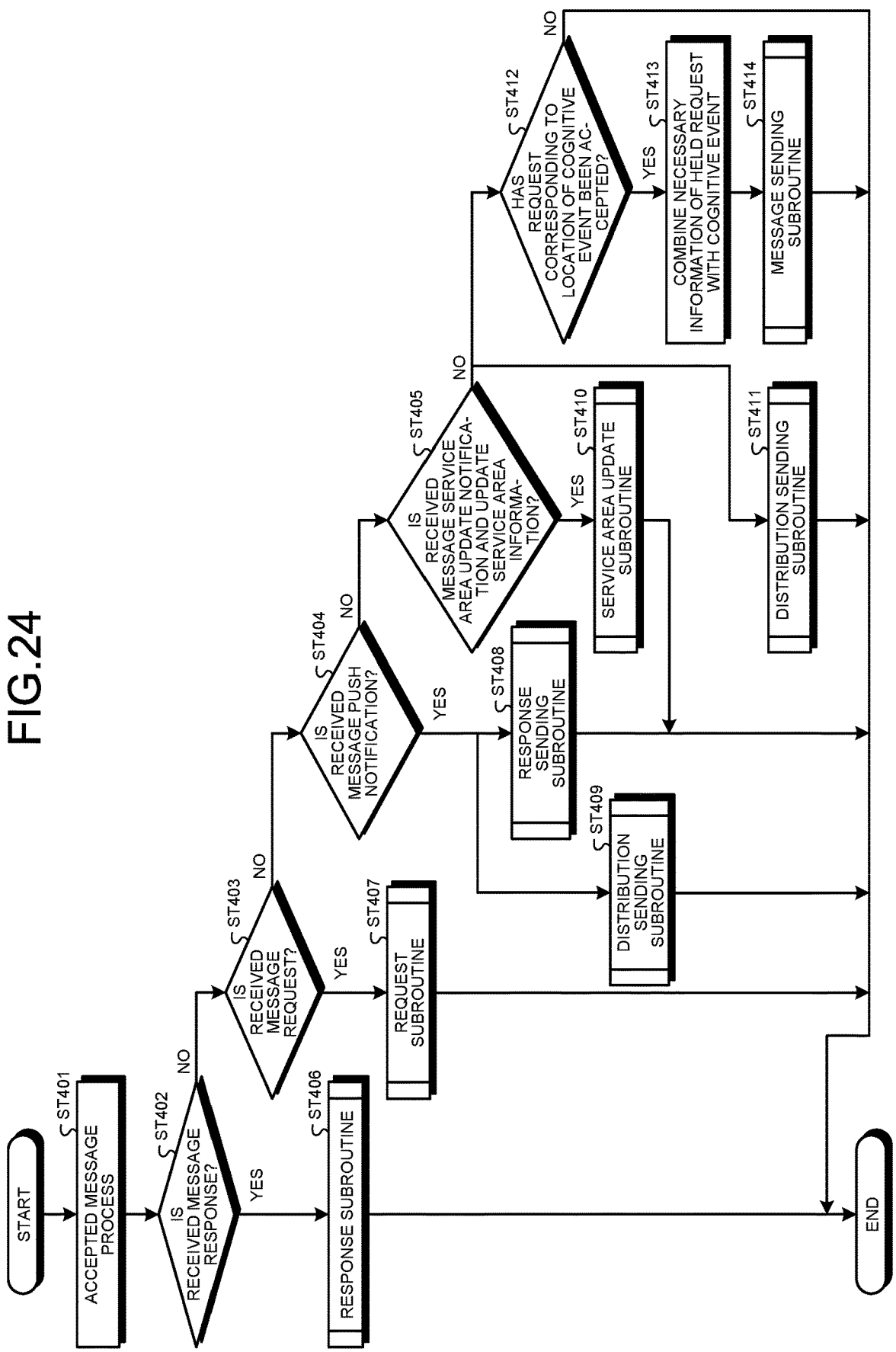
FIG. 24 is a flowchart illustrating the operation of the edge computer based on the program that is executed by the edge computer according to the third embodiment.

In the third embodiment, the hardware configurations of the edge computer 2 and the gateway 3 are the same as those in the first embodiment. First, the program that is executed by the edge computer 2 will be described. FIG. 24 is a flowchart illustrating the operation of the edge computer 2 based on the program that is executed by the edge computer 2 according to the third embodiment.

In the flowchart of the edge computer 2 illustrated in FIG. 24, steps ST401 to ST405 are processes in the accepted message processing unit 202. Step ST401 is a process in the accepted message processing unit 202 including unencapsulation, similarly to step ST101 in the first embodiment. Steps ST402 to ST405 correspond to the above-described output destination switching process in the accepted message processing unit 202. The edge computer 2 determines in step ST402 whether the received message is a response, and in response to determining that the received message is a response (step ST402: Yes), performs step ST406. In response to determining that the received message is not a response (step ST402: No), the edge computer 2 determines in step ST403 whether the received message is a request. In response to determining that the received message is a request (step ST403: Yes), the edge computer 2 performs step ST407. In response to determining that the received message is not a request (step ST403: No), the edge computer 2 determines in step ST404 whether the received message is a push notification. In response to determining that the received message is a push notification (step ST404: Yes), the edge computer 2 performs steps ST408 and ST409. In response to determining that the received message is not a push notification (step ST404: No), the edge computer 2 determines in step ST405 whether the received message is service area update notification and update service area information. In response to determining that the received message is service area update notification and update service area information (step ST405: Yes), the edge computer 2 performs step ST410. In response to determining that the received message is not service area update notification and update service area information (step ST405: No), which is the case where a cognitive event from the vehicle 11 has been received, the edge computer 2 performs steps ST411 and ST412.

Steps ST406 to ST411 in FIG. 24 will be described later with reference to other flowcharts. Steps ST412 and ST413 for the case of reception of a cognitive event from the vehicle 11 are the same processes as steps ST115 and ST116 of the edge computer 2 in the first embodiment illustrated in FIG. 11, and a detailed description thereof will be omitted. Step ST414 in FIG. 24 will be described later with reference to another flowchart.

Figure 25:
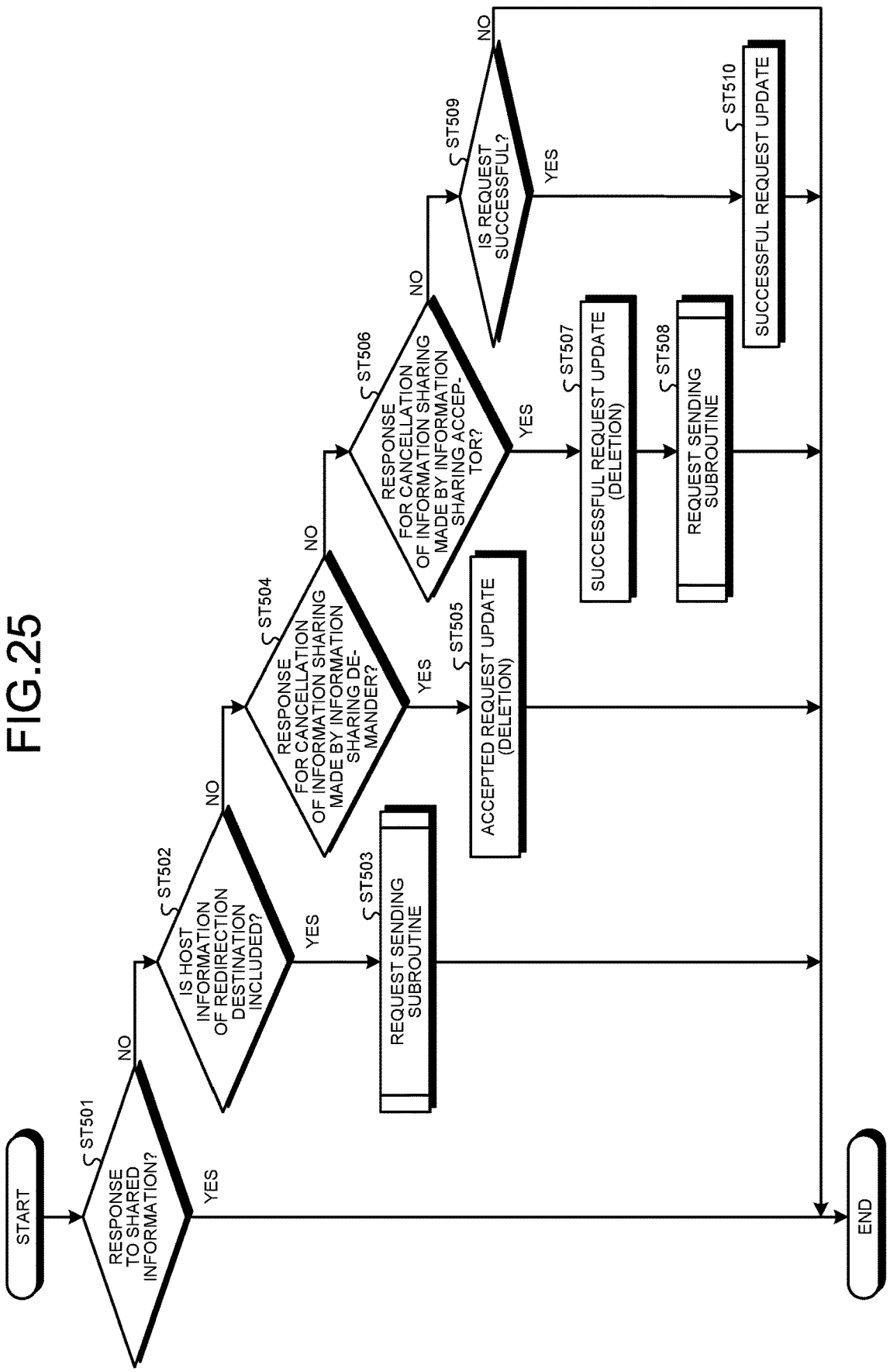
FIG. 25 is a flowchart illustrating the response subroutine of the flowchart illustrated in FIG. 24 in the operation of the edge computer according to the third embodiment.

FIG. 25 is a flowchart illustrating the response subroutine in step ST406 of the flowchart illustrated in FIG. 24 in the operation of the edge computer 2 according to the third embodiment. In step ST501, if the response is a response to shared information (step S501: Yes), the edge computer 2 ends the subroutine. If the response is not a response to shared information (step S501: No), the edge computer 2 performs step ST502. In response to determining in step ST502 that the host information of the redirection destination is included in the response (step ST502: Yes), the edge computer 2 performs step ST503 in order to send the request to another destination. Steps ST502 and ST503 are processes by the request analysis unit 204, the request generation unit 210, the outgoing message generation unit 211, and the communication unit 201 in which the edge computer 2B receives the response (S813) and sends the request (S814). Step ST503 will be described later with reference to another flowchart.

If the host information of the redirection destination is not included in the response (step ST502: No), the edge computer 2 performs step ST504. In response to determining in step ST504 that the response is a response for cancellation of information sharing made by the information sharing demander (step ST504: Yes), the edge computer 2 performs step ST505. The case of step ST504: Yes is specifically the case where the edge computer 2A-1 has received the response (S1107). Step ST505 is the accepted request update (deletion) process performed by the edge computer 2A-1 receiving the response (S1107) in FIG. 21, i.e. the process in the response processing unit 205 and the accepted request holding unit 207 in which the record of the accepted request is deleted from the accepted request holding unit 207.

If the response is not a response for cancellation of information sharing made by the information sharing demander (step ST504: No), the edge computer 2 performs step ST506. In response to determining in step ST506 that the response is a response for cancellation of information sharing made by the information sharing acceptor (step ST506: Yes), the edge computer 2 performs step ST507. The case of step ST506: Yes is specifically the case where the edge computer 2B has received the response (S1008). Step ST507 is the successful request update (deletion) process performed by the edge computer 2B receiving the response (S1008) in FIG. 20, i.e. the process in the response processing unit 205 and the successful request holding unit 214 in which the record of the successful request update is deleted from the successful request holding unit 214. Step ST508 performed after step ST507 is a request message sending process in which the edge computer 2 makes an information sharing demand for new information sharing instead of the canceled information sharing. Step ST508 will be described later with reference to another flowchart.

If the response is not a response for cancellation of information sharing made by the information sharing acceptor (step ST506: No), the edge computer 2 performs step ST509. Step ST509 is the process in the case that the edge computer 2 has received the response (S817). If the response indicates success, that is, if the request is successful (step ST509: Yes), the edge computer 2 performs step ST510. Step T510 corresponds to the successful request update process performed after the reception of the response (S817) in the sequence diagram illustrated in FIG. 18, in which the edge computer 2B holds the information included in the request (S814) in the successful request holding unit 214. If the request is not successful (step ST509: No), the edge computer 2 ends the subroutine illustrated in FIG. 25.

Figure 26:
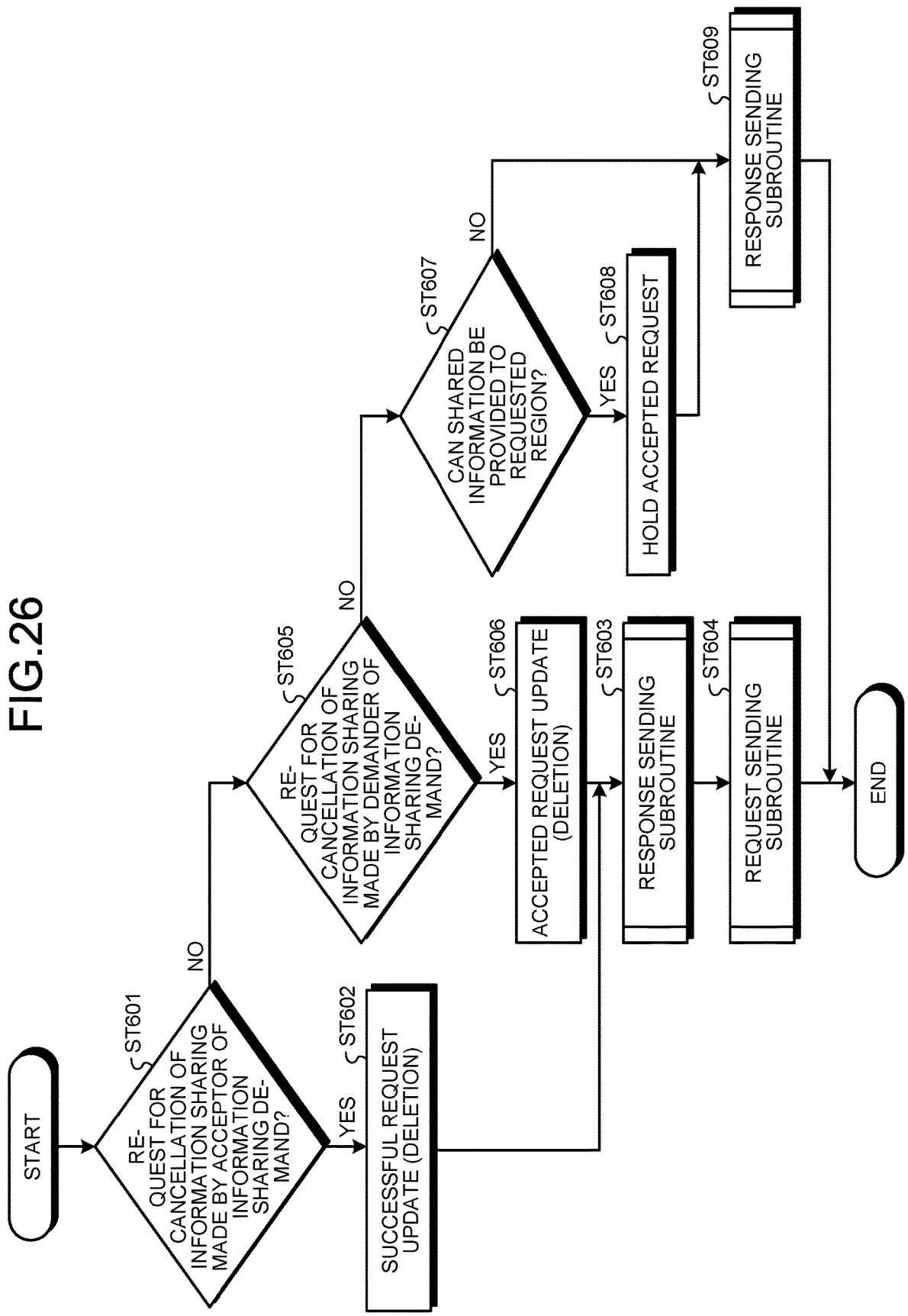
FIG. 26 is a flowchart illustrating the request subroutine of the flowchart illustrated in FIG. 24 in the operation of the edge computer according to the third embodiment.

FIG. 26 is a flowchart illustrating the request subroutine in step ST407 of the flowchart illustrated in FIG. 24 in the operation of the edge computer 2 according to the third embodiment. In response to determining in step ST601 that the received message is a request for cancellation of information sharing made by the information sharing acceptor (step ST601: Yes), the edge computer 2 performs step ST602. The case of step ST601: Yes is specifically the case where the edge computer 2B has received the request (S1105). Step ST602 is the same process as step ST507 illustrated in FIG. 25. Specifically, step ST602 corresponds to the successful request update (deletion) process performed by the edge computer 2B receiving the request (S1105) in FIG. 21, i.e. the process in the request analysis unit 204 and the successful request holding unit 214 in which the record of the request specified by the request (S1105) is deleted from the successful request holding unit 214.

Following step ST602, the edge computer 2 performs step ST603 as a process for sending the response (S1107). Step ST603 performed after step ST602 is a request message sending process of making an information sharing demand for new information sharing instead of the canceled information sharing. Steps ST603 and ST604 will be described later with reference other flowcharts.

If the received message is not a request for cancellation of information sharing made by the information sharing acceptor (step ST601: No), the edge computer 2 performs step ST605. In response to determining in step ST605 that the received message is a request for cancellation of information sharing made by the information sharing demander (step ST605: Yes), the edge computer 2 performs step ST606. The case of step ST605: Yes is specifically the case where the edge computer 2A-1 has received the request (S1005). Step ST606 is the same process as step ST505 illustrated in FIG. 25. Specifically, step ST606 corresponds to the accepted request update (deletion) process performed by the edge computer 2A-1 receiving the request (S1005) in FIG. 20, i.e. the process in the request analysis unit 204 and the accepted request holding unit 207 in which the record of the request specified by the request (S1005) is deleted from the accepted request holding unit 207. Following step ST606, the edge computer 2 performs steps ST603 and ST604, and ends the subroutine of the request.

If the received message is not a request for cancellation of information sharing made by the information sharing demander (step ST605: No), the edge computer 2 performs step ST607. In response to determining in step ST607 that the received message is an information sharing demand message, that is, shared information can be provided to the region indicated by the location information and the range from the location information requested (step ST607: Yes), the edge computer 2 performs step ST608. The case of step ST607: Yes is specifically the case where the edge computer 2A-1 has received the request (S814). Step ST608 is the same process as step ST108 in the first embodiment illustrated in FIG. 2. If shared information cannot be provided to the region indicated by the location information and the range from the location information requested (step ST607: No), or after step ST608 is performed, the edge computer 2 performs step ST609 in order to send the response (S817) to the request (S814). Step ST609 will be described later with reference to another flowchart.

Figure 27:
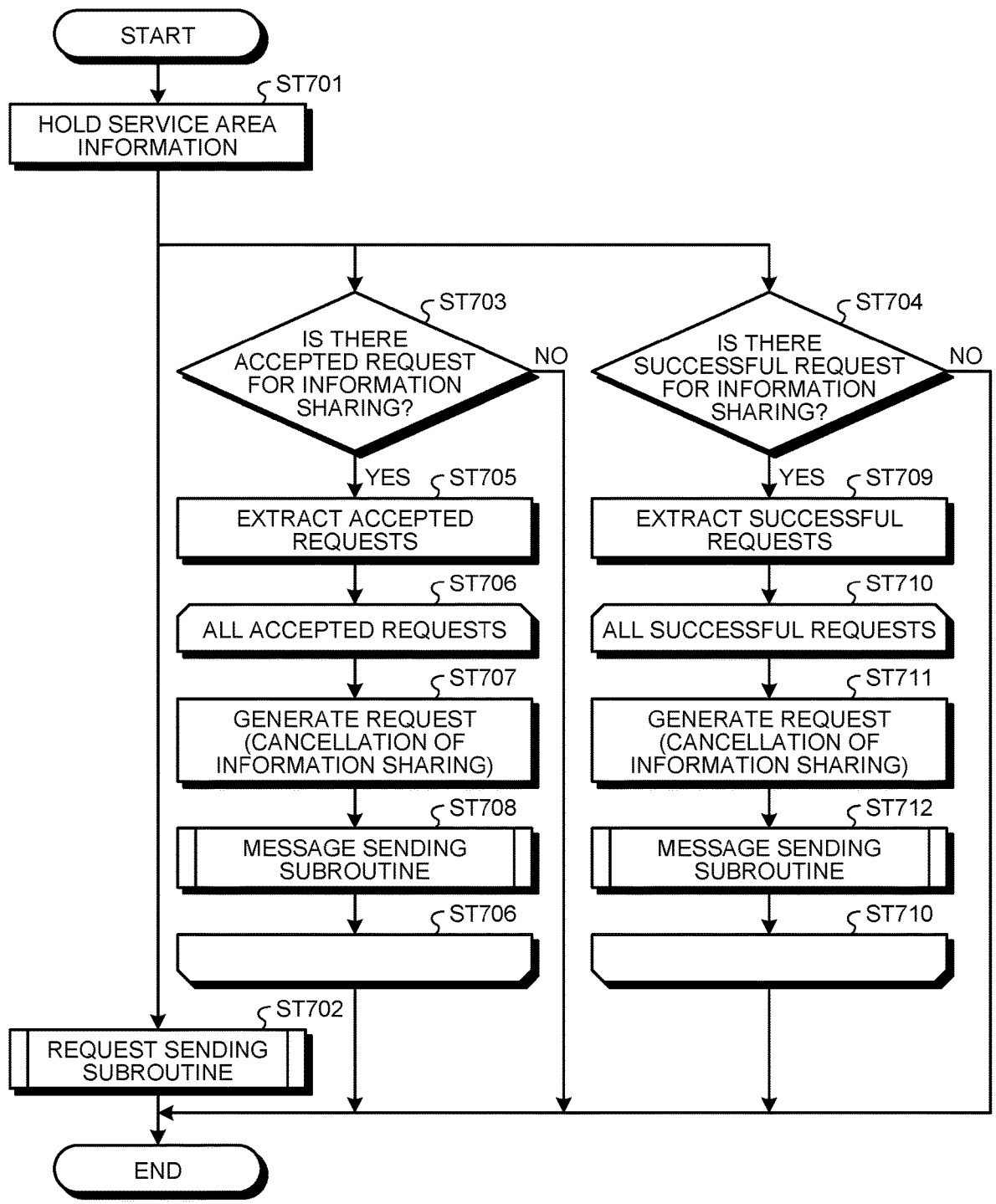
FIG. 27 is a flowchart illustrating the service area update subroutine of the flowchart illustrated in FIG. 24 in the operation of the edge computer according to the third embodiment.

FIG. 27 is a flowchart illustrating the service area update subroutine in step ST410 of the flowchart illustrated in FIG. 24 in the operation of the edge computer 2 according to the third embodiment. Step ST701 in FIG. 27 corresponds to the service area registration process in FIG. 18 performed after the edge computer 2B acquires service area update notification and update service area information. Step ST701 is the same process as step ST113 illustrated in FIG. 11. After the process of holding the service area information (step ST701), the edge computer 2 performs steps ST702 to ST704. Step ST702 is the process in FIG. 18 in which the edge computer 2B sends the request (S811) after acquiring service area update notification and update service area information. Step ST702 will be described later with reference to another flowchart.

Step ST703 corresponds to the process of the accepted request inquiry unit 212 in FIG. 21 performed after the edge computer 2A-1 acquires service area update notification and update service area information. If there is no accepted request for information sharing (step ST703: No), the accepted request inquiry unit 212 ends the procedure. If there is an accepted request for information sharing (step ST703: Yes), the accepted request inquiry unit 212 performs steps ST705 to ST708. Steps ST705 to ST708 are the process in FIG. 21 in which the edge computer 2A-1 sends the request (S1105). Since there is one accepted request in FIG. 21, the edge computer 2A-1 sends one request (S1105). In step ST705, the accepted request inquiry unit 212 extracts all the accepted requests from the accepted request holding unit 207, and sends a request for cancellation of information sharing in the processing loop of step ST706 with respect to every request for information sharing which has been met. Step ST707 is the process of the accepted request inquiry unit 212 related to the generation of a request for cancellation of information sharing. Step ST708 will be described later with reference to another flowchart.

Step ST704 corresponds to the process of the successful request inquiry unit 213 in FIG. 18 performed after the edge computer 2B receives service area update notification and update service area information. Step ST704 also corresponds to the process of the successful request inquiry unit 213 in FIG. 20 performed after the edge computer 2B acquires service area update notification and update service area information. If there is no successful request for information sharing (step ST704: No), the successful request inquiry unit 213 ends the procedure. If there is a successful request for information sharing (step ST704: Yes), the successful request inquiry unit 213 performs steps ST709 to ST712. Steps ST709 to ST712 are the process in FIG. 20 in which the edge computer 2B sends the request (S1005). Since there is one request for information sharing which has been met in FIG. 20, the edge computer 2B sends one request (S1005). In step ST709, the successful request inquiry unit 213 extracts all the successful requests from the successful request holding unit 214, and sends a request for cancellation of information sharing in the processing loop of step ST710 with respect to every request for information sharing which has been met. Step ST711 is the process of the successful request inquiry unit 213 related to the generation of a request for cancellation of information sharing. Step ST712 will be described later with reference to another flowchart.

Figure 28:
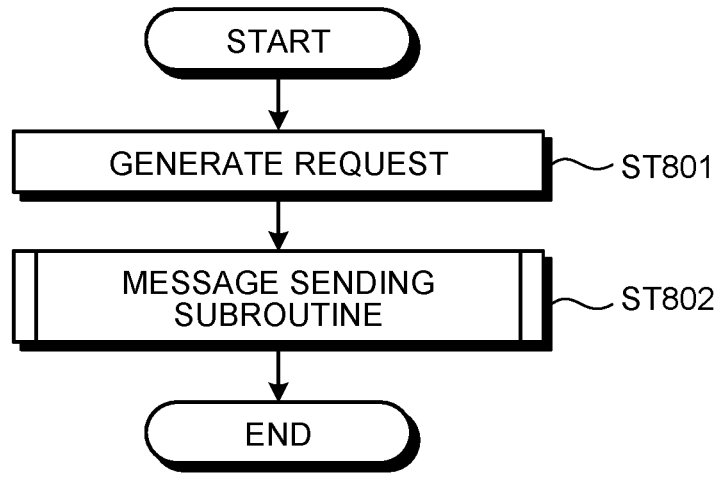
FIG. 28 is a flowchart illustrating the request sending subroutine of the flowcharts illustrated in FIGS. 25, 26, and 27 in the operation of the edge computer according to the third embodiment.

FIG. 28 is a flowchart illustrating the request sending subroutine in steps ST503 and ST508 of the flowchart illustrated in FIG. 25, step ST604 of the flowchart illustrated in FIG. 26, and step ST702 of the flowchart illustrated in FIG. 27 in the operation of the edge computer 2 according to the third embodiment. Step ST801 corresponds to the request generation process in the request generation unit 210. Step ST802 will be described later with reference to another flowchart.

Figure 29:
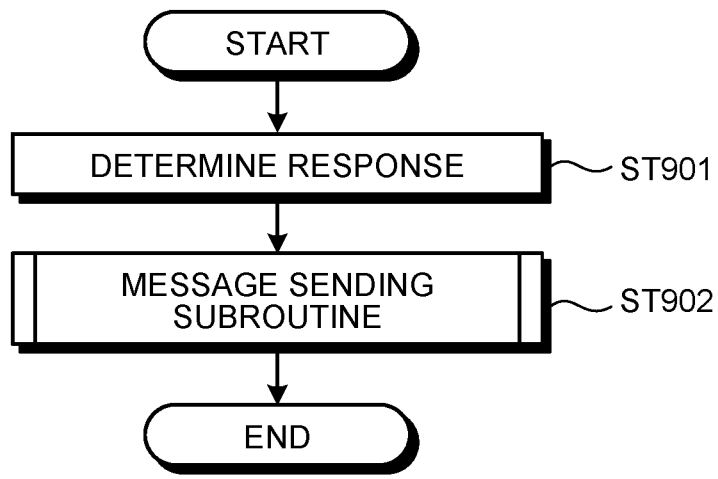
FIG. 29 is a flowchart illustrating the response sending subroutine of the flowchart illustrated in FIG. 26 in the operation of the edge computer according to the third embodiment.

FIG. 29 is a flowchart illustrating the response sending subroutine in steps ST603 and ST609 of the flowchart illustrated in FIG. 26 in the operation of the edge computer 2 according to the third embodiment. Step ST901 corresponds to the response determination process in the response determination unit 209. Step ST902 will be described later with reference to another flowchart.

Figure 30:
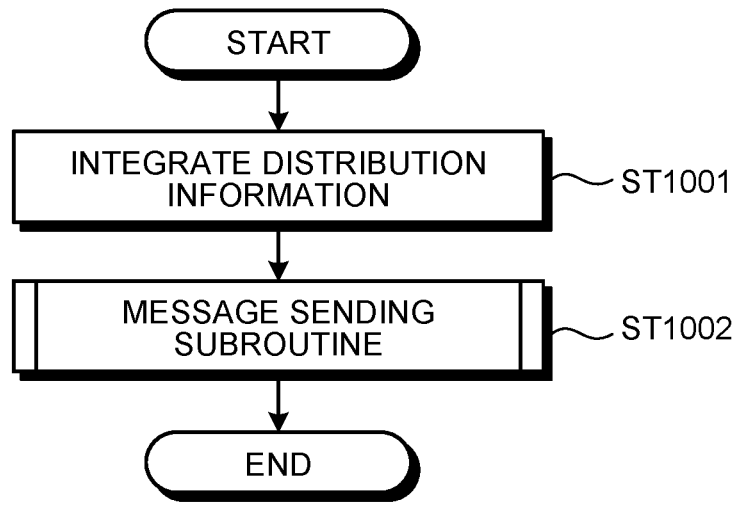
FIG. 30 is a flowchart illustrating the distribution sending subroutine of the flowchart illustrated in FIG. 24 in the operation of the edge computer according to the third embodiment.

FIG. 30 is a flowchart illustrating the distribution sending subroutine in steps ST409 and ST411 of the flowchart illustrated in FIG. 24 in the operation of the edge computer 2 according to the third embodiment. Step ST1001 corresponds to the distribution information integration process in the distribution information integration unit 208. Step ST1002 will be described later with reference to another flowchart.

Figure 31:
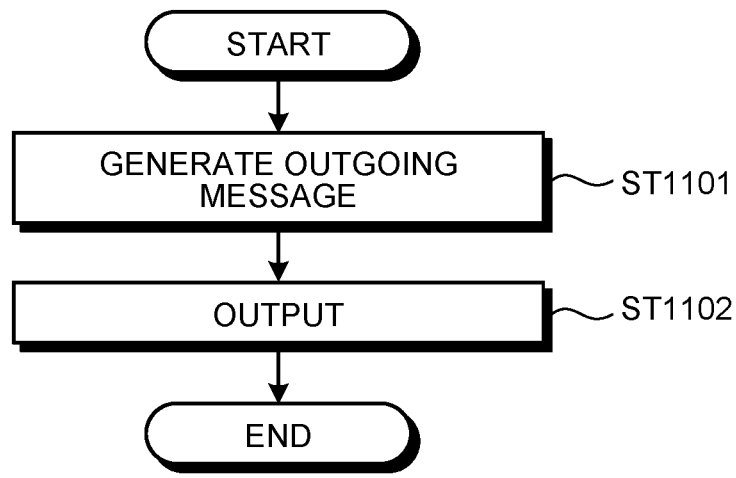
FIG. 31 is a flowchart illustrating the message sending subroutine of the flowcharts illustrated in FIGS. 24, 27, 28, 29, and 30 in the operation of the edge computer according to the third embodiment.

FIG. 31 is a flowchart illustrating the message sending subroutine in step ST414 of the flowchart illustrated in FIG. 24, steps ST708 and ST712 of the flowchart illustrated in FIG. 27, step ST802 of the flowchart illustrated in FIG. 28, step ST902 of the flowchart illustrated in FIG. 29, and step ST1002 of the flowchart illustrated in FIG. 30 in the operation of the edge computer 2 according to the third embodiment. Step ST1101 corresponds to the outgoing message generation process in the outgoing message generation unit 211. In step ST1102, the outgoing message generation unit 211 performs output to a memory area or the like in the communication unit 201.

Figure 32:
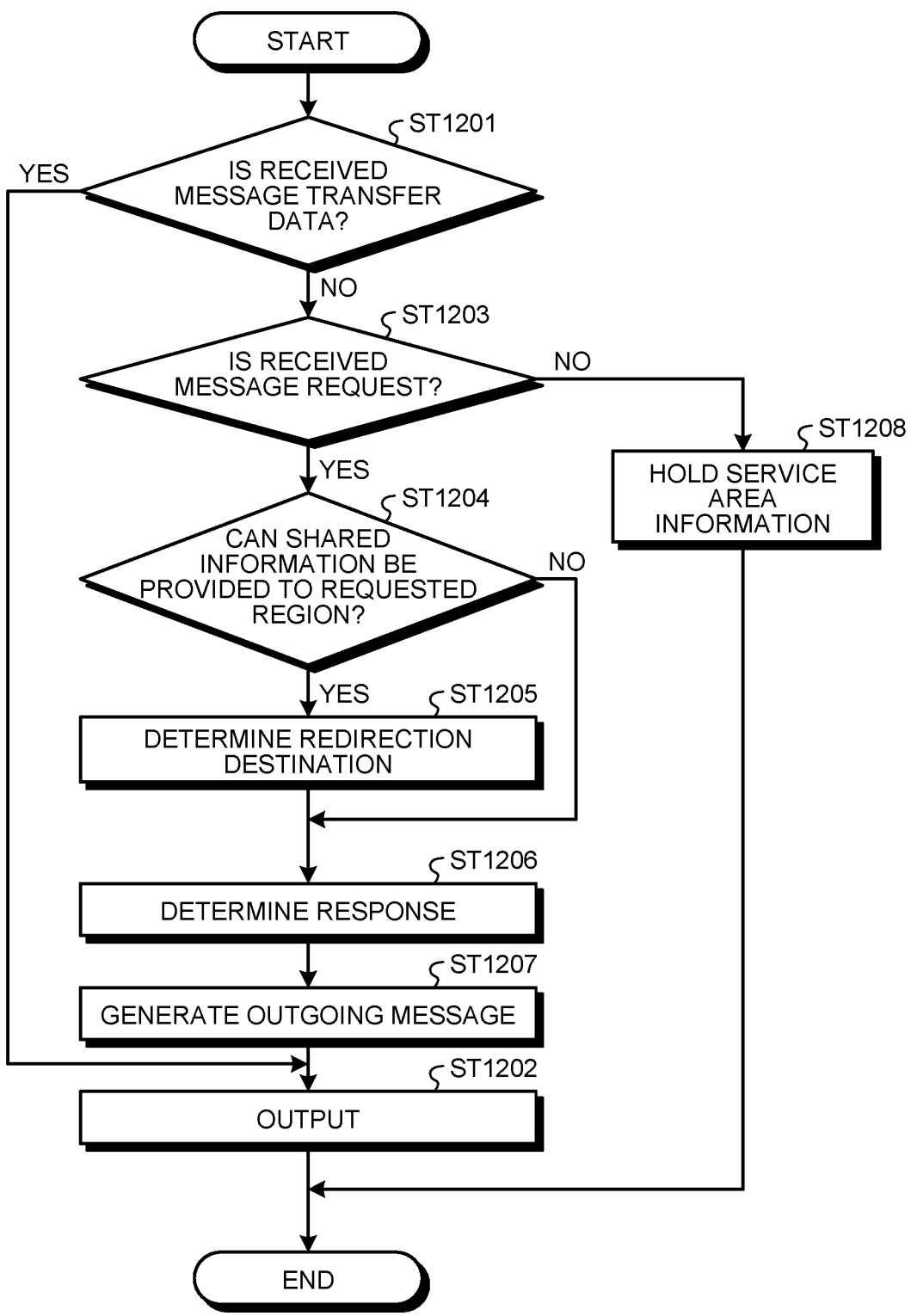
FIG. 32 is a flowchart illustrating the operation of the gateway based on the program that is executed by the gateway according to the third embodiment.

Next, the program that is executed by the gateway 3 will be described. FIG. 32 is a flowchart illustrating the operation of the gateway 3 based on the program that is executed by the gateway 3 according to the third embodiment.

In the flowchart of the gateway 3 illustrated in FIG. 32, steps ST1201 and ST1202 correspond to processes in the transfer determination unit 302. The transfer determination unit 302 determines in step ST1201 whether the received message is a message to be transferred, and in response to determining that the received message is a message to be transferred (step ST1201: Yes), outputs the message to a memory area or the like in the communication unit 301 in step ST1202. In response to determining that the received message is not a message to be transferred (step ST1201: No), the gateway 3 performs step ST1203. Step ST1203 is the accepted message process, in which the gateway 3 determines whether the received message is a request. In response to determining that the received message is a request (step ST1203: Yes), the gateway 3 performs step ST1204.

The gateway 3 determines in step ST1204 whether it is possible to provide shared information that depends on the region designated by the request on the basis of the service area region information from the service area information holding unit 304. In response to determining that it is possible to provide shared information (step ST1204: Yes), the gateway 3 determines a redirection destination in step ST1205. Steps ST1204 and ST1205 are processes corresponding to the request analysis unit 305.

In response to determining that it is not possible to provide shared information (step ST1204: No), or after step ST1205, the gateway 3 performs step ST1206. The gateway 3 determines a redirection destination, a determination result, and the like in step ST1206 corresponding to a process in the response determination unit 310, and performs output to a memory area or the like in the communication unit 301 in steps ST1207 and ST1202 corresponding to processes in the outgoing message generation unit 312 in order to send the redirection destination, the determination result, and the like as a response.

The case where the received message is not a request (step ST1203: No) is the case where the gateway 3 has received service area update notification and update service area information; therefore, the gateway 3 performs step ST1208 corresponding to saving in the service area information holding unit 304.

In the third embodiment, the differences from the first and second embodiments have been mainly described, but the http protocol described in the first and second embodiments can also be applied.

As described above, according to the present embodiment, in the communication system 20, the edge computer 2B of telecommunications company B sends a request that is an information sharing demand including location information, a range from the location information, and an identifier, and the gateway 3A of telecommunications company A different from telecommunications company B determines the edge computer 2A capable of sending shared information in response to the demand from the edge computer 2B, and sends a response to the edge computer 2B. The edge computer 2B sends a request that is an information sharing demand to the edge computer 2A specified by the received response, receives shared information from the edge computer 2A, and sends the shared information to the vehicle 11B capable of communicating with telecommunications company B.

Consequently, as in the first and second embodiments, the communication system 20 can share information such as emergency information recognized by one or more vehicles 11 between different telecommunications companies without the need that each telecommunications company uses information on the network configuration of other telecommunications companies. In the third embodiment, in the communication system 20, the edge computer 2 of each telecommunications company directly makes requests and responses for information sharing; therefore, the processing load of the gateway 3 can be reduced, and the configuration of the gateway 3 can be simplified.

In addition, in the gateway 3, if the accepted message processing unit 303 has a proxy function and the gateway 3 that has received a message is designated as a proxy server by the message, the accepted message processing unit 303 may output a payload to the outgoing message generation unit 312, and the outgoing message generation unit 312 may perform TCP encapsulation or the like of the payload. In this case, if the gateway 3 that processes the message is designated as a proxy server, the transfer determination unit 302 does not perform the transfer process. Consequently, similarly to a general proxy server, the communication system 20 can separate and hide the network configuration of the transmission source of the message from the network of the transmission destination between different telecommunications companies.

Fourth Embodiment

In a fourth embodiment, a modification of the first embodiment will be described. Note that in the fourth embodiment, the configuration of the communication system 20 is the same as the configuration of the communication system 20 in the first embodiment illustrated in FIG. 1.

When sending the request (S103) in the operation of the sequence diagram illustrated in FIG. 2, the edge computer 2B adds a periodic transmission interval time $\Delta T$ to the request (S103) in addition to the information described in the first embodiment, and sends the request (S103) to the gateway 3A. That is, the request (S103) includes the periodic transmission interval time $\Delta T$ specifying the transmission interval of shared information at the information sharing acceptor. The gateway 3A adds the periodic transmission interval time $\Delta T$ to the request (S105), and sends the request (S105) to the edge computer 2A-1. The edge computer 2A-1 accepts the request (S105) including the periodic transmission interval time $\Delta T$ added. The description of the sequence diagram illustrated in FIG. 5 is omitted.

Figure 33:
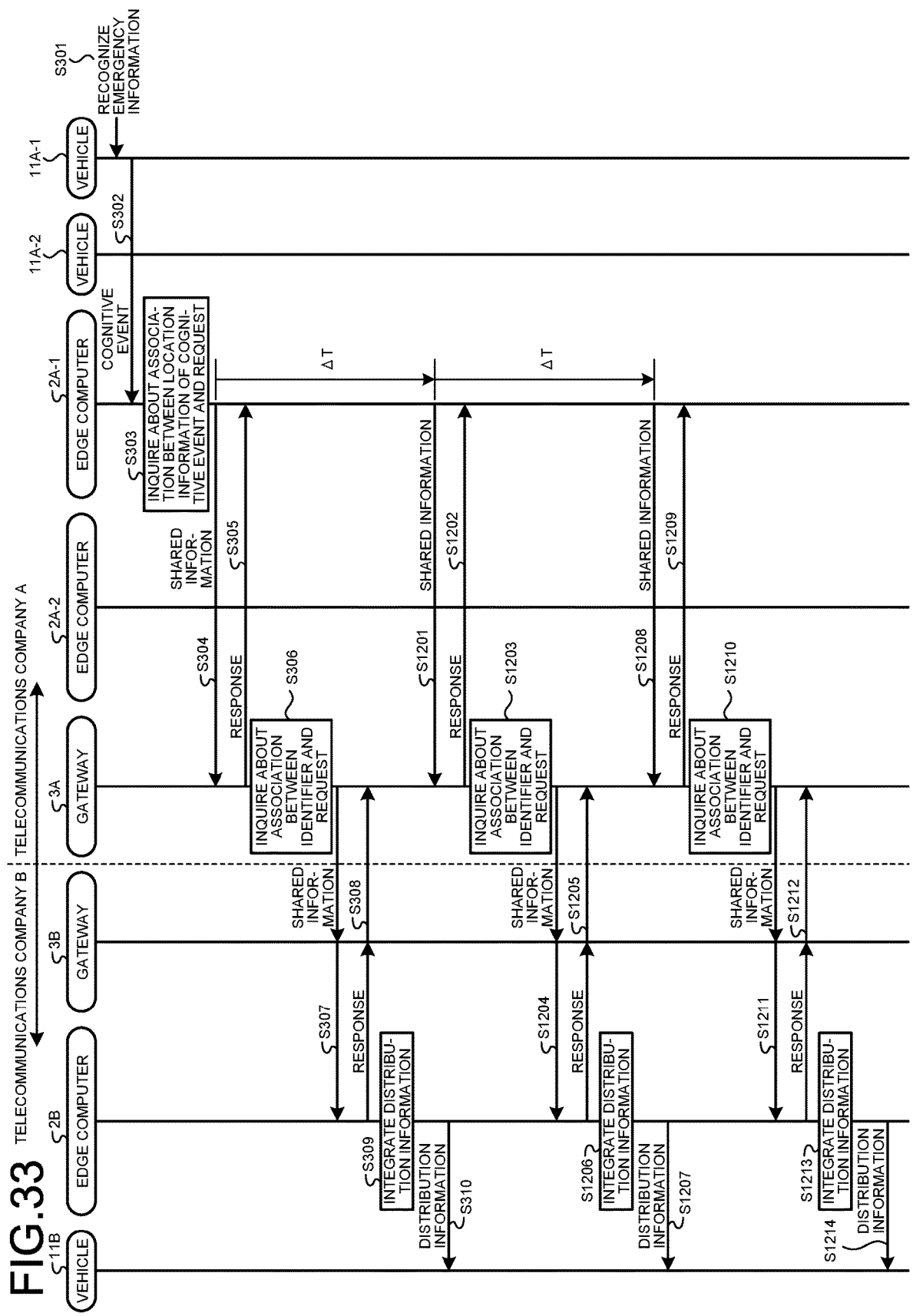
FIG. 33 is a sequence diagram illustrating an operation in which shared information is periodically sent using a periodic transmission interval time between edge computers in the communication system according to a fourth embodiment.

FIG. 33 is a sequence diagram illustrating an operation in which shared information is periodically sent using the periodic transmission interval time ΔT between the edge computers 2 in the communication system 20 according to the fourth embodiment. Steps S301 to S310 in FIG. 33 are the same processes as steps S301 to S310 in the sequence diagram illustrated in FIG. 6.

After the lapse of the periodic transmission interval time ΔT specified in the request (S105) from the transmission of the shared information (S304), the edge computer 2A-1 sends shared information (step S1201). The processes of each device from subsequent steps S1202 to S1207 are the same as the processes of each device from steps S305 to S310 in the sequence diagram illustrated in FIG. 6. Further, after the lapse of the periodic transmission interval time ΔT specified in the request (S105) from the transmission of the shared information (hereinafter referred to as the shared information (S1201)) in step S1201, the edge computer 2A-1 sends shared information (step S1208). The processes of each device from subsequent steps S1209 to S1214 are the same as the processes of each device from steps S305 to S310 in the sequence diagram illustrated in FIG. 6.

The edge computer 2A-1 may send the same content for the shared information (S304), the shared information (S1201), and the shared information (hereinafter referred to as the shared information (S1208)) sent in step S1208. Note that if the elapsed time from the cognitive event (S302) is included in the shared information (S304), the shared information (S1201), and the shared information (S1208), each piece of shared information has different information on the elapsed time. In addition, if the edge computer 2A-1 sends the shared information (S304), the shared information (S1201), and the shared information (S1208) by performing statistical processing or the like on the cognitive events delivered from a plurality of vehicles 11 as in a process in the distribution information integration unit 208, the content of the sent shared information can vary depending on the content of the cognitive events delivered from the plurality of vehicles 11.

Figure 34:
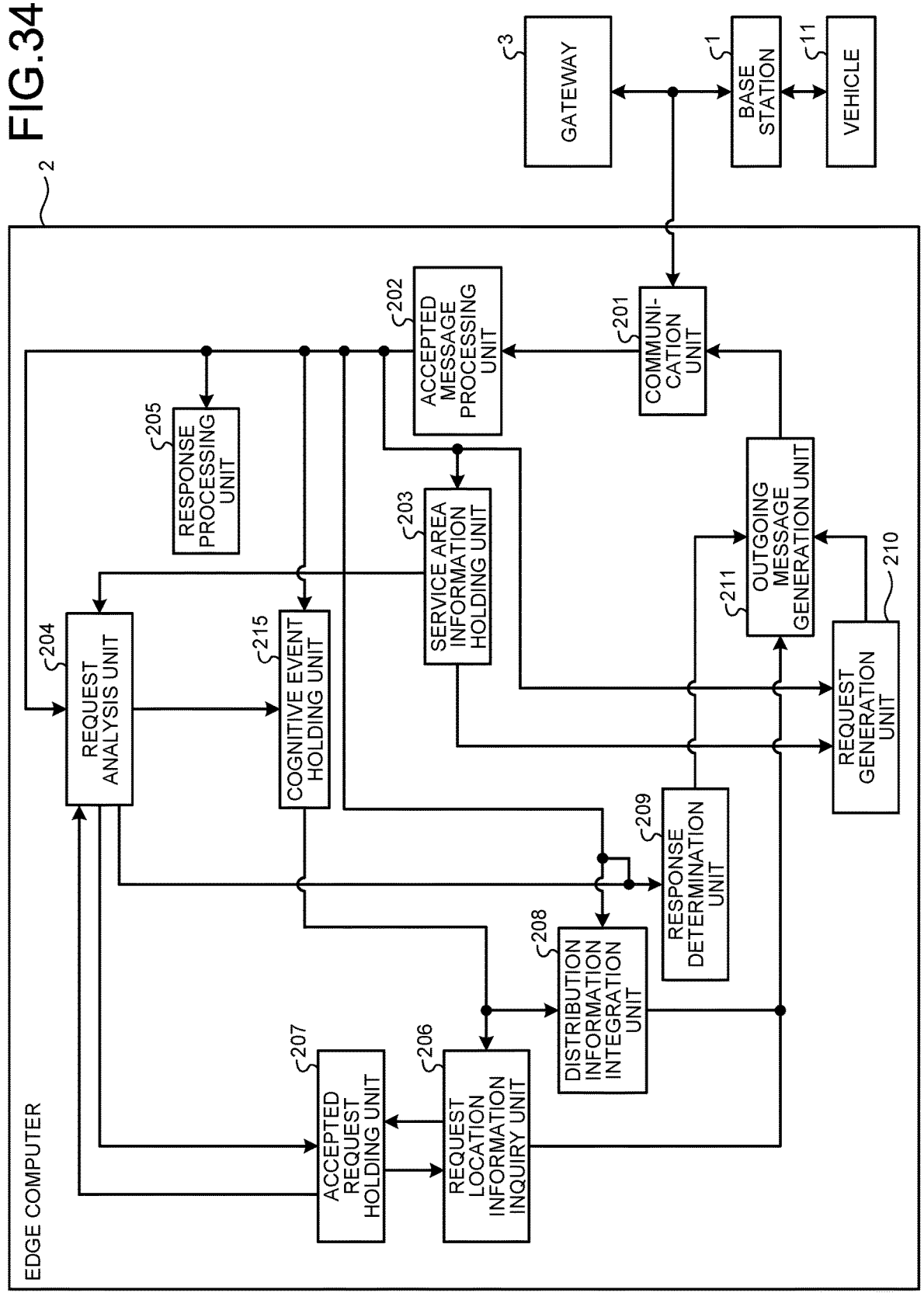
FIG. 34 is a block diagram illustrating an exemplary configuration of an edge computer according to the fourth embodiment.

The operation of the sequence diagram illustrated in FIG. 33 will be described in detail using the configuration of each device. Note that the configuration of the gateway 3 is the same as the configuration in the first embodiment illustrated in FIG. 4. FIG. 34 is a block diagram illustrating an exemplary configuration of the edge computer 2 according to the fourth embodiment. The edge computer 2 according to the fourth embodiment illustrated in FIG. 34 is obtained by adding a cognitive event holding unit 215 to the edge computer 2 according to the first embodiment illustrated in FIG. 3. The request analysis unit 204 analyzes a request that is an information sharing demand, and if shared information can be provided, outputs the periodic transmission interval time ΔT to the cognitive event holding unit 215. In the edge computer 2, the communication unit 201 receives the cognitive event (S302), and outputs the cognitive event (S302) to the accepted message processing unit 202. The accepted message processing unit 202 outputs the cognitive event (S302) to the cognitive event holding unit 215. The cognitive event holding unit 215 holds the cognitive event (S302), and outputs the cognitive event (S302) to the distribution information integration unit 208 and the request location information inquiry unit 206. After the lapse of the periodic transmission interval time ΔT from the output of the cognitive event (S302) to the distribution information integration unit 208 and the request location information inquiry unit 206, the cognitive event holding unit 215 outputs the held cognitive event (S302) again to the distribution information integration unit 208 and the request location information inquiry unit 206. The cognitive event holding unit 215 repeatedly performs the above process at intervals of the periodic transmission interval time ΔT. Consequently, the edge computer 2 can periodically send shared information such as the shared information (S1201) and the shared information (S1208). Specifically, the request location information inquiry unit 206 generates shared information every time the periodic transmission interval time ΔT elapses.

Figure 35:
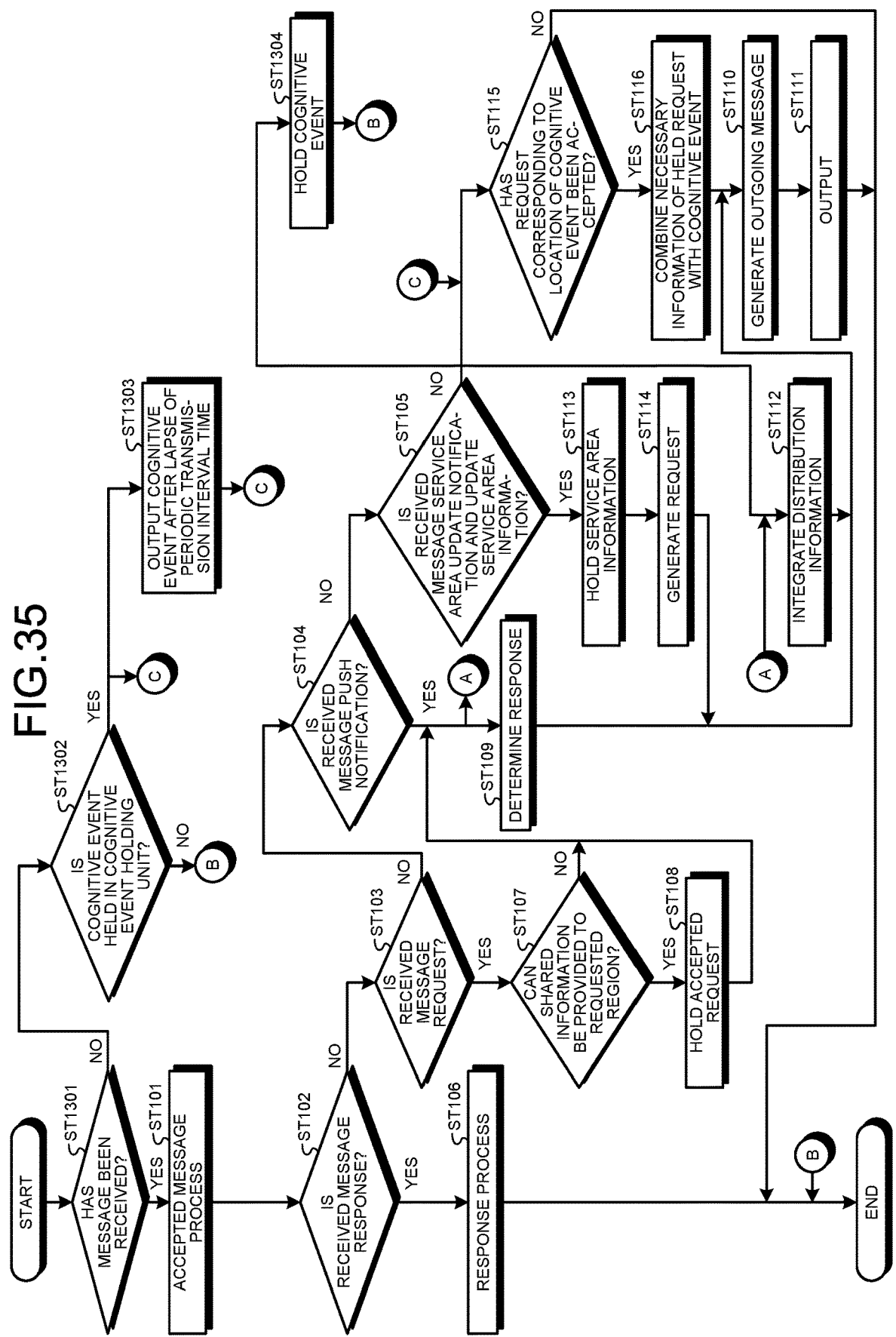
FIG. 35 is a flowchart illustrating the operation of the edge computer based on the program that is executed by the edge computer according to the fourth embodiment.

In the fourth embodiment, the hardware configurations of the edge computer 2 and the gateway 3 are the same as those in the first embodiment. Note that the flowchart illustrating the operation of the gateway 3 based on the program that is executed by the gateway 3 according to the fourth embodiment is the same as the flowchart in the first embodiment illustrated in FIG. 12. FIG. 35 is a flowchart illustrating the operation of the edge computer 2 based on the program that is executed by the edge computer 2 according to the fourth embodiment. Note that in the flowchart illustrated in FIG. 35, steps ST101 to ST116 are the same processes as steps ST101 to ST116 of the flowchart in the first embodiment illustrated in FIG. 11. Therefore, only the differences from the first embodiment will be described here.

The edge computer 2 determines in step ST1301 whether a message has been received, and in response to determining that a message has been received (step ST1301: Yes), performs step ST101. In response to determining that no message has been received (step ST1301: No), the edge computer 2 determines in step ST1302 whether a cognitive event is held in the cognitive event holding unit 215. In response to determining that no cognitive event is held in the cognitive event holding unit 215 (step ST1302: No), the edge computer 2 ends the procedure. In response to the edge computer 2 determining that a cognitive event is held in the cognitive event holding unit 215 (step ST1302: Yes), the cognitive event holding unit 215 outputs the cognitive event, and steps ST112 and ST115 are performed. After performing steps ST112 and ST115, the edge computer 2 counts the periodic transmission interval time ΔT in step ST1303, and after the lapse of the periodic transmission interval time ΔT, the cognitive event holding unit 215 outputs the cognitive event (step ST1303), and steps ST112 and ST115 are performed again. The edge computer 2 outputs the cognitive event every time the periodic transmission interval time ΔT elapses, that is, repeatedly performs step ST1303. The case of step ST105: No is the case where the edge computer 2 has received a cognitive event; therefore, the edge computer 2 holds the cognitive event in step ST1304.

Although the fourth embodiment has been described as a modification of the first embodiment, making an information sharing demand by adding the periodic transmission interval time ΔT is also applicable to the second and third embodiments. In addition, although the state of information sharing in telecommunications company A in the communication system 20 is omitted from the sequence diagram illustrated in FIG. 33, the present embodiment is also applicable to information sharing in telecommunications company A. In other words, in the edge computer 2 or the gateway 3, the present embodiment is applicable as long as the demander and the demandee of information sharing are associated with each other.

As described above, according to the present embodiment, in the communication system 20, the edge computer 2A that has received a cognitive event can further send shared information periodically in the cases of the first to third embodiments.

There are road traffic situations in which it is required to transmit the same information, even exactly the same information, to each vehicle 11 at regular intervals, such as information broadcast in V2X, e.g. information on a traffic accident. For example, in cases where a lane is blocked due to continuous influence of an accident or where traffic is obstructed due to an unremoved fallen object, there may be no change in the information but it is necessary to periodically notify each vehicle 11 of the same information. In addition, in cases where information is provided to the vehicle 11 that has not entered the service area 4 at the time of the information distribution based on a first cognitive event and has entered the service area 4 thereafter, even the same information needs to be distributed again. In these situations, there is a possibility that safety may be impaired if the information receiving side, that is, telecommunications company B in the first embodiment, arbitrarily determines that the information has not been updated and distributes the same information to the vehicle 11B in the service area 4B of the base station 1B. In such cases, it is possible to enhance safety by periodically transmitting shared information from telecommunications company A as in the present embodiment.

In addition, the periodic transmission interval time ΔT may be combined with the method of updating the location information of an information sharing demand or the like described in the first embodiment and the like. Consequently, telecommunications company B can reduce useless communication traffic and perform efficient traffic control by increasing the periodic transmission interval time ΔT in cases where there are so many vehicles 11B under the control of the base station 1B that a longer distribution cycle is allowed, such as in a traffic congestion, or where communication traffic is so heavy that a longer distribution cycle is preferable.

The processing device according to the present disclosure can achieve the effect of enabling sharing of information that is to be distributed to vehicles between different telecommunications companies without using information on the network configuration of other telecommunications companies.

The configurations described in the above-mentioned embodiments indicate examples. The embodiments can be combined with another well-known technique and with each other, and some of the configurations can be omitted or changed in a range not departing from the gist.

What is claimed is:

1. A processing device connected to a base station capable of communicating with a vehicle in a service area, the processing device comprising:
   request generation circuitry to generate a first request that is a request including location information and a range from the location information specifying a region in which information sharing is requested, and an identifier from which a demander that requests the information sharing is identifiable;
   accepted request holding circuitry to hold a second request that is a request based on an information sharing demand from another processing device in a case where shared information regarding the region is sendable in response to the second request; and
   request inquiry circuitry to generate the shared information in a case where location information indicating a point of occurrence of a cognitive event acquired from the vehicle via the base station is included in a region specified by the second request, the shared information including the cognitive event and an identifier held in the accepted request holding circuitry.

2. The processing device according to claim 1, wherein the location information and the range from the location information include height information.

3. The processing device according to claim 1, wherein the request includes a periodic transmission interval time specifying a transmission interval of the shared information, and
   the request inquiry circuitry generates the shared information every time the periodic transmission interval time elapses.

4. The processing device according to claim 1, comprising:
   request analysis circuitry to analyze content of the second request, and cause the accepted request holding circuitry to hold the second request in a case where the shared information is sendable in response to the second request; and
   response determination circuitry to generate a response to the second request on the basis of an analysis result of the request analysis circuitry.

5. The processing device according to claim 1, wherein the identifier held in the accepted request holding circuitry is an identifier given by a communication device installed on a communication path between the processing device and the other processing device and operated by a same telecommunications company as the processing device.

6. The processing device according to claim 1, wherein the identifier held in the accepted request holding circuitry is an identifier given by the other processing device.

7. A communication device operated by a same first telecommunications company as a processing device connected to a base station capable of communicating with a vehicle in a service area, the communication device being capable of communicating with the processing device, the communication device comprising:
   transfer determination circuitry to determine to transfer a first request to another communication device operated by a second telecommunications company, the first request being a request sent from the processing device and including location information and a range from the location information specifying a region in which information sharing is requested, and an identifier from which a demander that requests the information sharing is identifiable;
   request analysis circuitry to analyze a second request that is an information sharing demand from a processing device operated by the second telecommunications company, and determine whether a region specified by the second request is included in a service area of the first telecommunications company; and
   response determination circuitry to generate a response to the second request.

8. The communication device according to claim 7, comprising
   intra-network request generation circuitry to generate a request for one or more processing devices operated by the first telecommunications company in a case where the region specified by the second request is included in the service area of the first telecommunications company, the request including the location information, the range from the location information, and an identifier from which the communication device is identifiable.

9. The communication device according to claim 7, wherein
the request analysis circuitry determines the processing device connected to a base station that provides a service area including the region specified by a second request, and
the response determination circuitry generates the response specifying the processing device determined by the request analysis circuitry.

10. A communication system comprising:
a processing device connected to a base station capable of communicating with a vehicle in a service area, the processing device comprising
request generation circuitry to generate a first request that is a request including location information and a range from the location information specifying a region in which information sharing is requested, and an identifier from which a demander that requests the information sharing is identifiable,
accepted request holding circuitry to hold a second request that is a request based on an information sharing demand from another processing device in a case where shared information regarding the region is sendable in response to the second request, and
request inquiry circuitry to generate the shared information in a case where location information indicating a point of occurrence of a cognitive event acquired from the vehicle via the base station is included in a region specified by the second request, the shared information including the cognitive event and an identifier held in the accepted request holding circuitry; and
the communication device according to claim 7.

11. A control circuit for controlling a processing device connected to a base station capable of communicating with a vehicle in a service area, the control circuit causing the processing device to execute:
generating a first request that is a request including location information and a range from the location information specifying a region in which information sharing is requested, and an identifier from which a demander that requests the information sharing is identifiable;
holding a second request that is a request based on an information sharing demand from another processing device in a case where shared information regarding the region is sendable in response to the second request; and
generating the shared information in a case where location information indicating a point of occurrence of a cognitive event acquired from the vehicle via the base station is included in a region specified by the second request, the shared information including the cognitive event and an identifier held.

12. A control circuit for controlling a communication device operated by a same first telecommunications company as a processing device connected to a base station capable of communicating with a vehicle in a service area, the communication device being capable of communicating with the processing device, the control circuit causing the communication device to execute:
determining to transfer a first request to another communication device operated by a second telecommunications company, the first request being a request sent from the processing device and including location information and a range from the location information specifying a region in which information sharing is requested, and an identifier from which a demander that requests the information sharing is identifiable;
analyzing a second request that is an information sharing demand from another processing device operated by the second telecommunications company, and determining whether a region specified by the second request is included in a service area of the first telecommunications company; and
generating a response to the second request on the basis of an analysis result.

13. A non-transitory storage medium storing a program for controlling a processing device connected to a base station capable of communicating with a vehicle in a service area, the program causing the processing device to execute:
generating a first request that is a request including location information and a range from the location information specifying a region in which information sharing is requested, and an identifier from which a demander that requests the information sharing is identifiable;
holding a second request that is a request based on an information sharing demand from another processing device in a case where shared information regarding the region is sendable in response to the second request; and
generating the shared information in a case where location information indicating a point of occurrence of a cognitive event acquired from the vehicle via the base station is included in a region specified by the second request, the shared information including the cognitive event and an identifier held.

14. A non-transitory storage medium storing a program for controlling a communication device operated by a same first telecommunications company as a processing device connected to a base station capable of communicating with a vehicle in a service area, the communication device being capable of communicating with the processing device, the program causing the communication device to execute:
determining to transfer a first request to another communication device operated by a second telecommunications company, the first request being a request sent from the processing device and including location information and a range from the location information specifying a region in which information sharing is requested, and an identifier from which a demander that requests the information sharing is identifiable;
analyzing a second request that is an information sharing demand from another processing device operated by the second telecommunications company, and determining whether a region specified by the second request is included in a service area of the first telecommunications company; and
generating a response to the second request on the basis of an analysis result.

15. An information sharing method for a processing device connected to a base station capable of communicating with a vehicle in a service area, the information sharing method comprising:
a request generation, by request generation circuitry, of generating a first request that is a request including location information and a range from the location information specifying a region in which information sharing is requested, and an identifier from which a demander that requests the information sharing is identifiable;
an accepted request holding, by accepted request holding circuitry, of holding a second request that is a request based on an information sharing demand from another processing device in a case where shared information regarding the region is sendable in response to the second request; and a request inquiry, by request inquiry circuitry, of generating the shared information in a case where location information indicating a point of occurrence of a cognitive event acquired from the vehicle via the base station is included in a region specified by the second request, the shared information including the cognitive event and an identifier held in the accepted request holding circuitry.

16. An information sharing method for a communication device operated by a same first telecommunications company as a processing device connected to a base station capable of communicating with a vehicle in a service area, the communication device being capable of communicating with the processing device, the information sharing method comprising:

a transfer determination, by transfer determination circuitry, of determining to transfer a first request to another communication device operated by a second telecommunications company, the first request being a request sent from the processing device and including location information and a range from the location information specifying a region in which information sharing is requested, and an identifier from which a demander that requests the information sharing is identifiable;

a request analysis, by request analysis circuitry, of analyzing a second request that is an information sharing demand from another processing device operated by the second telecommunications company, and determining whether a region specified by the second request is included in a service area of the first telecommunications company; and a response determination, by response determination circuitry, of generating a response to the second request on the basis of an analysis result of the request analysis circuitry.

* * * * *